(12) United States Patent
Hsu Besner et al.

(10) Patent No.: US 10,631,651 B1
(45) Date of Patent: Apr. 28, 2020

(54) CHAIR

(71) Applicant: Sunflow, Inc., Short Hills, NJ (US)

(72) Inventors: Leslie Hsu Besner, Short Hills, NJ (US); Jeffrey Servaites, Oakland, CA (US)

(73) Assignee: Sunflow, Inc., Short Hills, NJ (US)

(*) Notice: Subject to any disclaimer, the term of this patent is extended or adjusted under 35 U.S.C. 154(b) by 0 days.

(21) Appl. No.: 16/714,509

(22) Filed: Dec. 13, 2019

Related U.S. Application Data

(60) Provisional application No. 62/883,486, filed on Aug. 6, 2019.

(51) Int. Cl.
  *A47C 4/28* (2006.01)
  *A47C 7/62* (2006.01)
  *A47C 7/66* (2006.01)
  *A47C 7/40* (2006.01)
  *F16B 21/12* (2006.01)

(52) U.S. Cl.
  CPC .............. *A47C 7/407* (2013.01); *A47C 4/28* (2013.01); *F16B 21/12* (2013.01); *A47C 7/624* (2018.08); *A47C 7/66* (2013.01)

(58) Field of Classification Search
  CPC .......... A47C 7/407; A47C 4/28; A47C 7/624; A47C 7/66
  USPC ... 297/16.1–17, 31, 129, 184.1–184.17, 353, 297/900
  See application file for complete search history.

(56) References Cited

U.S. PATENT DOCUMENTS

| | | | | |
|---|---|---|---|---|
| 4,201,416 A | * | 5/1980 | Vanderminden | A47C 7/66 297/184.15 |
| 4,230,363 A | * | 10/1980 | Borichevsky | A47C 7/66 297/184.15 X |
| 4,632,410 A | * | 12/1986 | Bainbridge | B25H 3/00 297/353 X |
| 4,635,667 A | * | 1/1987 | Harn | A47C 7/66 297/184.15 X |
| 4,687,249 A | * | 8/1987 | Mills | A61G 5/10 297/184.15 X |
| 4,865,381 A | * | 9/1989 | Van Rogue | A47C 7/66 297/184.15 |
| 4,889,383 A | * | 12/1989 | Jones | A47C 4/02 297/16.1 |
| 4,936,594 A | * | 6/1990 | Oliver, III | A47B 81/06 280/47.19 |
| 4,955,517 A | * | 9/1990 | Maresca | A45F 4/02 297/129 X |
| 5,096,257 A | * | 3/1992 | Clark | A47C 1/143 297/184.15 |
| 5,203,363 A | * | 4/1993 | Kidwell | A47C 7/66 297/184.15 X |
| D338,791 S | | 8/1993 | Cohen | |

(Continued)

*Primary Examiner* — Rodney B White
(74) *Attorney, Agent, or Firm* — Wolf, Greenfield & Sacks, P.C.

(57) ABSTRACT

A folding chair includes front and rear supports that fold and/or retract into central beams to reduce the space occupied by the chair in a folded configuration. A backrest is coupled to the central beams with a hub that allows an angle of the backrest relative to the central beams to be selected and for the backrest to be folded flat relative to the central beams. One or more actuators and pin actuators may control the relative movements of the backrest, front support, rear support, and central beams.

23 Claims, 50 Drawing Sheets

(56) References Cited

U.S. PATENT DOCUMENTS

| | | | | |
|---|---|---|---|---|
| 5,318,342 | A * | 6/1994 | Hale | A47C 4/52 |
| | | | | 297/129 |
| 5,499,760 | A * | 3/1996 | Pielocik | A47C 4/52 |
| | | | | 297/129 X |
| D376,060 | S | 12/1996 | Cohen | |
| 5,582,458 | A * | 12/1996 | Wildt | A47C 1/143 |
| | | | | 297/184.15 X |
| 5,593,205 | A * | 1/1997 | Vanderminden, Sr. | A47C 7/66 |
| | | | | 297/184.15 X |
| 5,667,274 | A * | 9/1997 | Blackman | A47C 1/023 |
| | | | | 297/353 X |
| 5,727,841 | A * | 3/1998 | Morley | A47C 1/143 |
| | | | | 297/184.1 |
| 5,730,488 | A * | 3/1998 | Chang | A47C 4/283 |
| | | | | 297/16.1 |
| 5,797,650 | A * | 8/1998 | Gonzalez, Jr. | A47C 7/66 |
| | | | | 297/184.1 |
| 5,915,722 | A | 6/1999 | Thrasher et al. | |
| 5,951,103 | A * | 9/1999 | Barnhill | A47C 1/143 |
| | | | | 297/184.15 X |
| 6,036,262 | A * | 3/2000 | Shahid | A47C 1/143 |
| | | | | 297/184.15 |
| 6,056,172 | A | 5/2000 | Welsh | |
| 6,170,907 | B1 * | 1/2001 | Tsai | A47C 1/12 |
| | | | | 297/16.1 |
| 6,371,553 | B1 * | 4/2002 | Tang | A47C 4/286 |
| | | | | 297/184.1 |
| 6,789,557 | B1 * | 9/2004 | Wahl, Jr. | A47C 7/66 |
| | | | | 297/184.11 X |
| 6,979,056 | B1 * | 12/2005 | Goldszer | A47C 1/0265 |
| | | | | 297/184.1 |
| 7,000,987 | B2 * | 2/2006 | Staarink | A47C 7/402 |
| | | | | 297/353 X |
| 7,125,079 | B1 * | 10/2006 | Lee | A47C 3/18 |
| | | | | 297/353 |
| 7,243,990 | B1 * | 7/2007 | Wahl | A47C 7/66 |
| | | | | 297/184.15 |
| D547,981 | S | 8/2007 | Cohen | |
| D552,386 | S | 10/2007 | Cohen | |
| 7,325,815 | B2 * | 2/2008 | Rush | A61G 1/017 |
| | | | | 297/31 X |
| 7,374,238 | B2 * | 5/2008 | Lingwall | A47C 4/52 |
| | | | | 297/129 |
| D571,113 | S | 6/2008 | Cohen | |
| D571,115 | S | 6/2008 | Cohen | |
| 7,703,854 | B2 * | 4/2010 | LaFreniere | A47C 7/543 |
| | | | | 297/31 X |
| 7,828,377 | B2 * | 11/2010 | Grace | A47C 4/283 |
| | | | | 297/16.2 |
| 7,832,804 | B2 * | 11/2010 | LaFreniere | A47C 7/546 |
| | | | | 297/31 X |
| 7,963,592 | B1 * | 6/2011 | Stanley | A47C 1/143 |
| | | | | 297/31 |
| D651,010 | S | 12/2011 | Cohen | |
| 8,091,962 | B2 * | 1/2012 | Quinn | A47C 7/66 |
| | | | | 297/184.16 |
| 8,197,000 | B1 | 6/2012 | Cohen | |
| 8,517,462 | B2 * | 8/2013 | Birch | A01M 31/02 |
| | | | | 297/129 |
| D696,657 | S | 12/2013 | Cohen | |
| D711,146 | S | 8/2014 | Cohen | |
| D711,147 | S | 8/2014 | Cohen | |
| 8,794,703 | B2 * | 8/2014 | Bateman | A47C 3/34 |
| | | | | 297/353 X |
| D718,067 | S | 11/2014 | Cohen | |
| D725,424 | S | 3/2015 | Cohen | |
| 9,039,077 | B1 * | 5/2015 | Santamaria | A47C 1/146 |
| | | | | 297/31 |
| D825,209 | S | 8/2018 | Garrison | |
| 2003/0193222 | A1 | 10/2003 | Welsh | |
| 2004/0251726 | A1 * | 12/2004 | Alexander, Jr. | A47C 3/36 |
| | | | | 297/344.18 |
| 2007/0001502 | A1 | 1/2007 | Welsh et al. | |
| 2007/0040422 | A1 * | 2/2007 | Reeb | A47C 4/00 |
| | | | | 297/184.1 |
| 2008/0129091 | A1 * | 6/2008 | Sharapov | A47C 1/14 |
| | | | | 297/184.11 |
| 2010/0102600 | A1 * | 4/2010 | Lovley, II | A47C 7/66 |
| | | | | 297/184.15 |
| 2011/0175407 | A1 * | 7/2011 | Sharapov | A47C 1/14 |
| | | | | 297/184.15 |
| 2012/0047649 | A1 | 3/2012 | Grace | |
| 2012/0286544 | A1 | 11/2012 | Cohen | |
| 2013/0127213 | A1 * | 5/2013 | Combs | A47C 7/66 |
| | | | | 297/184.11 |
| 2013/0257128 | A1 | 10/2013 | Grace | |
| 2014/0252817 | A1 * | 9/2014 | Lovley, II | A47C 7/66 |
| | | | | 297/184.15 |
| 2016/0286955 | A1 | 10/2016 | Cohen | |
| 2018/0249837 | A1 | 9/2018 | Cohen | |

\* cited by examiner

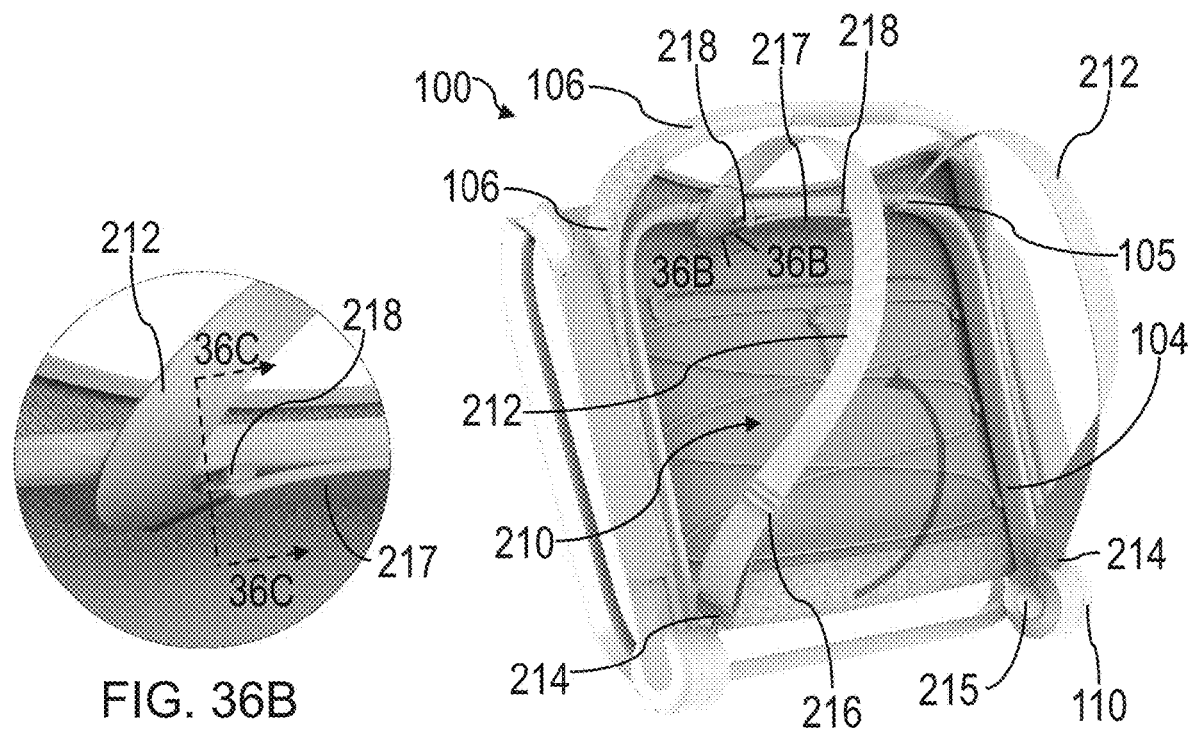
FIG. 36B
FIG. 36A
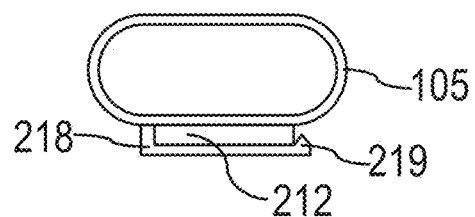
FIG. 36C

CHAIR

RELATED APPLICATIONS

This application claims priority under 35 U.S.C. § 119(e) to U.S. Provisional Application Ser. No. 62/883,486, entitled "CHAIR", filed on Aug. 6, 2019, the disclosure of which is incorporated by reference in its entirety.

FIELD

Disclosed embodiments are related to foldable chairs and related methods of use.

BACKGROUND

Many conventional chairs include foldable elements that enable the size of the chair to be reduced for easy transportation and/or storage. Such chairs typically employ a metal frame and a fabric covering. When folded, conventional chairs may be placed in a bag for carrying or storage.

SUMMARY

In some embodiments, a chair includes a front support, a rear support, two central beams, a backrest and a hub, where the front support and rear support constitute the ground contacting elements. In one embodiment, the front support rotates relative to the central beams and the rear support translates relative to the central beams so that the chair may move between folded and unfolded configurations. In some embodiments, the backrest may rotate and telescope (e.g., translate) relative to the hub. In one embodiment, a backrest actuator (e.g., button) may be used to allow the backrest to telescope (e.g., translate). In one embodiment, when the backrest is in a folded position (e.g., substantially parallel with the central beams), the rear support may be allowed to translate relative to the central beams, whereas the rear support may be locked when the backrest is in other positions. In some embodiments, the hub may include a torsion spring that biases the backrest toward the folded position. In some embodiments, the two central beams may include one or more triggers which are actuable to allow the backrest to be reclined (e.g., rotated relative to the hub) in a direction opposite a biasing force from the torsion spring. In some embodiments, the hub and/or rear support may include a silicone wiper configured to brush off any sand, water, or other particles from the rear support as the rear support is translated. In some embodiments, at least one of the front support and rear support may be formed of an oval shaped tube. In some embodiments, the front support may provide a flat surface (e.g., a surface parallel relative to a horizontal plane) on which a user may place their feet for added comfort while seated. In one embodiment, a shroud may partially surround the front support and/or rear support to provide the flat surface. In some embodiments, at least one of the front support and central beams may include a rounded end at a hinged interface between the front support and the central beams that inhibits gap formation between the front support and central beams as the front support is rotated.

In some embodiments, a chair may include a fabric strap that may be used to carry the chair. In one embodiment, the fabric strap may be selectively attached to the chair at two attachment locations or at least three attachment locations to provide a single loop shoulder strap or a double loop backpack strap, respectively. In some embodiments, a chair may include flanged cylindrical buttons (e.g., mushroom shaped buttons) which may be used to attach one or more accessories to the chair. In some embodiments, a chair may include a releasably attached sun shade that clips to a frame of the chair. In one embodiment, the sun shade may be rotatable relative to the frame and may fold flat relative to a backrest of the chair. In some embodiments, a chair may include a fabric seating surface having a wire frame, where the wire frame may inhibit the seating surface fabric from bunching or otherwise forming an irregular surface. In some embodiments, a rear support of a chair may include a grip pad having a high friction material (e.g., silicone, rubber, etc.) which allows a user to securely place their foot on the rear support for folding or unfolding of the chair. In some embodiments, a chair may include a storage pouch or cup holder which may be releasably attached to the chair (e.g., on a front support or central beam of the chair). In some embodiments, a chair may include a foldable table that is releasably attachable to a single arm of a chair and may be suspended between two chairs side-by-side. In some embodiments, a chair may include a cargo net disposed on a backrest of a chair which may be used to secure larger items to the chair.

In some embodiments, a chair includes a frame, a seating surface coupled to the frame, and a backrest surface coupled to the frame. The frame may have a backrest frame including a first portion and a second portion, where the first and second portions are connected together in a telescoping manner whereby the backrest frame includes a retracted position and an extended position.

In some embodiments, a chair includes a frame having a backrest portion including a first portion and a second portion, where the first and second portions are connected together in a telescoping manner whereby the backrest portion includes a retracted position and an extended position. The chair may also include at least one blocking component coupled to at least one of the first and second portions, the at least one blocking component constructed and arranged to allow the backrest portion to move from the extended positon to the retracted position upon actuation of the blocking component.

In some embodiments, a chair includes a frame having a backrest portion having a first portion and a second portion, where the first and second portions are connected together in a telescoping manner whereby the backrest portion includes a retracted position and an extended position.

In some embodiments, a foldable chair includes a backrest frame having a first stile and a second stile disposed at least partially inside the first stile and configured to slide in the first stile between an extended and a retracted position, a blocking pin movable between a blocking position and an unblocking position, where in the blocking position, the blocking pin cooperates with the first and second stiles to inhibit sliding motion of the second stile relative to the first stile, and in the unblocking position the second stile is free to slide relative to the first stile. The foldable chair also includes a cable operatively coupled to the blocking pin at a first end, and an actuator operatively coupled to a second end of the cable, where the actuator is operable by a user to move the blocking pin between the blocking position and unblocking position.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 36A is a perspective view of the carrying strap of FIG. 35A in a second configuration;

FIG. 36B is an enlarged view of the area encircled by line 36B-36B of FIG. 36A;

FIG. 36C is a cross-sectional view of the chair of FIG. 36A taken along line 36C-36C of FIG. 36B;

DETAILED DESCRIPTION

Figure 1:
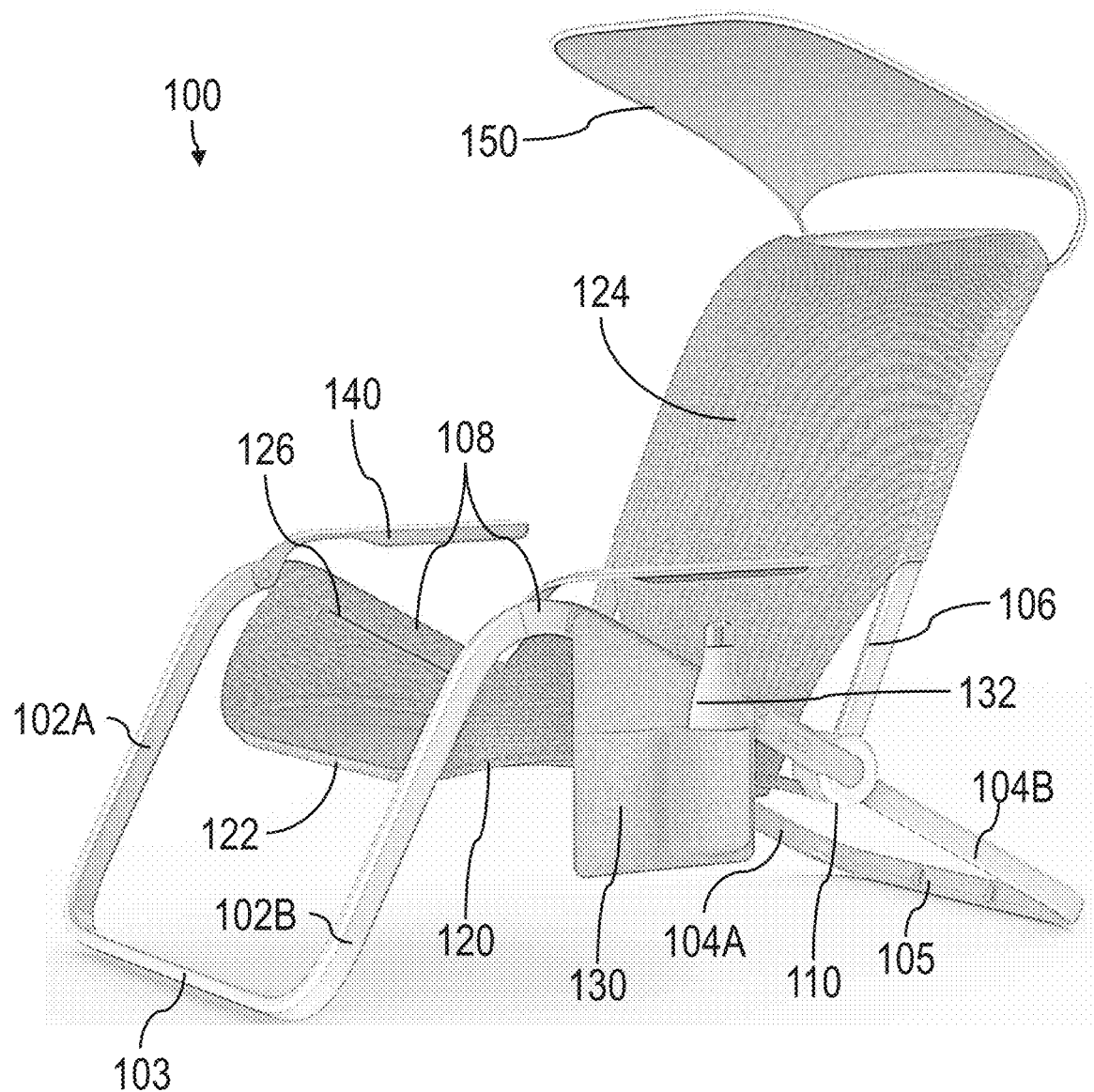
FIG. 1 is a perspective view of one embodiment of a chair.

Many conventional foldable chairs are heavy, cumbersome, and difficult to operate. These conventional chairs typically include multiple moving parts but do not collapse to dimensions which are ergonomic or well suited for ease of carrying (e.g., across uneven terrain such as on a beach or playing field). Moreover, these conventional chairs do not change from an unfolded to a folded state easily or reliably. Additionally, conventional foldable chairs do not include oftentimes desirable features found in non-foldable chairs due to weight, foldability, and other factors. For example, conventional foldable chairs do not include sun shades, arm rests, storage volumes, etc. which stow easily when the chair is retracted. Furthermore, conventional folding chairs do not include recline features which are easy to operate and do not interfere with the movement of the chair between unfolded and folded states.

In view of the above, the inventors have recognized the benefits of a foldable chair that includes some or all of the features disclosed below with respect to the various embodiment described. It should be appreciated that although certain embodiments include various described features, not all embodiments need to include the features in exactly the disclosed combination, as other combinations of features are within the scope of this disclosure.

In some embodiments, a chair includes a front support, a rear support, two central beams, a backrest and a hub. The front support and rear support constitute the ground contacting elements. The central beams span the distance between the front and rear supports and suspend a seating surface. In one embodiment, the central beams also slidably receive the rear support so the overall length between the front and rear supports may be reduced. In one embodiment, the front support is rotatably coupled to the central beams so that the front support may be moved into parallel with the central beams to occupy less space. The hub rotatably couples the backrest to the central beams, and, in one embodiment, allows the backrest to be moved between a seating position where the backrest is inclined relative to the central beams and a storage position where the backrest is parallel to the central beams. In one embodiment, the hub also enables the backrest to be reclined to different angles for user comfort. Thus, the chair may be moved between a seating position (e.g., an unfolded configuration), where a user may be comfortably seated, and a storage position (e.g., a folded configuration), where each of the front support, rear support, central beams, and backrest are substantially parallel to one another so little space is occupied in the storage position.

In some embodiments, a front support for a chair may include a first front leg, a second front leg, and a base connecting the first front leg and second front leg. The base, first front leg, and second front leg may be arranged in a U-shape, where the first front leg and the second front leg extend generally perpendicularly from the base. In some embodiments, the front support may be formed of a continuous piece of material. The front support may also have a constant transverse cross sectional area throughout at least a majority of the length of the front support. Such an arrangement may allow the front support to sufficiently support a weight of a user while remaining lightweight and occupying little area. In some embodiments, the rear support and backrest may have a similar structural arrangement to that of the front support. That is, in some embodiments, the rear support may include a base from which two rear legs extend generally perpendicularly so that the rear support is arranged in a U-shape. Likewise, in some embodiments, the backrest may include a rail from which two stiles extend perpendicular so that the backrest is arranged in a U-shape. As noted above, such an arrangement may allow a chair to fold (e.g., into a substantially flat configuration) and remain lightweight while retaining structural rigidity suitable for supporting a user when unfolded.

In some embodiments, a hub which connects a backrest of a chair to a central beam or one or more legs may allow a user to easily fold a backrest for storage, secure the backrest for use when the chair is unfolded, and/or adjust a recline angle of the backrest for comfort. The hub may include a housing and a rotational coupler disposed inside the housing. The rotational coupler may be rotatably coupled to the hub and may also be connected to the backrest such that the backrest is rotatable relative to the housing. The hub may also include a rotation lock, which is configured to selectively engage one or more locking regions of the rotational coupler. The rotation lock may be arranged so that rotation of the backrest relative to the housing is selectively inhibited depending on the position of the backrest and the direction of rotation of the backrest. For example, when the backrest is in a folded configuration, the rotation lock may not interfere with the rotation of the backrest to an unfolded configuration until the backrest reaches the unfolded configuration, which may correspond to the rotation lock engaging a first of the locking regions. When the backrest is in the unfolded configuration, the rotation lock may inhibit further rotation of the backrest in a recline direction (i.e., the same direction as moving the backrest from the folded configuration to the unfolded configuration). The backrest may also be inhibited from rotating toward the folded configuration. In some embodiments, the rotation lock may have a threshold force (e.g., from a biasing member such as a torsion spring) which can be overcome to rotate the backrest toward the folded configuration. The hub may also include a trigger that is operable to move the rotation lock out of engagement with the rotational coupler. The trigger may be operated so that the backrest may be reclined and/or to allow the backrest to be folded. Thus, the hub allows the backrest to be easily positioned for use in a comfortable position and allows the backrest to be easily folded for storage. In some embodiments, the trigger may be remote from the hub of the chair and linked to the chair via a trigger pin or another linkage. In other embodiments, the trigger may be disposed on the hub.

In some embodiments, a chair may include a seating surface that is suspended from at least two central beams. The seating surface may be formed of a fabric material or other flexible material suitable to support the weight of a user while having a low weight. The seating surface may include a wire frame which is coupled to a hub and/or the at least two central beams. The wire frame may define and support a perimeter of the seating surface and may inhibit fabric from bunching or otherwise forming an irregular seating surface. The wire frame may be rotatable relative to the hub and/or central beams so that the wire frame may be folded up toward the central beams for storage. Of course, any suitable seating surface may be employed, as the present disclosure is not so limited.

In some embodiments, a foldable chair may include a strap, which allows the chair to be easily carried while walking, or otherwise transporting the chair when the chair is in a folded state. The strap may be coupled at a first end to a first side of the chair and on a second end to a second side of the chair. Accordingly, the strap may be used as a single shoulder strap for carrying the chair on one side of the body. The chair may also include one or more clips which receive a central portion of the strap and retain the central portion against the chair. When the central portion of the strap is retained against the chair, the strap is configured to form two shoulder strap regions so that the chair may be worn as a backpack.

According to exemplary embodiments described herein, a foldable chair may include one or more features that improve user comfort when sitting in the chair. These additional features may also fold flat or otherwise collapse with the chair to not occupy significant additional space when the chair is in a folded state relative to a chair without the additional features. For example, a chair may include a sun shade which folds flat against a backrest of the chair for storage. Put another way, the sun shade may be moved into substantially relative parallel alignment with the back rest so as to reduce the thickness of the backrest and sun shade combination in at least one direction. As another example, the chair may include armrests that fold flat against central beams of the chair for storage. As yet another example, the chair may include pockets integrated into existing seating or backrest surfaces, so that no additional space is occupied by the pockets. Of course, any suitable features may be included or omitted from foldable chairs of exemplary embodiments described herein, as the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view of one embodiment of a chair 100 configured to move between folded and unfolded configurations. As shown in FIG. 1, the chair includes a front support formed of a first front leg 102A, a second front leg 102B, and a front base 103 and a rear support formed by a first rear leg 104A, a second rear leg 104B, and a rear base 105. Together the front support and rear support constitute the ground contacting elements of the chair. The front support and rear support are connected together through central beams 108, which in cooperation with the front support and rear support form a weight-bearing frame. The chair also includes a backrest frame having backrest stiles 106 that are coupled to the central beams via hubs 110 on each side of the chair. As will be discussed further herein, the hub allows the angle of the backrest relative to the central beams to be adjusted, whether that is to fold the backrest down for storage, unfold the backrest for use of the chair, or adjust an angle of recline of the backrest.

As shown in FIG. 1, the chair 100 includes a seating surface 120 that is suspended from the central beams 108. According to the embodiment shown, the seating surface may be formed of a fabric material, synthetic material, or other suitable flexible material appropriate for supporting the weight of a user. In some embodiments, the seating surface may include a plurality of fabric layers (e.g., two fabric layers, three fabric layers, etc.). Of course, the present disclosure is not limited in this respect, as a more rigid seating surface may be employed. The seating surface 120 also includes a wire frame 122 that preserves the outer circumferential shape (i.e., a perimeter) of the seating surface and inhibits bunching of the flexible seating surface material. In one embodiment as shown in FIG. 1, the seat surface curves downward toward the ground near a frontmost portion of the seating surface. Accordingly, the seating surface is formed in an arc from a rear of the chair toward to front of the chair.

Figure 46:
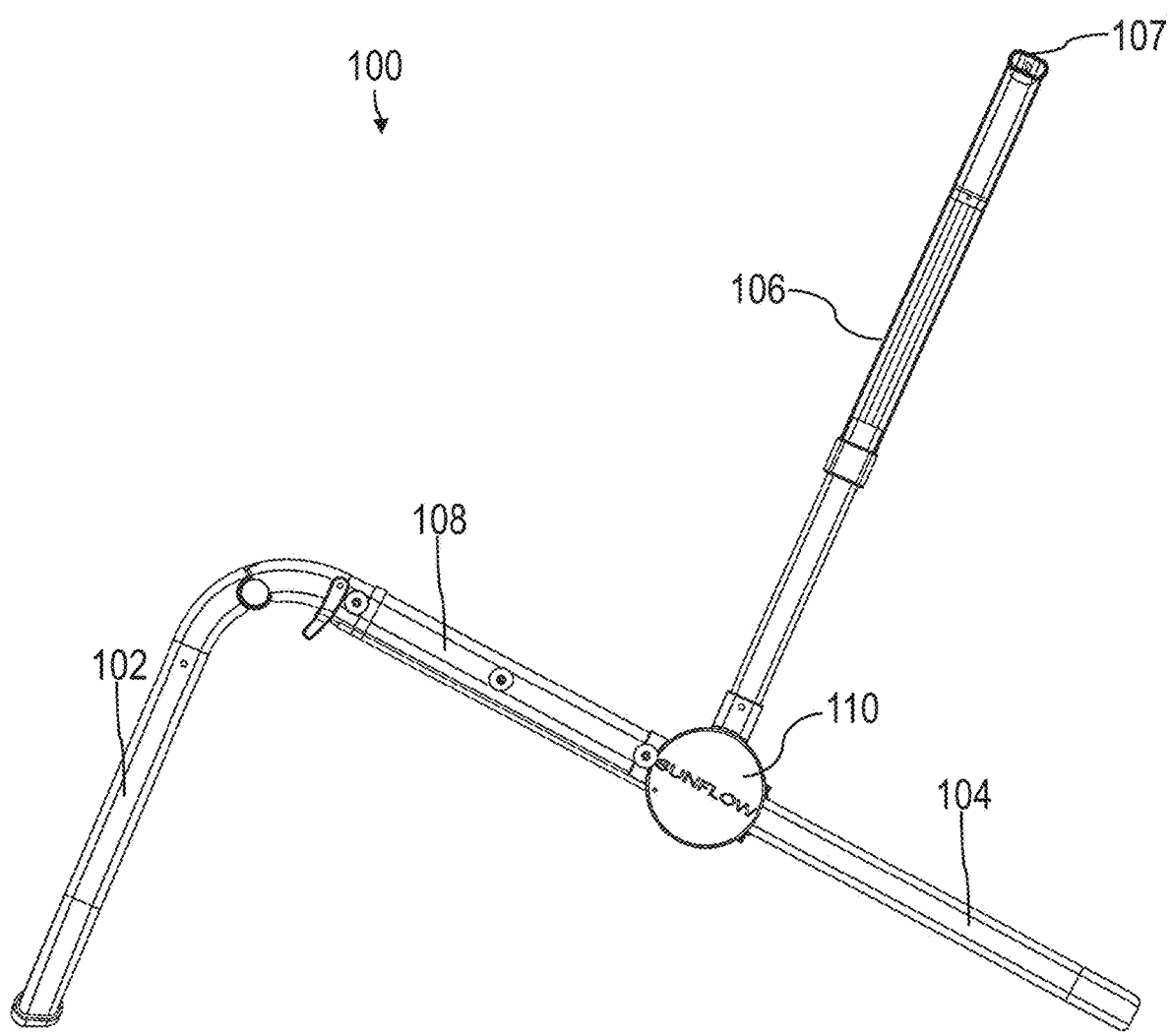
FIG. 46 is a side view of a frame of the chair of FIG. 44.

As shown in FIG. 1, the chair also includes a backrest surface material 124, which is held in tension over the backrest 106. The backrest surface material may be the same as the seating surface, and, in some embodiments, may be formed continuously with the seating surface. According to one embodiment as shown in FIG. 1, the backrest stiles may curve rearward as the stiles approach the top of the chair. In this embodiment, the backrest surface 124 corresponding curves rearward near the top of the chair to provide additional space for a user's head or, in some embodiments, a pillow. As shown in FIG. 46, however, the backrest may be generally straight near the top of the chair. According to the embodiment of FIG. 1, the seating surface includes a pocket 130 integrated into the seating surface of the material. The pocket 130 includes a waterproof zipper and may be low profile so as to not significantly increase the thickness of the seating surface when the pocket is empty.

According to one embodiment as shown in FIG. 1, the chair also includes a storage pouch 130, armrests 140, and/or a sun shade 150. In an embodiment, the storage pouch 130 connects to one of the central beams 108 and provides storage space for larger articles such as a water bottle 132 or other beverage containers. The storage pouch may be easily detached from the central beams for separate storage or storage in a pocket or pouch of the chair. The armrests 140 are also coupled to the central beams 108 and are configured to fold to the position shown to support the weight of a user's arms. In one embodiment, the armrests 140 may be released (e.g., by moving a switch, pulling a pin, etc.) and folded down to be parallel with the central beams for storage. It should be appreciated that armrests need not be included, as in the chair shown in FIG. 46. In one embodiment, the sun shade 150 is rotatably coupled to the backrest 106 and is held in place with a friction lock. That is, a user may move the sun shade when a force greater than a threshold force is applied to the sun shade, but the sun shade will remain stationary when no external force is applied. In one embodiment, the sun shade may fold flat against the backrest surface material 124 for storage.

According one embodiment as shown in FIG. 1, one or more surfaces of the chair 100 may include a high-friction material suitable to increase the grip of the user when operating the chair. For example, the rear base 105 and front base 103 may include a rubber or silicone pad or covering (for example, see FIG. 24) which increases the coefficient of friction between those elements and a user's foot or shoe. Such an arrangement may be desirable when folding or unfolding the chair, as the chair is less likely to slip when being manipulated. Any suitable high friction material may be employed, including, but not limited to grip tape, abrasives, etc.

Figure 2:
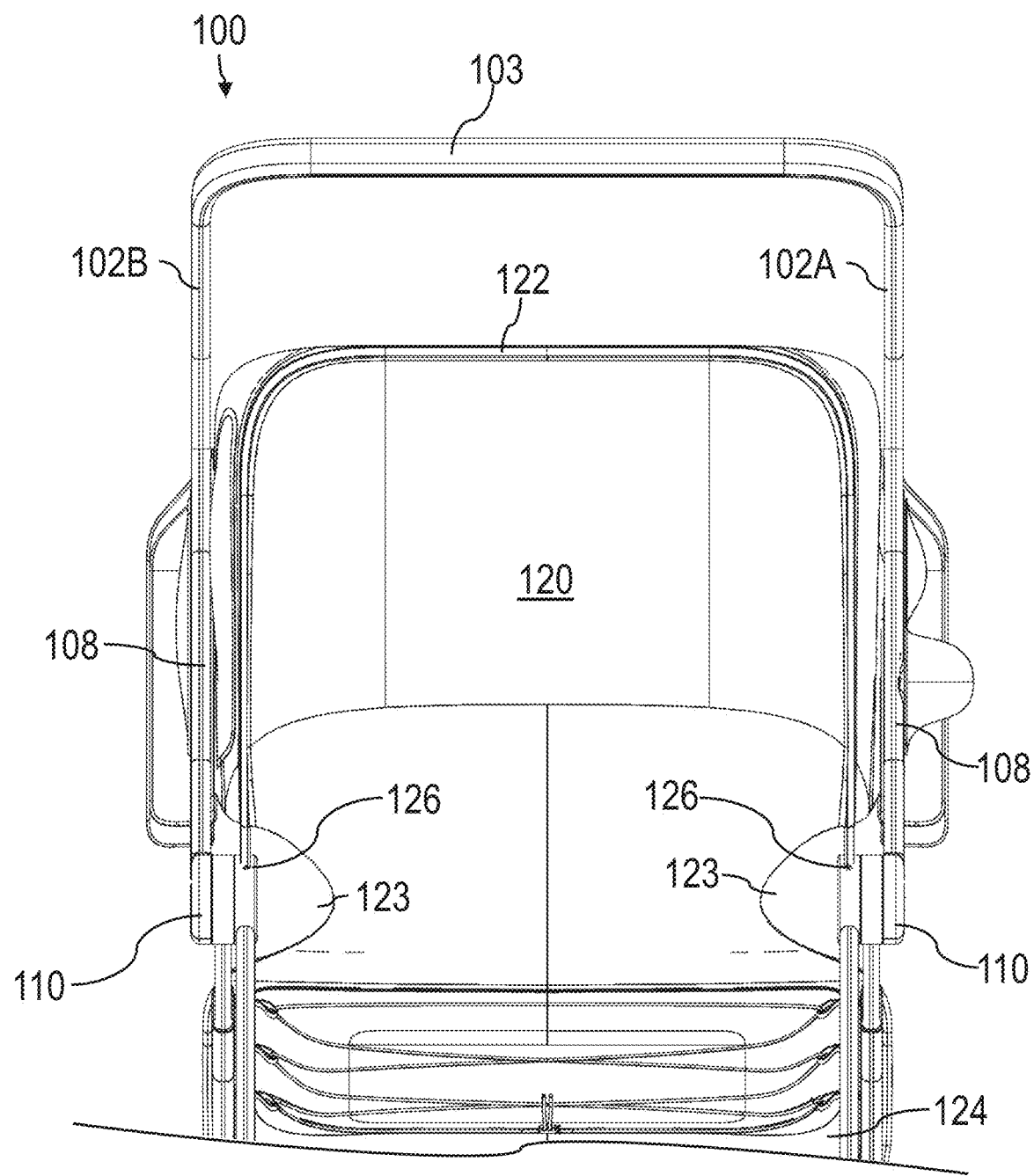
FIG. 2 is a bottom view of the chair of FIG. 1.

FIG. 2 is a bottom view of the chair 100 of FIG. 1 showing one embodiment of a seating surface 120 and a wire frame 122. According to the embodiment shown in FIG. 2, the seating surface 120 is formed of a fabric or otherwise flexible material and is supported at least partially by central beams 108. In some embodiments, the seating surface may be formed of multiple layers of material to increase durability and/or strength of the seating surface. The shape of the seating surface is at least partially defined by the wire frame 122, which is attached to the seating surface around a perimeter of the seating surface. The wire frame 122 is coupled to the hubs 110 via wire frame mounts 126. The wire frame is semi-rigid, and ensures the shape of the seating surface remains consistent (e.g., smooth, flat, etc.) without any bunching of the seating surface material. In one embodiment as shown in FIG. 2, the seating surface may be continuously formed with a backrest surface material 124. The seating surface may include two semi-circular cutouts 123 disposed between the seating surface 120 and the backrest surface 124 which transition the seating surface to the backrest surface. According to one embodiment the seating surface 120 and wire frame 122 are formed in a rounded rectangle shape, with curved corners being curved in a manner corresponding to a curve between the front base 103 and front legs 102A, 102B.

Figure 3:
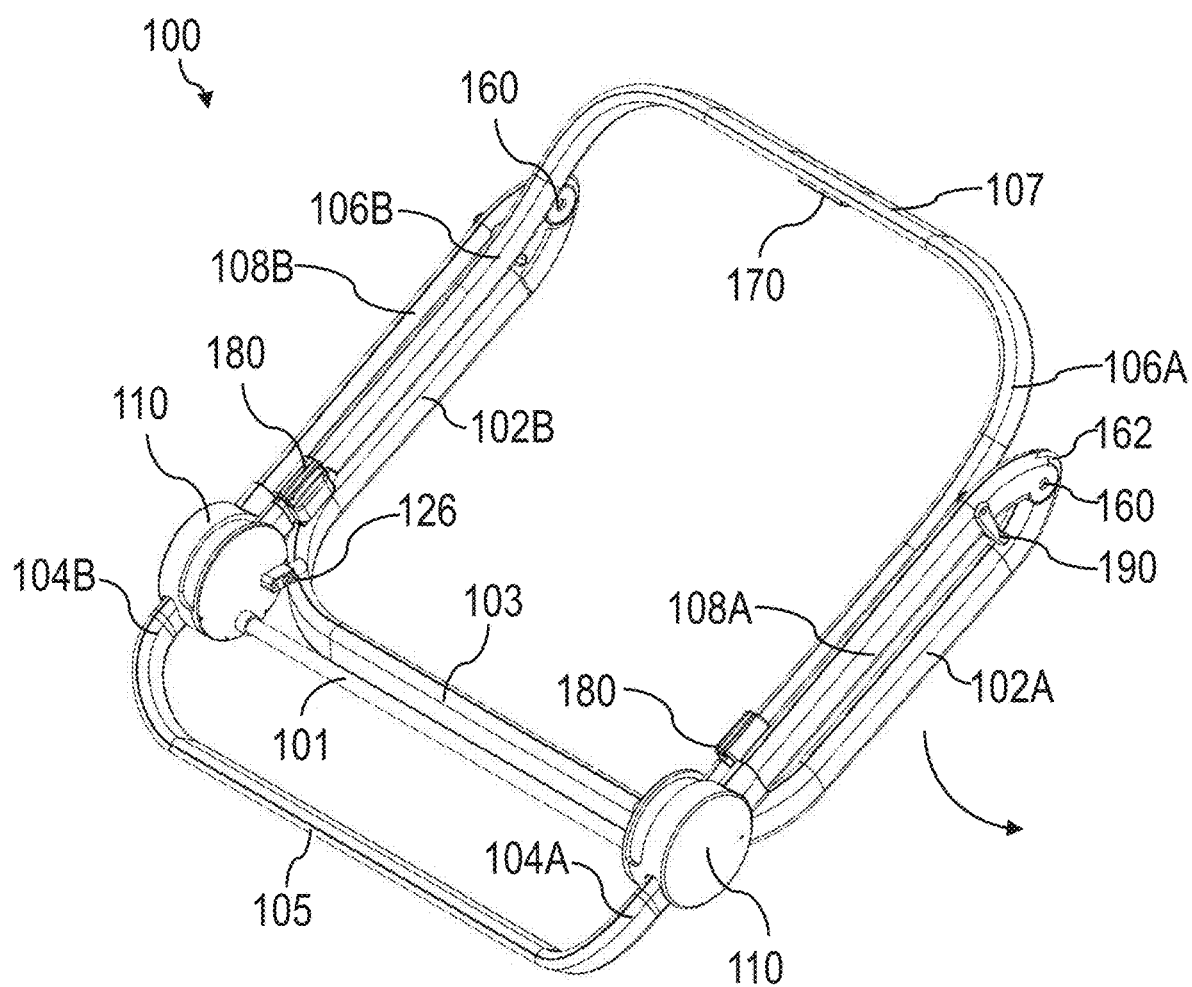
FIG. 3 is a perspective view of another embodiment of a chair in a first configuration.

FIG. 3 is a perspective view of another embodiment of a chair 100 in a first (e.g., folded) configuration. The chair includes a front support that includes a first front leg 102A, a second front leg 102B, and a front base 103. The chair also includes a rear support formed by a first rear leg 104A, a second rear leg 104B, and a rear base 105. As shown in FIG. 2, each of the front support and rear support are formed in a U-shape, with the legs extending in a direction perpendicular to the bases. The front support and rear support are connected to one another via a first central beam 108A and a second central beam 108B. In particular, the first front leg 102A is rotatably coupled to the first central beam 108A at a hinge 160. Likewise, the second front leg 102B is rotatably coupled to the second central beam 108B at a hinge 160, so that the whole of the front support is rotatable about the hinges 160. The first rear leg 104A of the rear support is coaxial with and slidably disposed in the first central beam 108A and the second rear leg 104B is coaxial with and slidably disposed in the second central beam. Accordingly, the rear support is configured to translate toward or away from the central beams as the first and second rear legs slide into or out of the central beams, respectively. In the configuration shown in FIG. 3, each of the first and second front legs, as well as the first and second rear legs, are substantially parallel to the first and second central beams. Accordingly, the chair occupies minimal space in directions parallel to the plane defined by the first and second central beams when folded. Such an arrangement may be desirable for storage or portability.

As shown in FIG. 3, in one embodiment the chair also includes a backrest for supporting the back of a user when the chair is in an unfolded configuration. A first stile 106A, a second stile 106B, and a backspan or backrest rail 107 form the backrest. The backrest is coupled to the first and second central beams 108A, 108B via two hubs 110 connected to each of the central beams. The hubs 110 allow the backrest to rotate relative to the first and second central beams so that the backrest may be unfolded and/or reclined. The backrest also includes an actuator 170 and a pin actuator 180 which are configured to selectively allow inner stiles of the first and second stiles to slide into or out of outer stiles of the first 106A and second 106B stiles so that the overall length of the backrest can be increased. Such an arrangement allows the chair to have a lesser overall length when in the folded configuration shown for improved portability or storage. Embodiments of an actuator and pin actuator are described further with reference to FIGS. 14-23.

According to one embodiment as shown in FIG. 3, the chair 100 also includes a crossbeam or crossbeam 101 and a seating surface wire frame mount 126. The crossbeam 101 couples the hubs 110 and maintains their relative positioning. Accordingly, the crossbeam increases the rigidity of the chair under load. The seating surface wire frame mounts are configured to support a wire frame disposed in a flexible seating surface. As noted above, a wire frame may be employed to inhibit fabric from bunching or otherwise forming an irregular seating surface when the chair is unfolded.

In FIG. 3, the chair is in a folded configuration with each of the primary structural elements (i.e., the front support, rear support, and backrest) aligned with each other in parallel planes. The first rear leg 104A and second rear leg 104B of the rear support are primarily disposed in the first central beam 108A and second central beam 108B, so that the overall length of the beams and rear support legs are reduced. The front support 102A, 102B, 103 is in a folded rotational position having been rotated about hinges until substantially parallel with the first and second central beam. Thus, in the configuration shown in FIG. 3, the chair is folded into a compact state for transport or storage.

Figure 4:
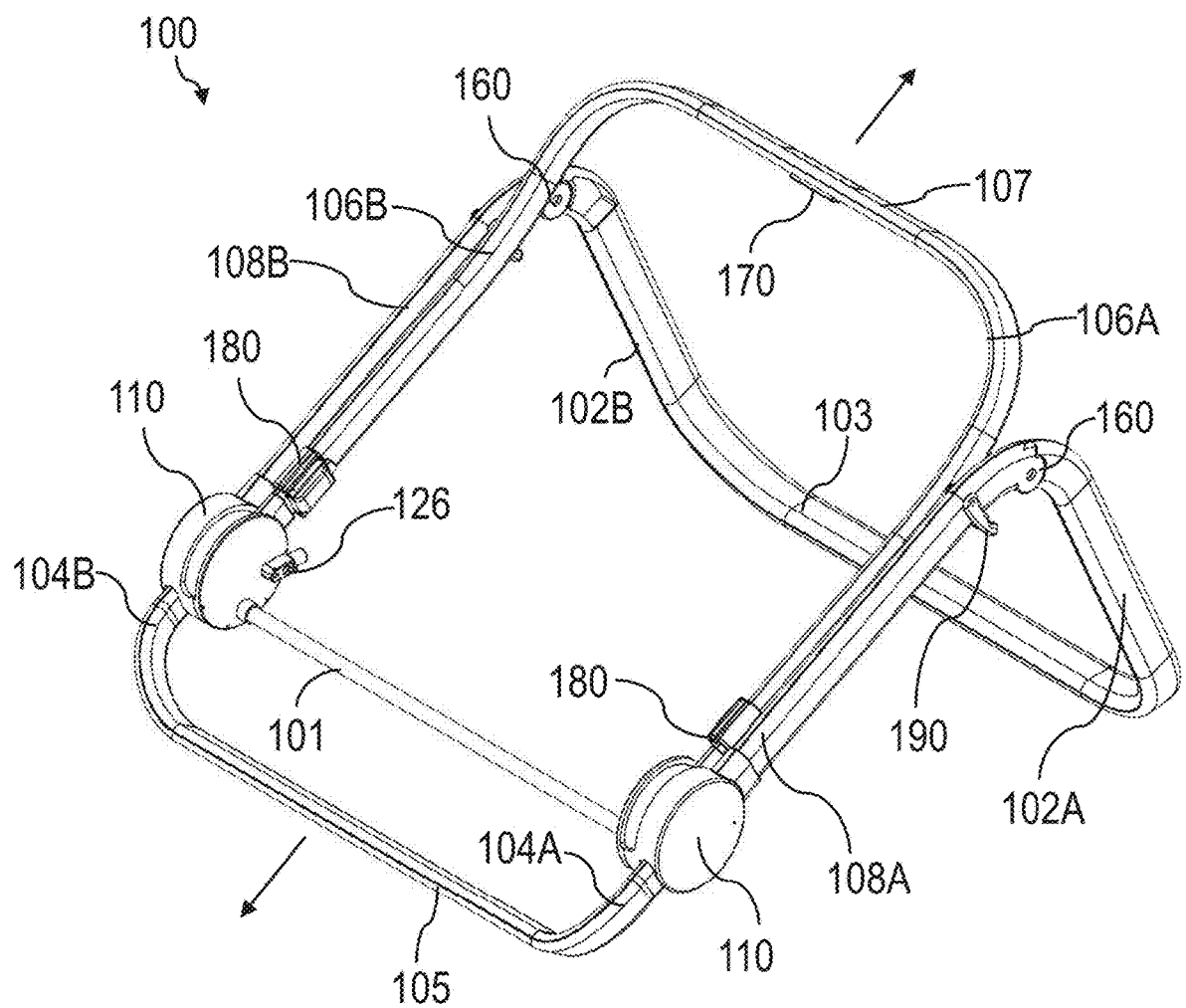
FIG. 4 is a perspective view of the chair of FIG. 2 in a second configuration.

FIG. 4 is a perspective view of the chair 100 of FIG. 3 in a second configuration. As shown in FIG. 3, the first front leg 102A, second front leg 102B, and front base 103 have been rotated about hinges 160 so that the front support is inclined (i.e., non-parallel) relative to the first and second central beams 108A, 108B. According to the embodiment of FIG. 3, the hinges 160 may be friction hinges configured to maintain the position of the first and second front legs 102A, 102B when no external force from a user is applied to the legs. That is, the hinge may have sufficient friction to inhibit the front support from rotating about the hinges 160 under the effect of gravity, but a user may apply a force to rotate the front support to the position shown in FIG. 4 (e.g., in the direction shown by the arrow in FIG. 3). In other embodiments, the hinges 160 may allow free rotation of the first and second front legs 102A, 102B so that the front support may rotate to the position shown in FIG. 3 under the effect of gravity. In such an embodiment, a latch, strap, or other arrangement may be employed to retain the first and second front legs 102A, 102B in the folded configuration shown in FIG. 3. Of course, any suitable arrangement may be employed to move the front support to the position shown in FIG. 4 from the position shown in FIG. 3, including, but not limited to, biasing members, latches, friction hinges, etc., as present disclosure is not so limited.

From the configuration shown in FIG. 4, the chair 100 may continue to be moved to the unfolded configuration by sliding the first 104A and second rear legs 104B of the rear support out of the first central beam 108A and second central beam 108B, respectively. Additionally, the first 106A and second 106B stiles of the backrest may be extended. A user may perform both of these actions in series or simultaneously by applying force to the rear base 105 of the rear support and rail 107 of the backrest in the direction shown by the arrows. According to the embodiment of FIG. 3, the user may depress or otherwise operate the actuator 170 as the force is applied so that the inner stiles may slide out of the outer stiles of the first stile 106A and second stile 106B. It should be noted that while the front support 102 is rotated to the position shown in FIG. 4 before the rear support and backrest are unfolded, the chair may be unfolded in any suitable series of steps. That is, in some embodiments, the rear support and/or backrest may be unfolded to the configuration shown in FIG. 4 before the front support is rotated about hinges 160.

Figure 5:
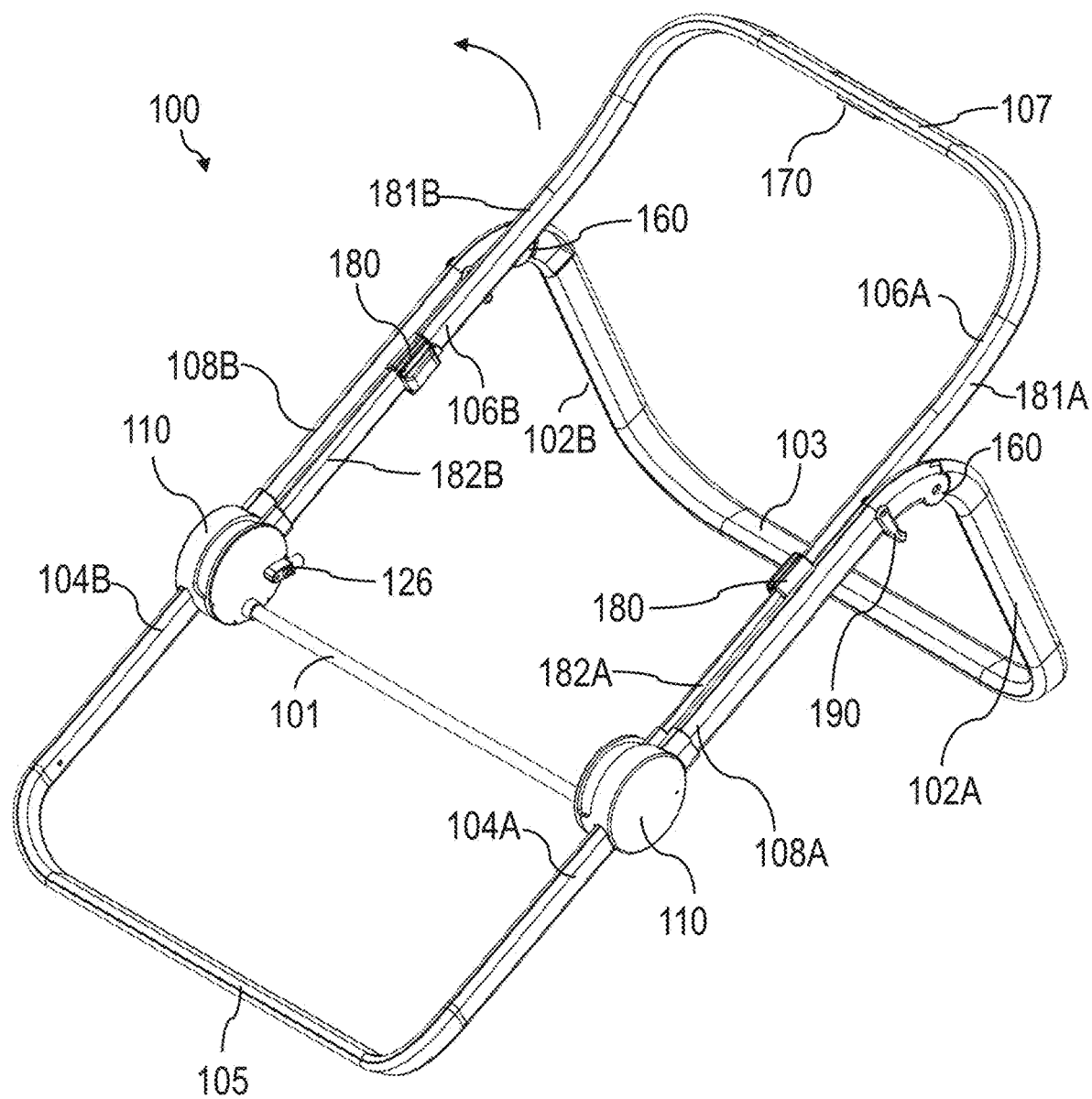
FIG. 5 is a perspective view of the chair of FIG. 2 in a third configuration.

FIG. 5 is a perspective view of the chair 100 of FIG. 3 in a third configuration. As shown in FIG. 5, the rear support and backrest have been unfolded so that the overall length of the chair in the direction of the first central beam 108A and second central beam 108B is increased. In particular, the first rear leg 104A and second rear leg 104B have been slid out of the first central beam 108A and second central beam 108B, respectively. Likewise, a first inner stile 182A and a second inner stile 182B have been slid out of the outer stile 181A of the first stile 106A and the outer stile 181B of the second stile 106B so that the overall length of the rail is increased relative to FIG. 4. In the configuration shown in FIG. 5, the pin actuator 180 may secure the inner stiles 182A, 182B relative to the first and second outer stiles 181A, 181B so that the length is maintained until a user operates the actuator 170. From the configuration shown in FIG. 5, the backrest may be rotated about hubs 110 to the unfolded configuration shown in FIG. 6.

Figure 6:
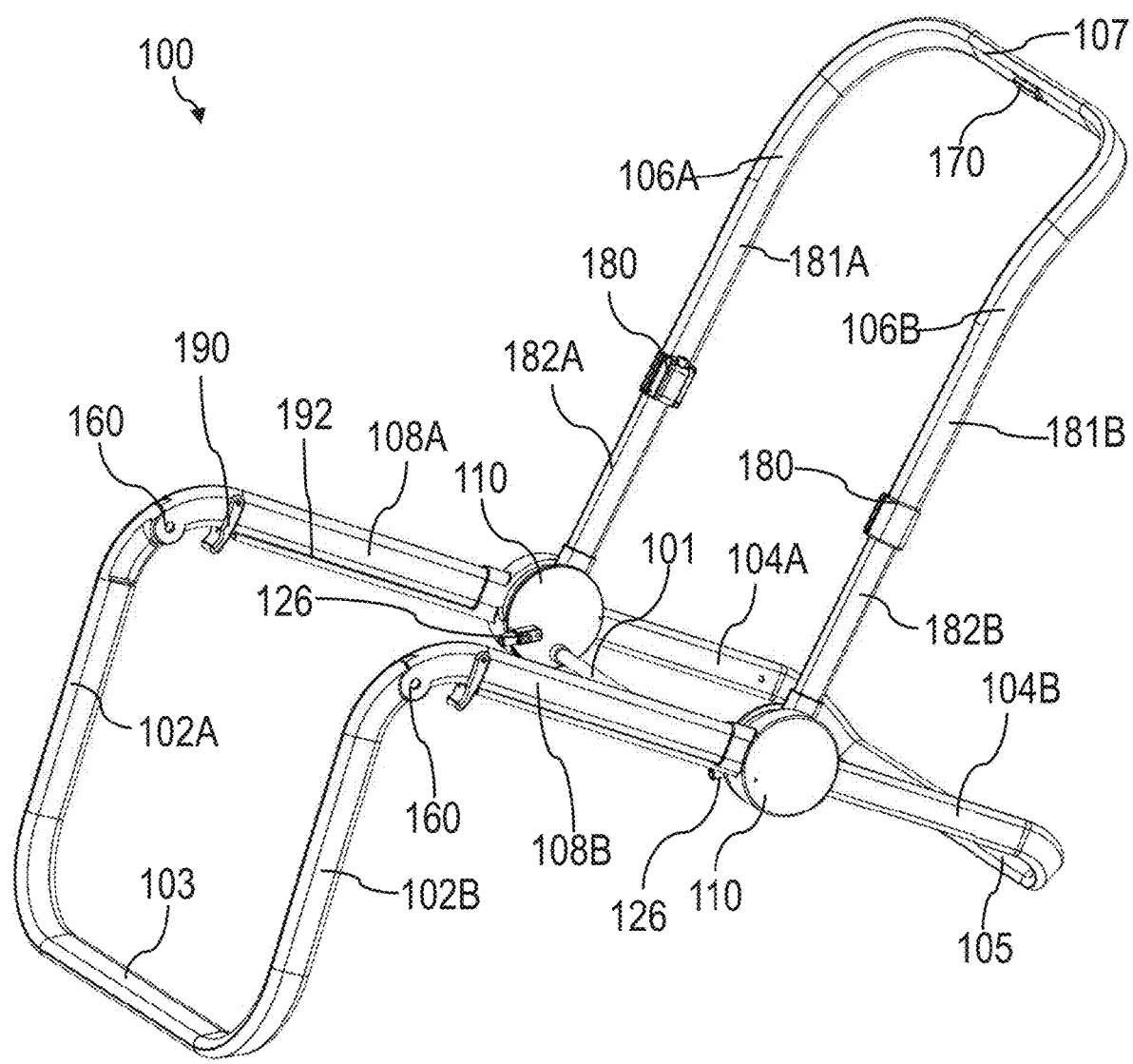
FIG. 6 is a perspective view of the chair of FIG. 2 in a fourth configuration.

FIG. 6 is a perspective view of the chair of FIG. 3 in a fourth (e.g., unfolded) configuration. In the configuration shown in FIG. 6, the chair is unfolded and may be used normally as a chair when a seating surface is installed (for example, see FIG. 1). For example, seating surface may be suspended from the first central beam 108A and second central beam 108B and a seating surface wire frame may be coupled to hubs with wire frame mounts 126. According to the embodiment shown in FIG. 6, when the first and second stiles 106A, 106B are rotated about the hubs 110, a pin disposed in the hub may secure the first rear leg 104A and second rear leg 104B of the rear support relative to the first central beam 108A and the second central beam 108B. The backrest may also be secured at the relative angle shown by the hubs 110. Accordingly, in the configuration shown in FIG. 6, the chair 100 may support the weight of a user seated on a seating surface and backrest surface material of the chair. According to one embodiment as shown in FIG. 5, the angle of the backrest may be selectively controlled with trigger 190 and trigger pin 192 which are operatively coupled to the hubs to allow a user to change the angle of the backrest while seated. The functionality of the triggers and hubs will be discussed further with reference to FIGS. 12A-12D.

Figure 7A:
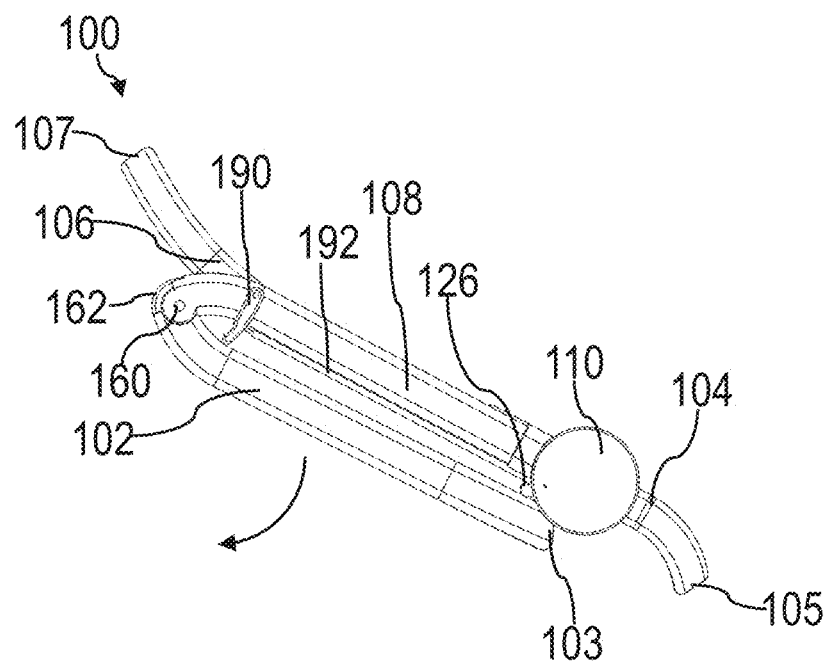
FIG. 7A is a side view of the chair of FIG. 2 in the first configuration.
Figure 7B:
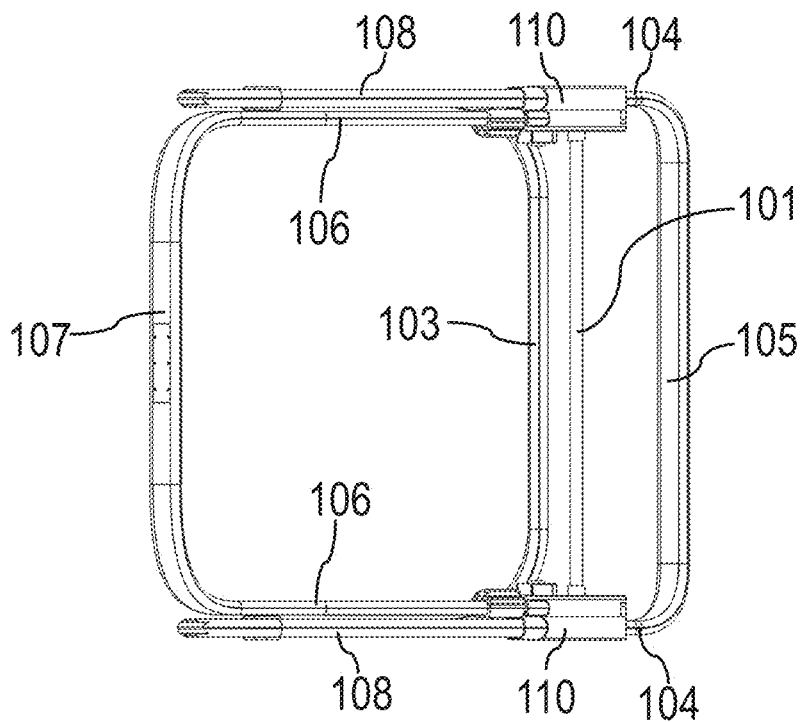
FIG. 7B is a top view of the chair of FIG. 2 in the first configuration.

FIGS. 7A-7B are a first side view and top view, respectively, of the chair 100 of FIG. 3 in the first configuration. As shown in FIGS. 7A-7B, each of front legs 102, rear legs 104, central beams 108, and stiles 106 are substantially parallel to one another when the chair is in the folded configuration. From the configuration shown in FIGS. 7A-7B, the front legs 102 may be rotated about hinge 160 in the direction shown by the arrow to begin the unfolding process. Alternatively, forces may be applied to the rear base 105 and rail 107 to slide the rear support legs 104 out of the central beams 108. Likewise, the outer stiles may be slid relative to inner stiles (for example, see FIGS. 9A-9B) so that the backrest is lengthened.

As shown in FIGS. 7A-7B, the chair 100 includes rounded ends 162 that are attached to each of the front support legs 102. The rounded ends occupy a semi-circular space around the hinge 160. In particular, the rounded end occupies the void created when the front support legs 102 are rotated relative to the hinge 160 so that the front support legs are in the folded configuration show in FIGS. 7A-7B. The rounded ends create a substantially continuous surface (i.e., a curve) between the central beams 108 and the front support legs 102. Such an arrangement reduces the likelihood of foreign objects being inserted between the central beams and the front support legs while the front support legs are folded which could interfere with operation of the chair. One embodiment of rounded ends is discussed in further detail with reference to FIGS. 29A-29B. In some embodiments, the hinge 160 may be reinforced with an optional metal rib 162. That is, at least one side of the hinge interface may be formed of a metal (e.g., sheet metal) rib overmolded with plastic. Such an arrangement may increase the rigidity and strength of the hinge. Of course, any suitable material and manufacturing method may be employed to form the hinge 160, as the present disclosure is not so limited.

Figure 8A:
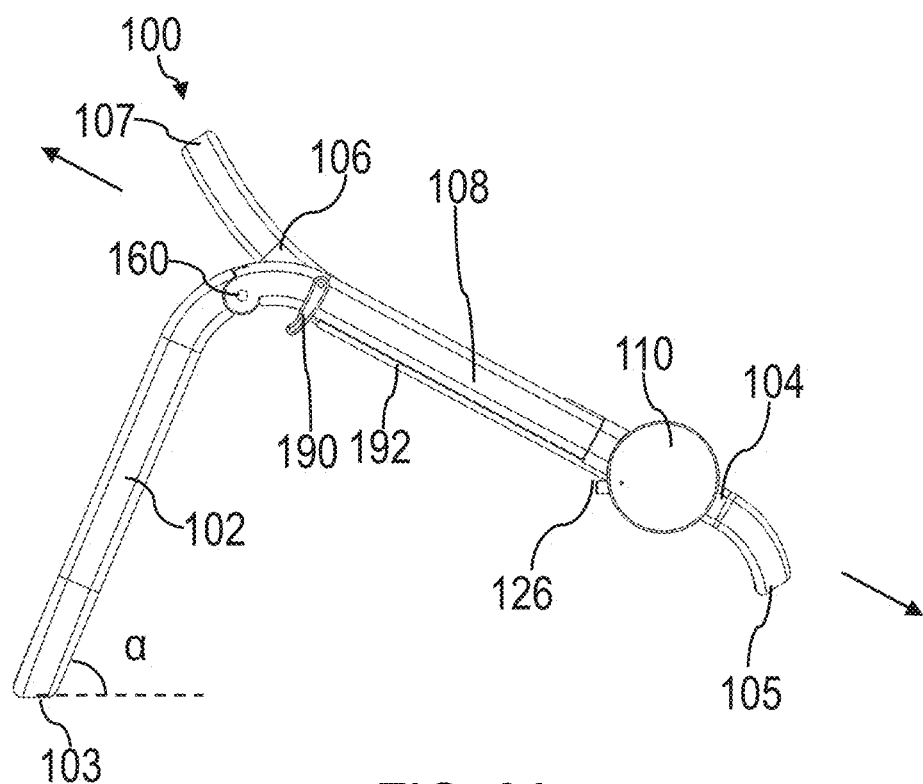
FIG. 8A is a side view of the chair of FIG. 2 in the second configuration.
Figure 8B:
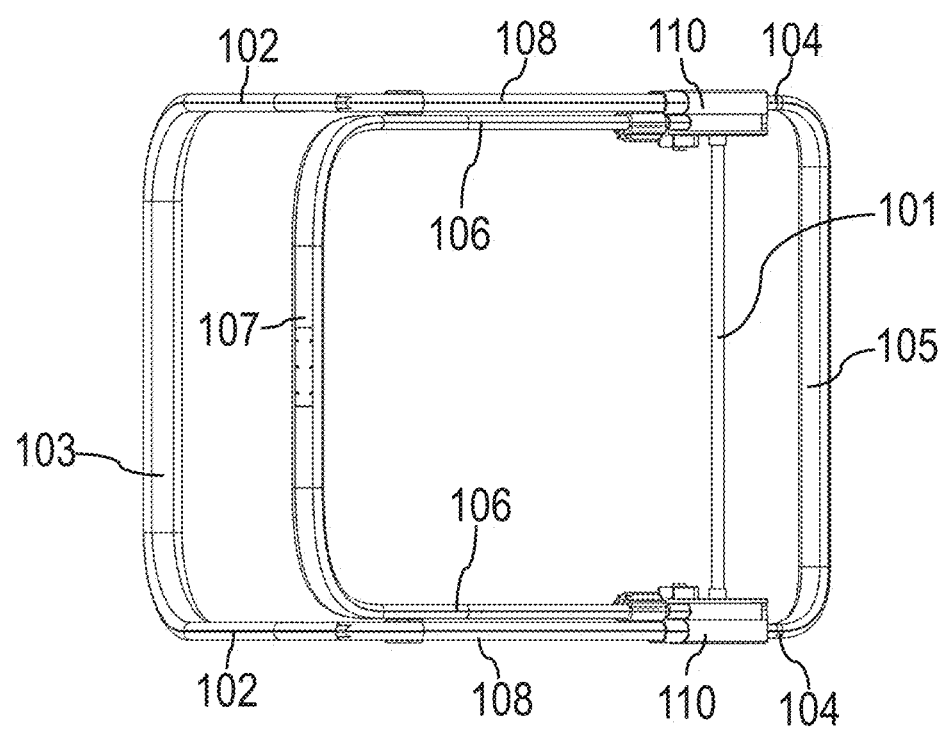
FIG. 8B is a top view of the chair of FIG. 2 in the second configuration.

FIGS. 8A-8B are a first side view and top view, respectively, of the chair 100 of FIG. 3 in the second configuration. As shown in FIGS. 8A-8B, the front support legs 102 have been rotated out relative to hinge 160 so that the front support legs are inclined relative to the central beams 108. From the configuration shown in FIGS. 8A-8B, force may be applied in the direction shown by the arrows to extend the stiles 106 and the rear support legs 104.

As shown in FIGS. 8A-8B, the front base 103 is flat relative to the ground (i.e., parallel to a horizontal plane). Accordingly, the front support legs are inclined relative to the front base by an angle, a, which is less than 90 degrees. In the case of a flat tube like that employed in the embodiment shown in FIG. 8A, the flat front base 103 is beneficial to provide a user seated in the chair with a flat surface on which to place their feet. Additionally, the greater contact surface with the ground is useful to improve loading and resiliency of the front support legs. In some embodiments, the angle of inclination of the front support legs relative to the front base 103 may be less than 80 degrees, 75 degrees, 60 degrees, 50 degrees, 45 degrees, and/or any other suitable angle. Of course, while the front base 103 is shown inclined at an angle of less than 90 degrees in the embodiment of FIGS. 8A-8B, the base may be orthogonal to the front support legs or have an angle greater than 90 degrees, as the present disclosure is not so limited. In one embodiment, the front base 103 may be non-parallel with the ground. In such an embodiment, the front base 103 may include a covering or shroud that provides a flat surface (e.g., a surface parallel relative to a horizontal plane) on the top of the front base to provide a place for a user to place their feet. Of course, any suitable tube shape, inclination of tube, and/or front base covering may be employed, as the present disclosure is not so limited.

Figure 9A:
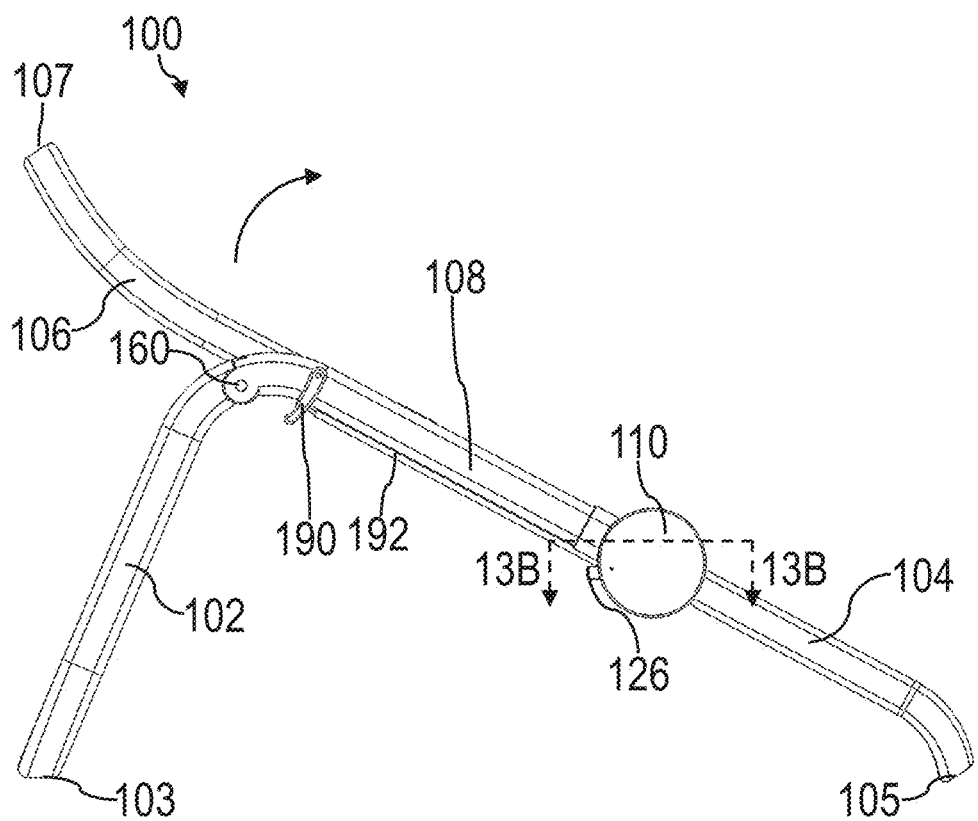
FIG. 9A is a side view of the chair of FIG. 2 in the third configuration.
Figure 9B:
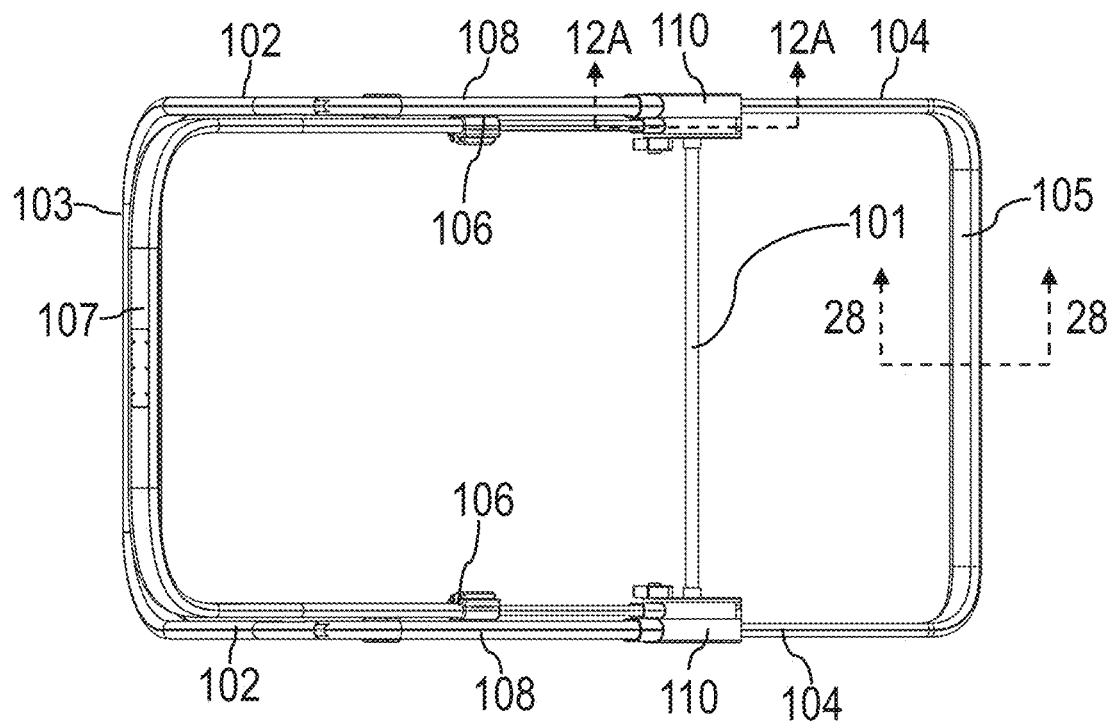
FIG. 9B is a top view of the chair of FIG. 2 in the third configuration.

FIGS. 9A-9B are a first side view and a top view, respectively, of the chair 100 of FIG. 3 in the third configuration. As shown in FIGS. 9A-9B, the stiles 106 and rear support legs 104 have been extended so that the overall length of the chair along a longitudinal axis of the central beams 108 has been increased relative to the configuration shown in FIGS. 8A-8B. From the state shown in FIGS.

9A-9B, the backrest may be rotated relative to the hubs 110 in the direction of the arrow to complete the unfolding of the chair. According to the embodiment of FIGS. 9A-9B, a user does not need to depress any button or switch to rotate the backrest relative to the hub, and can do so freely until the hub 110 locks the backrest in a first rotational position. Rotating the backrest relative to the hub will be described further below with reference to FIGS. 12A-12D.

Figure 10A:
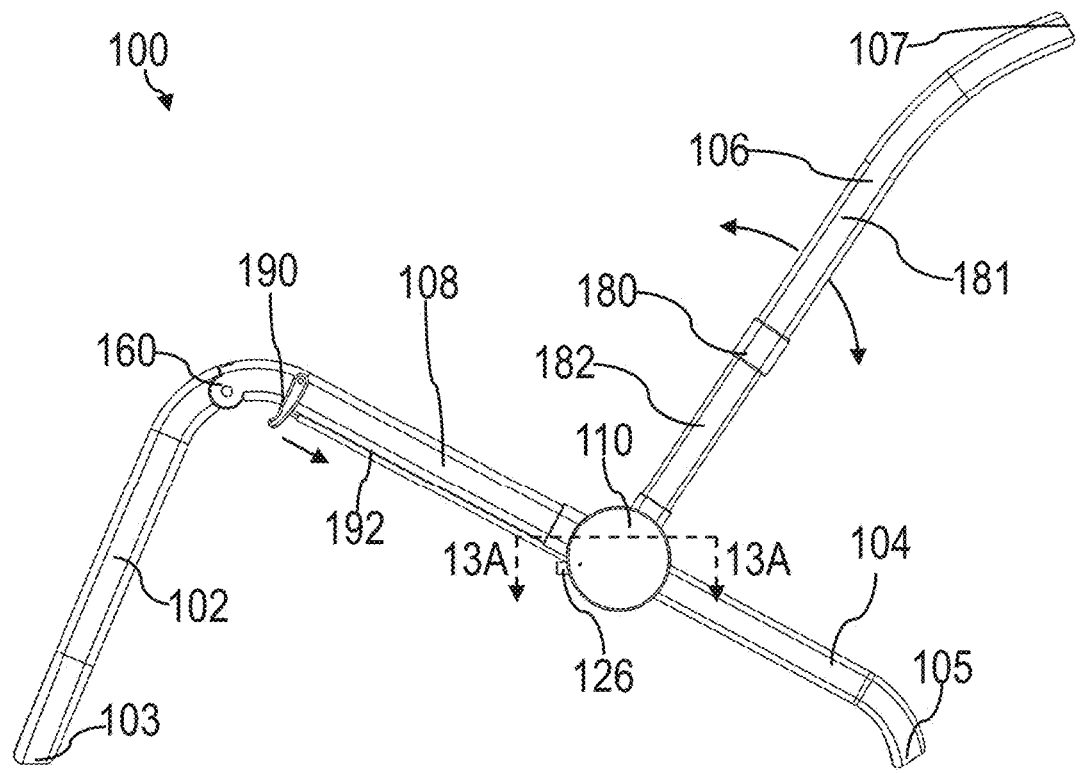
FIG. 10A is a side view of the chair of FIG. 2 in the fourth configuration.
Figure 10B:
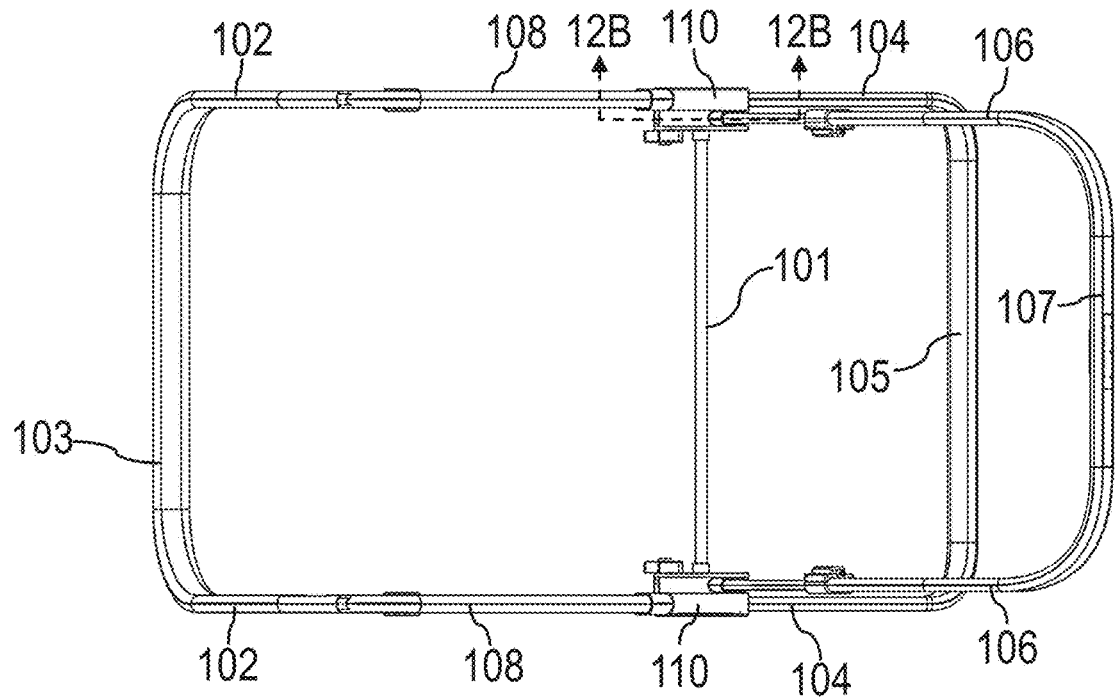
FIG. 10B is a top view of the chair of FIG. 2 in the fourth configuration.

FIGS. 10A-10B are a first side view and top view, respectively, of the chair 100 of FIG. 3 in the fourth configuration. As shown in FIGS. 10A-10B, the stiles 106, inner stiles 182, and rail 107 have been rotated relative to the hubs 110 and locked in a first rotational position. That is, when the backrest is in the position shown in FIGS. 10A-10B, the hubs releasably lock the inner stiles 182 to inhibit further rotation in a direction toward the rear support legs without first operating a trigger 190. However, according to the embodiment of FIGS. 10A-10B, a user may rotate the backrest in a direction toward the central beams 108 without operating the trigger. In this direction, the hub may hold the backrest in place with a biasing force that can be overcome with sufficient force application. To rotate the backrest toward the rear support legs 104, the trigger 190 may be pulled in the direction shown by the arrow to move trigger pin 192 to unlock the hub 110. The backrest may then be rotated toward the rear support legs freely. In some embodiments, the hub 110 may include a torsion spring or other biasing element configured to bias the backrest toward the folded configuration where the stiles 106 are parallel with the central beams 108 (for example, see FIGS. 12A-12D).

Figure 11A:
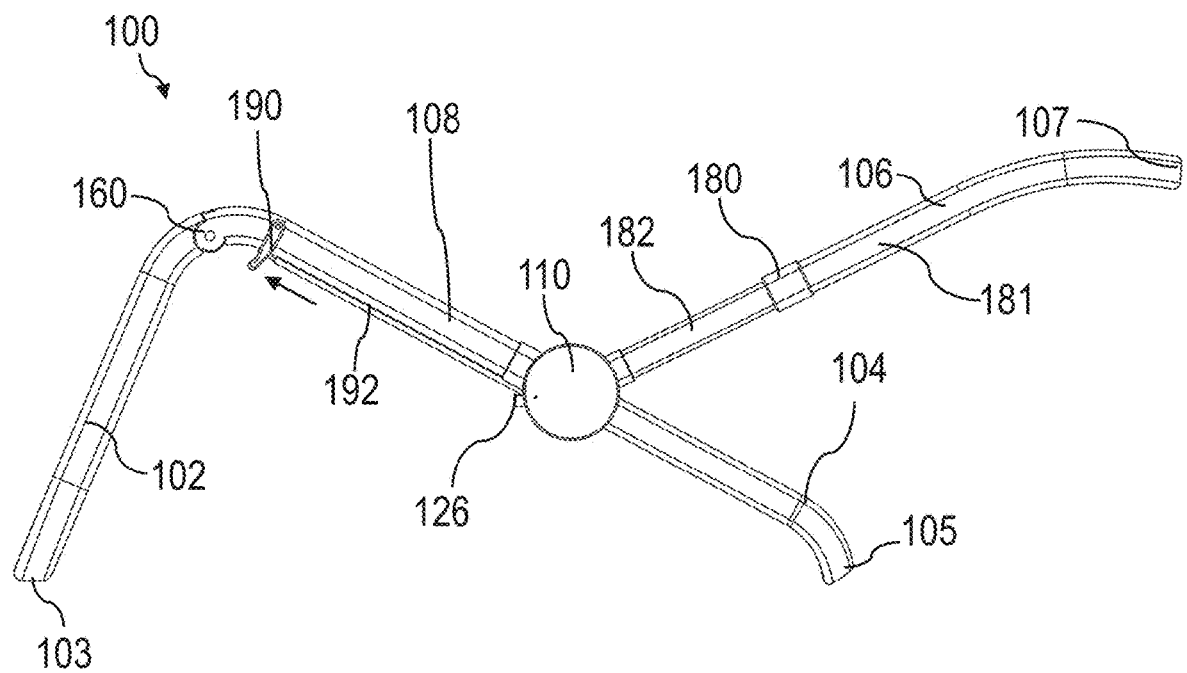
FIG. 11A is a side view of the chair of FIG. 2 in a fifth configuration.
Figure 11B:
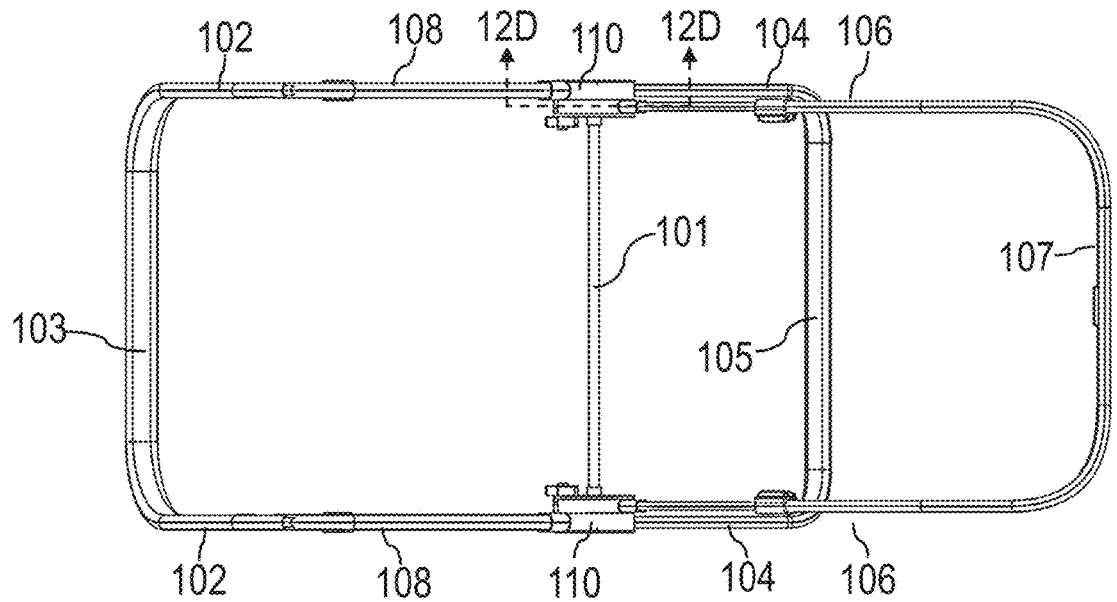
FIG. 11B is a top view of the chair of FIG. 2 in a fifth configuration.

FIGS. 11A-11B are a first side view and top view, respectively, of the chair of FIG. 3 in a fifth configuration with the backrest in a reclined position. As noted above, the trigger 190 may be operated to unlock the hub 110 to allow the inner stiles 182 and stiles 106 to rotate toward the rear support legs 104. When a desired inclination is reached, the trigger may be released to re-lock the hub 110 and inhibit rotation of the backrest. When the trigger 190 and trigger pin 192 move in the direction shown by the arrow (e.g., return to an original position), the stiles 106 and inner stiles 182 may be inhibited from further rotation toward the rear support legs 104, allowing a seated user's weight to be supported by the backrest. In some embodiments, the trigger and trigger pin may be biased to move in the direction shown by the arrow with a torsion spring, compression spring, tension spring, or other suitable biasing member. From the configuration shown in FIGS. 11A-11B, the process shown through FIGS. 7A-11B may be reversed in order to move the chair to a folded configuration. In particular, the stiles 106, and inner stiles 182 may be rotated in a direction toward the central beams 108 to initiate the folding process. When the backrest is parallel with the central beams, the inner stiles 182 may be slid into the outer stiles 181 of the stiles 106, and the rear support legs 104 may be slid into the central support beams. Finally, the front support legs 102 may be folded (i.e., rotated about hinge 160) until they are substantially parallel with the central beams 108.

FIGS. 12A-12D depict various cross-sectional views of one embodiment of a hub 110 of the chair of FIG. 3 as the chair is moved through the configurations shown and discussed with reference to FIGS. 7A-11B. In the embodiment shown in FIGS. 12A-12D, the hub is configured to selectively allow rotation of the backrest relative to the hub and translation of the rear support relative to central beams. However, the hub of FIGS. 12A-12D may be employed between any suitable tubes or beams to control the relative angles and translation of said beams, as the present disclosure is not so limited.

Figure 12A:
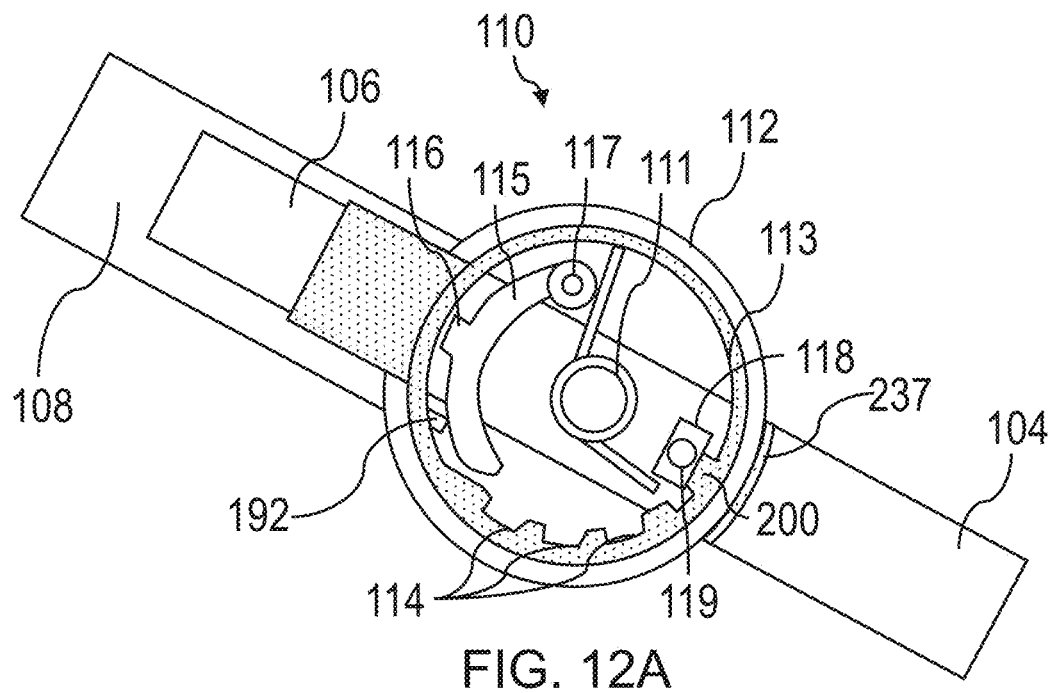
FIG. 12A is a side cross-sectional view of one embodiment of a hub of the chair of FIG. 9B taken along line 12A-12A.

FIG. 12A is a side cross-sectional view of one embodiment of a hub 110 of the chair of FIG. 3 taken along line 12A-12A of FIG. 9B. The hub allows a backrest of the chair to be selectively rotated relative to the hub for unfolding and folding of the chair. Additionally, the hub controls the ability of rear support legs 104 to be slid into or out of central beams 108 of the chair, so that force may be transmitted through the central beams to the rear support legs when the chair is in an unfolded configuration. As shown in FIG. 12A, the hub includes a housing 112 and a rotational coupler 113 disposed in the housing and configured to rotate relative to the housing. The rotational coupler supports stiles 106 (or in some embodiments, inner stiles) so that the stiles are rotatable about the housing. The rotational coupler includes a plurality of locking regions 114 that are formed as notches or teeth in intervals about a portion of the circumference of the rotational coupler. Each of the locking regions functions as a set point for a particular angle of the rotational coupler where rotation of the rotational coupler is inhibited. The plurality of locking regions are configured to be engaged by a rotation lock 115, which is also rotatably mounted in the housing 112. In particular, according to the embodiment of FIG. 12A, the rotation lock includes a projection 116 sized and shaped to fit in each of the locking regions. The rotation lock rotates about pin 117, which may include a torsion spring or other biasing element that urges the rotation lock into engagement with the rotational coupler 113. As will be discussed further with reference to FIGS. 12B-12D, the rotation lock may be selectively rotated into or out of engagement with the plurality of locking regions 114 to secure or unsecure the stiles 106, respectively, to allow them to rotate when desired. A trigger coupled to trigger pin 192 may be operated by a user to move the rotation lock out of engagement with the rotational coupler.

According to the embodiment of FIG. 12A, the hub 110 also selectively locks the rear support leg 104 relative to central beam 108 so that the rear support leg may be kept in an extended position when the chair is in an unfolded configuration. Accordingly, the hub includes a pin housing 118 that houses a blocking pin 119 that moves between a blocking position and an unblocking position. In the blocking position, the blocking pin 119 is configured to engage the rear support leg 104 (e.g., through a hole) to inhibit sliding of the rear support leg relative to the central beam 108. In the unblocking position, the blocking pin 119 clears the rear support leg to allow the relative sliding movement of the rear support leg. According to the embodiment of FIG. 12A, the blocking pin is biased to the blocking position and is moved to the blocking position by a pin camming element 200 when the stile 106 is parallel to the central beam 108. The specific functionality of the blocking pin and pin camming element is discussed further with reference to FIGS. 13A-13B.

In the configuration shown in FIG. 12A, the rotation lock 115 and rotation lock projection 116 are not engaged with any of the locking regions 114. Accordingly, the rotational coupler 113 is able to rotate relative to the housing 112 when the stile 106 is parallel to the central beam 108 so that the backrest may be easily unfolded without operating any switches or latches. Of course, in other embodiments a latch or the rotation lock may secure the stile 106 in the folded configuration, as the present disclosure is not so limited.

In one embodiment as shown in FIG. 12A, the hub 110 may include a torsion spring 111 or other biasing member coupled to the rotational coupler 113 and configured to bias the rotational coupler to toward a folded position when the stile 106 is parallel with the central beam 108. The biasing force provided by the torsion spring may allow the stile 106 to be folded without application of significant external force from a user. That is, release or movement of the rotation lock 115 out of engagement with the rotational coupler may be sufficient to allow the backrest stile 106 to rotate to a parallel position with the central beam 108. The torsion spring may also compensate for any effects of a user's weight on the backrest when the rotational lock is released, meaning the backrest stile may be reclined in a controlled manner.

In one embodiment as shown in FIG. 12A, the hub 110 may include a wiper 237 disposed about an opening into the hub through which the rear support leg 104 extends and retracts. In some cases, ingress of fluids (e.g., water) or particles (e.g., sand, dust, etc.) into the hub may affect performance of the hub over time. Accordingly, the wiper 237 is configured to reduce any gap between the rear support leg 104 and the hub 110, so that any foreign fluids or particles disposed on the rear support leg are inhibited from entering the hub as the rear support legs translates into the hub. That is, the wiper may brush off any liquids or particles that may have accumulated on the rear support leg as the rear support leg is translated into the hub (i.e., retracted). In some embodiments, the wiper 237 may be composed of silicone or another suitable material for forming a close fit with the rear support leg while still allowing the rear support leg to slide into or out of the hub without significant added resistance.

Figure 12B:
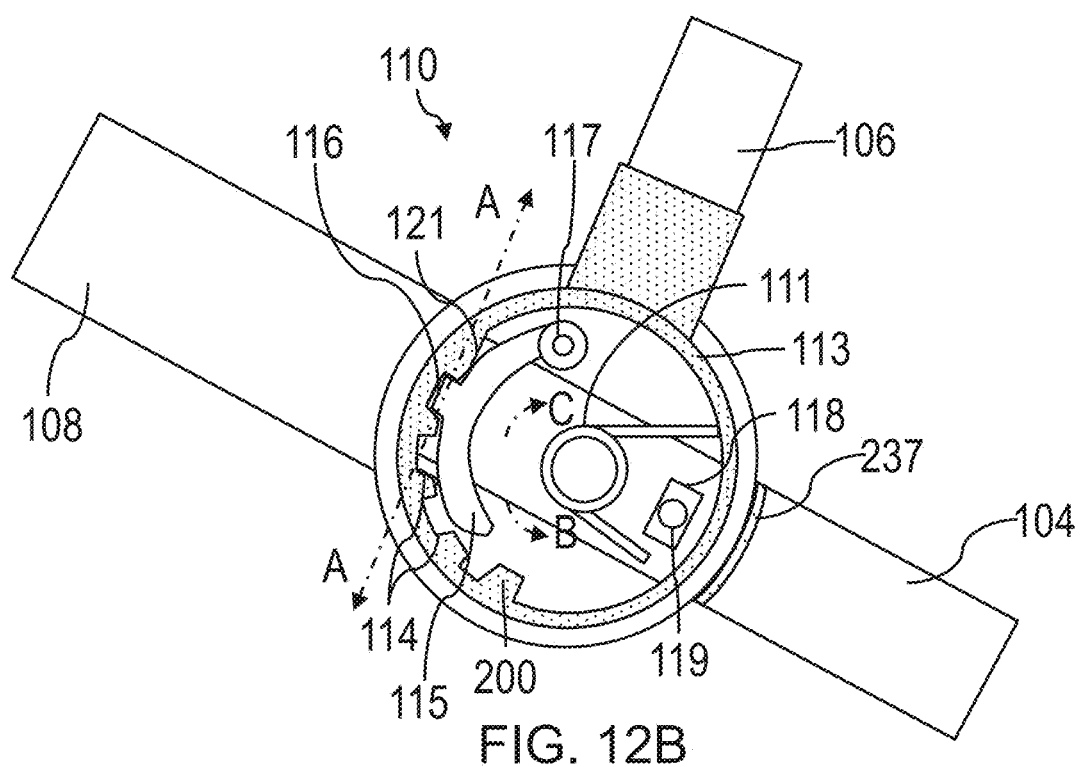
FIG. 12B is a side cross-sectional view of the hub of FIG. 12A taken along line 12B-12B of FIG. 10B.

FIG. 12B is a side cross-sectional view of the hub 110 of FIG. 12A taken along line 12B-12B of FIG. 10B. Relative to FIG. 12A, the rotational coupler 113 of the hub has been rotated to a second rotational position in a direction clockwise relative to the page. Accordingly, the stile 106 is inclined relative to the central beam 108. The configuration of FIG. 12B corresponds to a rotation lock projection 116 engaging a first locking region of the plurality of locking regions 114. As the rotational coupler 113 was rotated relative to the housing 112, the projection 116 was contacted by a ramp 121, which rotated the rotation lock in direction B about the pin 117. Once the projection 116 was aligned with the locking region, a torsion spring or other biasing element moved the rotation lock in direction C so that the projection entered the locking region. When in the locking region, the rotation lock 115 is configured to inhibit rotation of the rotational coupler in both directions of rotation to different extents as the rotation lock functions as an over-center cam lock. That is, when the rotational coupler 113 is rotated in direction C (e.g., a direction of recline or a direction increasing the angle of inclination between the central beam 108 and the stile 106), the force is transmitted to the rotation lock along axis A-A. As axis A-A is offset from the pin 117, a moment is applied to the rotation lock and the rotation lock correspondingly rotates the rotation lock in direction C. However, rotation of the rotation lock in direction C while the projection is already engaged with a locking region simply moves the projection into further engagement with the locking region. As C is unable to rotate, the rotational force applied to the rotational coupler 113 is resisted by pin 117. Accordingly, the rotational coupler is unable to rotate in direction C when the rotation lock is engaged with a locking region.

In contrast to rotation in direction C, rotation of the rotational coupler 113 in direction B (e.g., a direction of fold or a direction reducing the angle of inclination between the central beam 108 and the stile 106) is inhibited but not prevented. When the rotational coupler 113 is rotated in direction B, the force applied along axis A-A creates an opposite moment on the rotation lock 115. Accordingly, the rotation lock is rotated in direction B by the rotational coupler, which moves the projection 116 out of engagement with the locking region. As the rotation lock is urged to rotate in direction C, this urging force may be overcome if enough force is applied to the rotational coupler in direction B. Accordingly, a user may apply a sufficient force to overcome the threshold urging force and other associated frictional forces which maintain the projection 116 in engagement with the locking regions 114 to move the backrest in direction B. Such an arrangement may be desirable as a user may fold the backrest of the chair easily without operating any buttons or latches. The rotation lock of FIG. 12B is configured to perform the same function (i.e., inhibit rotation of the backrest in direction C while inhibiting rotation of the backrest in direction B) at each of the plurality of locking regions 114. According to the embodiment shown in FIG. 12B, the rotational coupler includes three locking regions, although any desirable number of locking regions may be employed, as the present disclosure is not so limited.

Figure 12C:
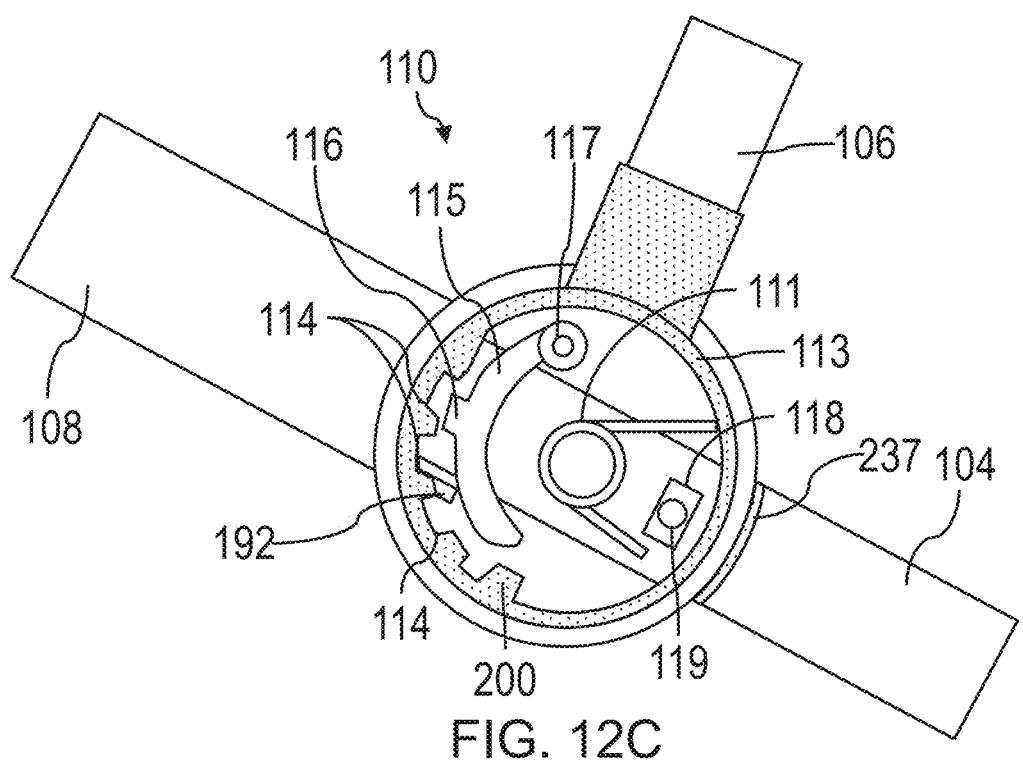
FIG. 12C is a side cross-sectional view of the hub of FIG. 12A taken along line 12B-12B of FIG. 10B.

FIG. 12C is a side cross-sectional view of the hub 110 of FIG. 12A taken along line 12B-12B of FIG. 10B. According to the embodiment of FIGS. 12A-12D, the hub 110 slidably receives a trigger pin 192 that may be associated with a trigger disposed on the central beam 108. The trigger may be activated (e.g., rotated or moved) such that the trigger pin translates relative to the hub into our out of the hub. In the configuration of FIG. 12C, the trigger pin 192 has been operated (e.g., via a trigger disposed on central beam 108) to move the rotation lock 115 out of engagement with the plurality of locking regions 114. That is, the trigger pin is contacting the rotation lock to hold the projection 116 out of engagement with the first locking region against any biasing force urging the rotation lock into engagement with the rotational coupler. Accordingly, the rotational coupler 113 and attached stile 106 may be rotated in any direction by a user without inhibition from the rotation lock. For example, a user may operate the trigger pin and then rotate the stile 106 in a recline direction. As noted above, the backrest and/or rotational coupler 113 may be biased to rotate toward the central beam (i.e., in the folding direction) with a torsion spring 111 or other suitable biasing member. Accordingly, when the trigger pin 192 is operated a user seated in the chair may apply additional force to the stile to recline it, or reduce force applied to the stile to allow the leg to rotate toward the folded configuration or otherwise un-recline.

Figure 12D:
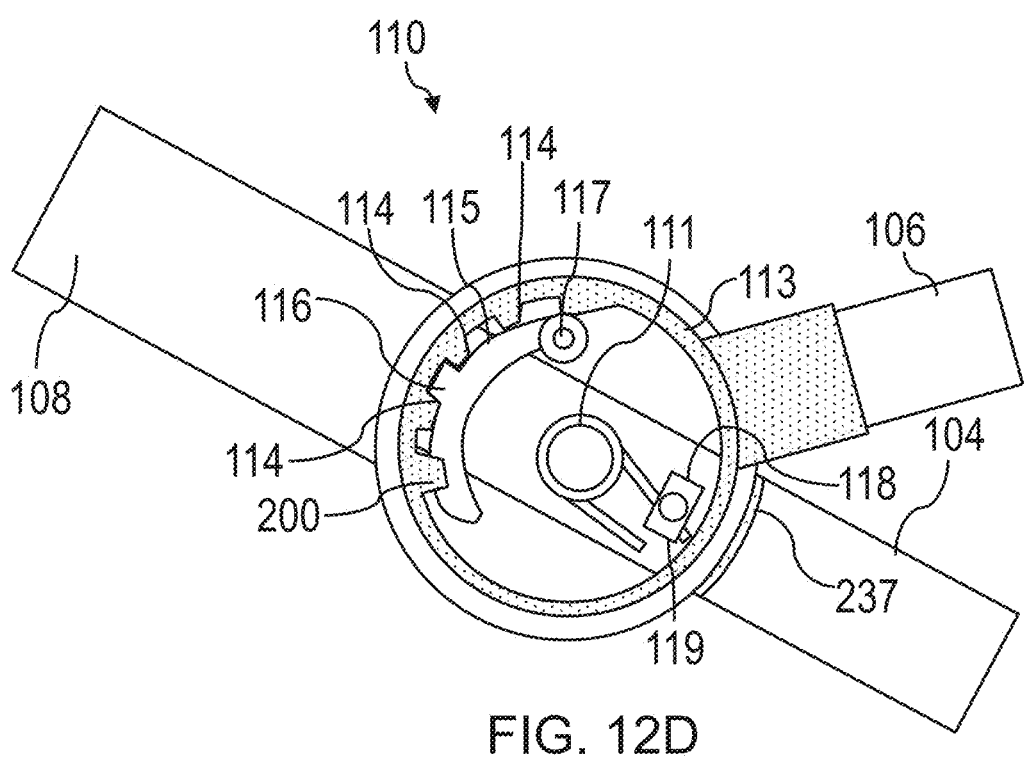
FIG. 12D is a side cross-sectional view of the hub of FIG. 12A taken along line 12D-12D of FIG. 11B.

FIG. 12D is a side cross-sectional view of the hub 110 of FIG. 12A taken along line 12D-12D of FIG. 11B. In the configuration shown in FIG. 12D, the stile 106 has been rotated toward the rear support leg so that the backrest is more reclined than in the configurations shown in FIGS. 12B-12C. The rotation lock projection 116 has engaged the last of the plurality of locking regions 114 so the rotational coupler 113 is inhibited from rotation as discussed above. According to the embodiment of FIG. 12D, the housing 112 of the hub may include a limiter such as an end of a slot (see FIGS. 13A-13B) which inhibits further rotation of the stile 106 toward the rear support leg 104 once the projection 116 is aligned and able to engage the last of the plurality of locking regions 114.

Figure 13A:
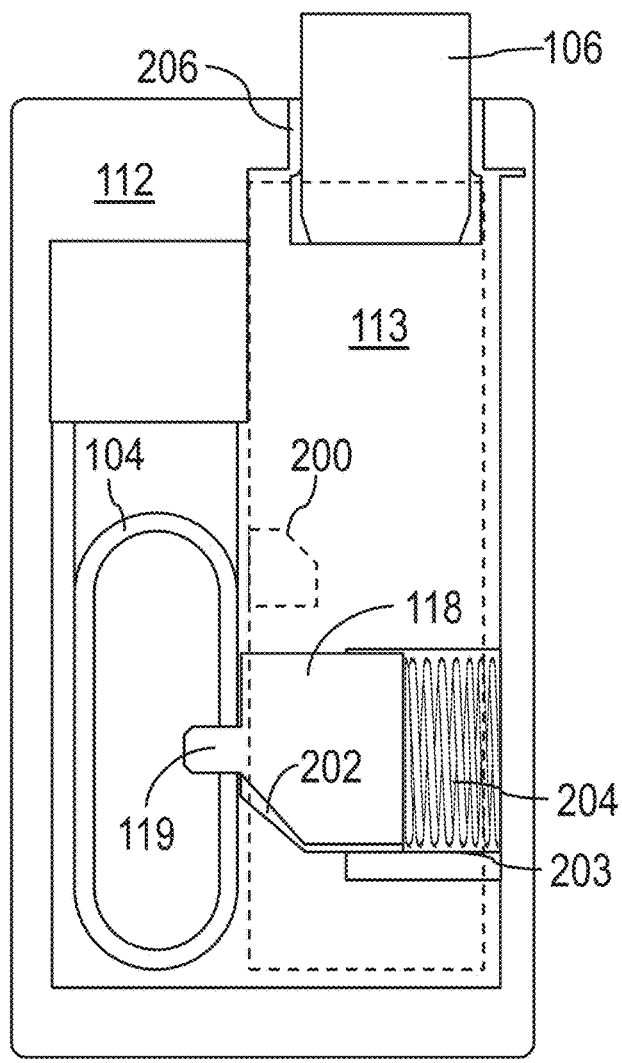
FIG. 13A is a cross-sectional view of the hub of FIG. 12A taken along line 13A-13A of FIG. 10A.
Figure 13B:
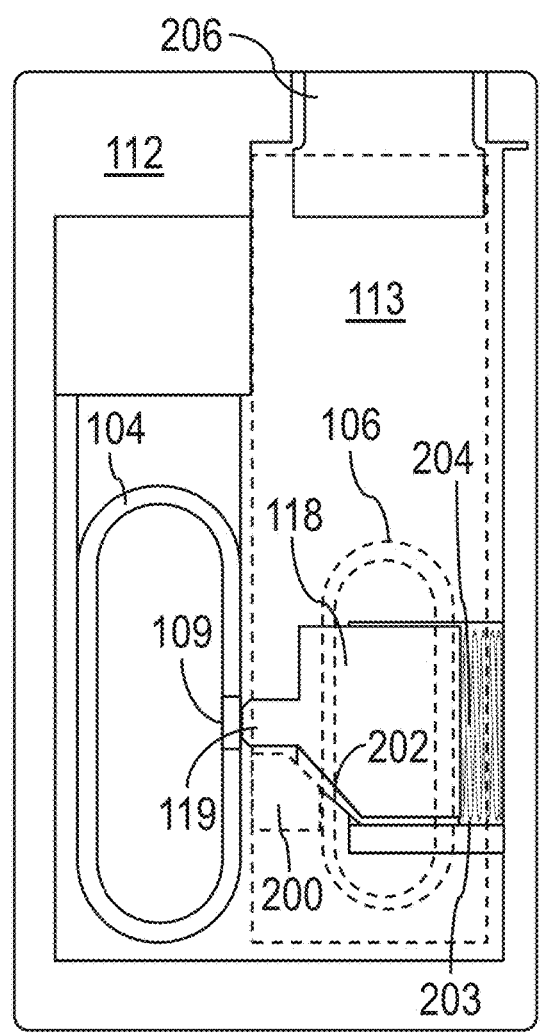
FIG. 13B is a cross-sectional view of the hub of FIG. 12A taken along line 13B-13B of FIG. 9A.

FIGS. 13A-13B depict cross-sectional views of the hub 110 showing the functionality of one embodiment of a blocking pin 119 and a pin camming element 200 which selectively inhibits the translation of a rear support leg into a central beam of a chair. In the embodiment of FIGS. 13A-13B, the blocking pin moves between a blocking position where the blocking pin engages a hole in the rear leg and an unblocking position where the blocking pin disengages the hole. In this manner, relative movement of the rear leg and central beam is controlled. According to the depicted embodiment, the movement of the blocking pin between the blocking position and the unblocking position is controlled via rotation of a rotational coupler 113 in the hub.

FIG. 13A is a cross-sectional view of the hub 110 of FIG. 12A in the second configuration. As noted above, a blocking pin 119 and blocking pin housing 118 may be used to selectively allow movement of the rear support leg 104 relative to a central beam. As shown in FIG. 13A, the rear support leg 104 and the rotational coupler 113 are in a side-by-side arrangement within the housing 112 of the hub. The blocking pin 119 and blocking pin housing 118 are integrally formed in the embodiment of FIGS. 13A-13B and are disposed in a slot 203 formed in the housing. The blocking pin and blocking pin housing are configured to move substantially linearly toward and away from the rear support leg in the slot. Alternatively, the blocking pin may rotate into and out of a blocking position. A biasing member 204 configured as a compression spring is disposed in the slot and urges the blocking pin toward the blocking position when the blocking pin engages the rear support leg. The blocking pin housing 118 also includes an inclined surface 202 that is configured to move the blocking pin housing in the slot when contacted by the rotational coupler 113. The rotational coupler 113 attached to stile 106 includes a pin camming element 200 which is configured to engage the blocking pin housing 118 on the inclined surface 202 when the rotational coupler is in a predetermined position. In the embodiment of FIG. 13A, the predetermined position is when the stile 106 is parallel to a central beam and the rear support leg, as shown in FIG. 13B.

FIG. 13B is a cross-sectional view of the hub 110 of FIG. 12A in the first configuration. As shown in FIG. 13B, the stile 106 and rotational coupler 113 have been rotated so that the stile is parallel to the rear support leg 104. Accordingly, the pin camming element 200 has engaged the inclined surface 202 of the blocking pin housing to move the blocking pin 119 from the blocking position to an unblocking position. That is, sliding engagement of the pin camming element 200 and the inclined surface 202 of the blocking pin 119 moves the blocking pin away from the rear leg 104. The pin camming element holds the blocking pin in the unblocking position against the urging force of the biasing member so that the rear support leg 104 is movable and able to be extended or retracted. In the unblocking position, the blocking pin clears a hole 109 formed in the rear support leg. When the rear support leg is slid to another position where the hole 109 is not aligned with the blocking pin 119, the rear support leg may hold the blocking pin in the unblocking position. Accordingly, the rotational coupler 113 and backrest 106 may be rotated when the rear support leg hole 109 is not aligned with the blocking pin and the blocking pin will be maintained in the unblocking position. For example, when a chair is in the folded configuration a backrest may be rotated first to an unfolded configuration and then the rear support leg may be extended until the hole 109 aligns with the blocking pin 119, as a particular order is not required when unfolding. However, in the folding direction of motion, the backrest may be moved to the folded configuration first so that the pin camming element moves the blocking pin 119 to the unblocking position before the rear support leg may be retracted. Such an arrangement ensures that a chair in an unfolded and usable configuration collapses or folds the non-weight bearing elements first to avoid inadvertent folding or collapsing of the rear support leg.

As shown in FIGS. 13A-13B, the stile 106 is disposed in a slot 206 formed in the hub housing 112. The rotational coupler 113 may substantially block the slot from ingress of foreign materials such as sand and dirt in locations where the stile is not positioned. Ends of the slot may function as rotation limiters for the rotational coupler 113 and stiles 106 so that the rotational range of the rotational coupler is predefined. In some embodiments, the slot may include a gasket or a shield to provide further protection from ingress of foreign objects.

While the blocking pin 119 of FIGS. 13A-13B is shown translating (i.e., moving substantially linearly) between a blocking position and an unblocking position, it should be noted that the blocking pin may move in any suitable direction between the blocking and unblocking positions. For example, the blocking pin 119 may be configured to rotate about a hinge between the blocking position and unblocking position. Accordingly, the present disclosure is not so limited in this regard, and any blocking pin arrangement which allows the blocking pin to selectively control movement of the rear support leg 104 may be employed.

FIGS. 14-23 depict various embodiments of actuators and pin actuators which a user may manipulate to control the translation of an outer backrest stile and an inner backrest stile. That is, the actuators and pin actuators of the exemplary embodiments described with reference to FIGS. 14-23 may be employed to control the overall length of a backrest. Put another way, the actuators and pin actuators selectively control the ability of a first tube to slide into or out of a second tube.

Figure 14:
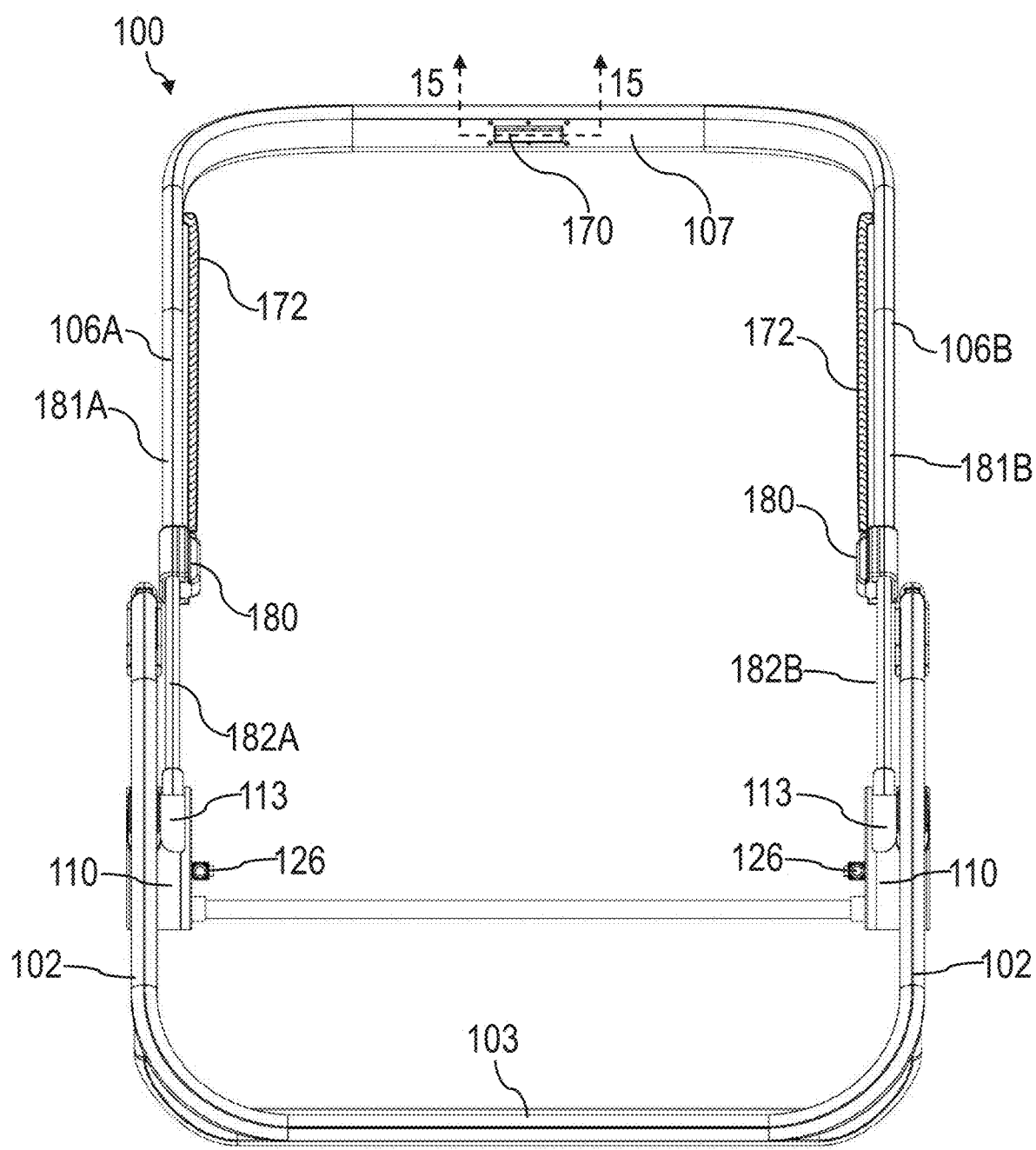
FIG. 14 is a front view of another embodiment of a chair.

FIG. 14 is a front view of another embodiment of a chair 100 showing an arrangement for an actuator 170 and pin actuators 180, which control the extendibility of a backrest. As shown in FIG. 14, the backrest includes a rail 107 and two stiles 106A, 106B, each having an outer stile 181A, 181A and an inner stile 182A, 182B. Outer stiles 181A, 181B selectively slide over the inner stiles 182A, 182B, the action of which is controlled by the actuator 170 and pin actuators 180. According to the embodiment of FIG. 14, the pin actuators and actuators are connected with sheathed cables 172. Operation of the actuator tensions a cable of the sheathed cables to activate the pin actuators 180. When the pin actuators are activated, a backrest blocking pin may be moved to an unblocking position so that the outer stiles 181A, 181B may be moved relative to the inner stiles 182A, 182B. The operation of the actuator and pin actuators is shown in detail in FIGS. 18-21.

Figure 15:
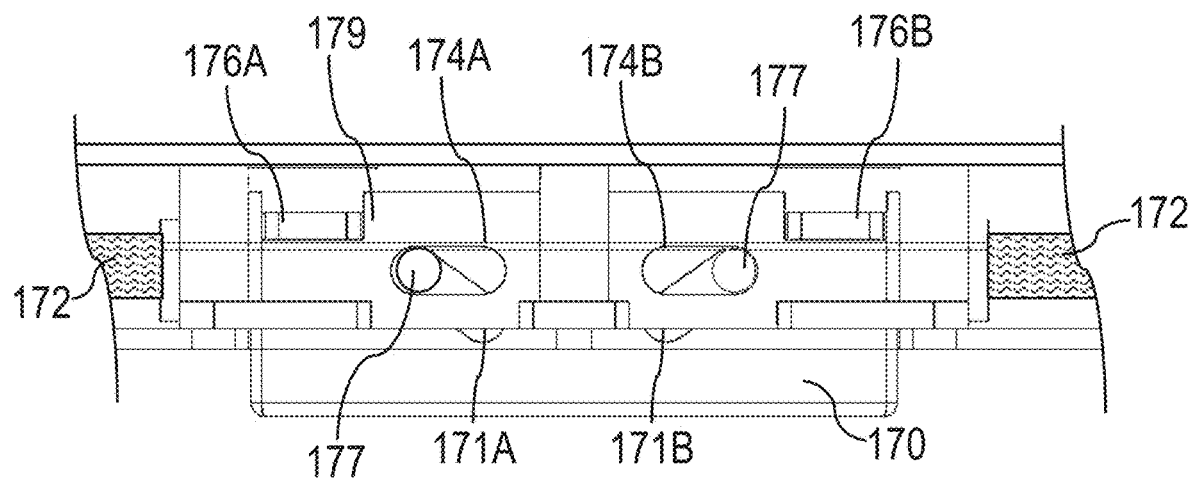
FIG. 15 is a side cross-sectional view of one embodiment of a backrest release actuator of the chair of FIG. 14 taken along line 15-15.
Figure 16:
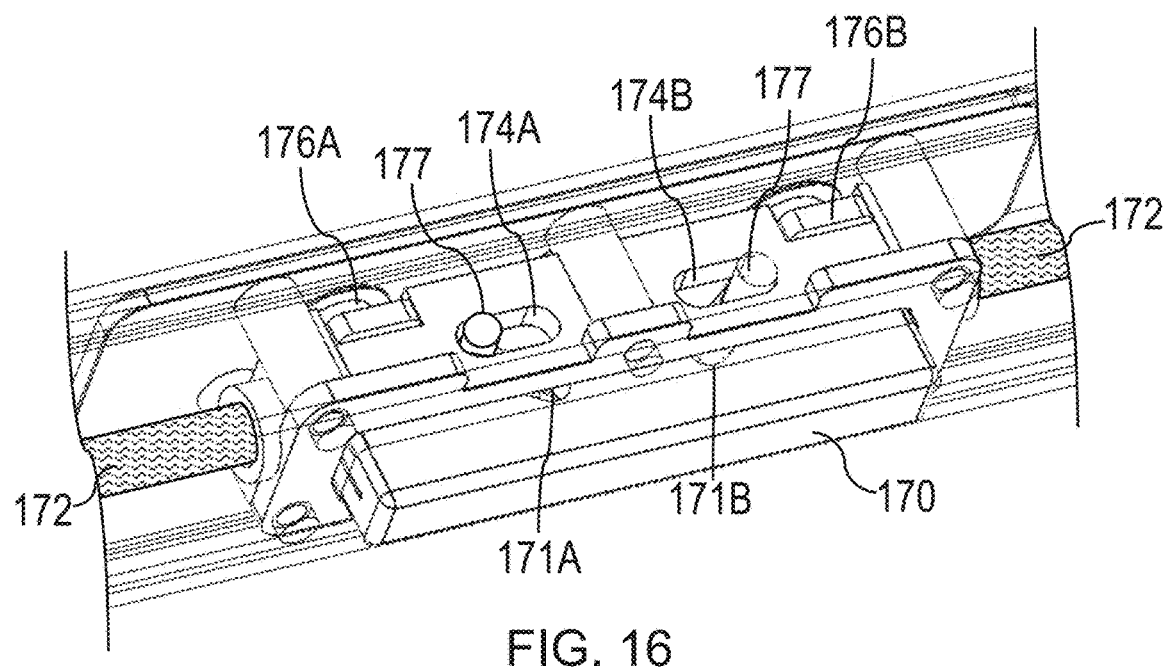
FIG. 16 is a perspective view of the backrest release actuator of FIG. 15.

FIG. 15 is a side cross-sectional view taken along line 15-15 of FIG. 14 and FIG. 16 is a perspective view of one embodiment of a backrest release actuator. As shown in FIG. 15, the backrest release actuator includes a button 170 which has includes pin actuator slots 171A, 171B. The button is configured to move into and out of a button housing 179. The button housing includes second pin actuator slots 174A, 174B which overlap at least partially with the first pin actuator slots 171A, 171B. Each of the sheathed cables 172 is coupled to a sliding actuator carrier 176A, 176B. In particular, cables of the sheathed cables 172 are coupled to the sliding actuator carrier so that the cables may be tensioned as the actuator carriers slide. The sliding actuator carriers include pins 177 that are disposed in each of the first pin actuator slots 171A, 171B and second pin actuator slots 174A, 174B. That is, one pin is disposed in a pair of overlapping pin actuator slots 171A, 174A and another pin is disposed in the other pair of overlapping pin actuator slots 171B, 174B. As shown in FIG. 15, the first pin actuator slots 171A, 171B are inclined relative to the second pin actuator slots 174A, 174B. Accordingly, when the button 170 is depressed, the inclined first pin actuator slots will move the pins 177 along the second pin actuator slots. In the embodiment of FIG. 15, the pins will move toward one another and away from their respective sheathed cable 172 so that the actuator carriers 176A, 176B tension the cables of the sheathed cables.

Figure 17:
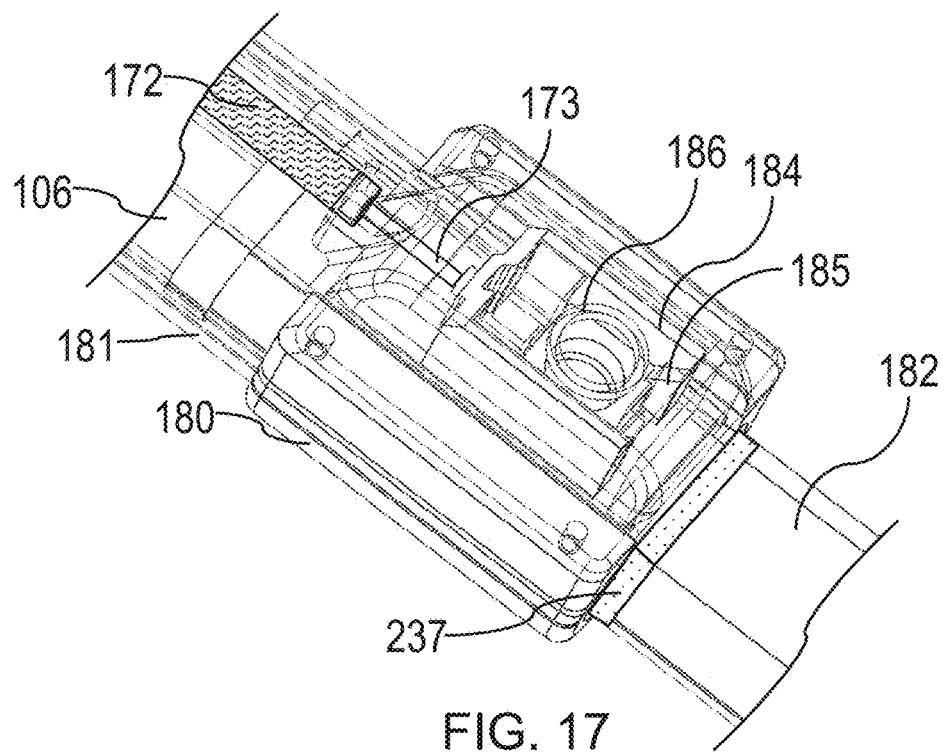
FIG. 17 is a first perspective view of one embodiment of a pin release actuator.
Figure 18:
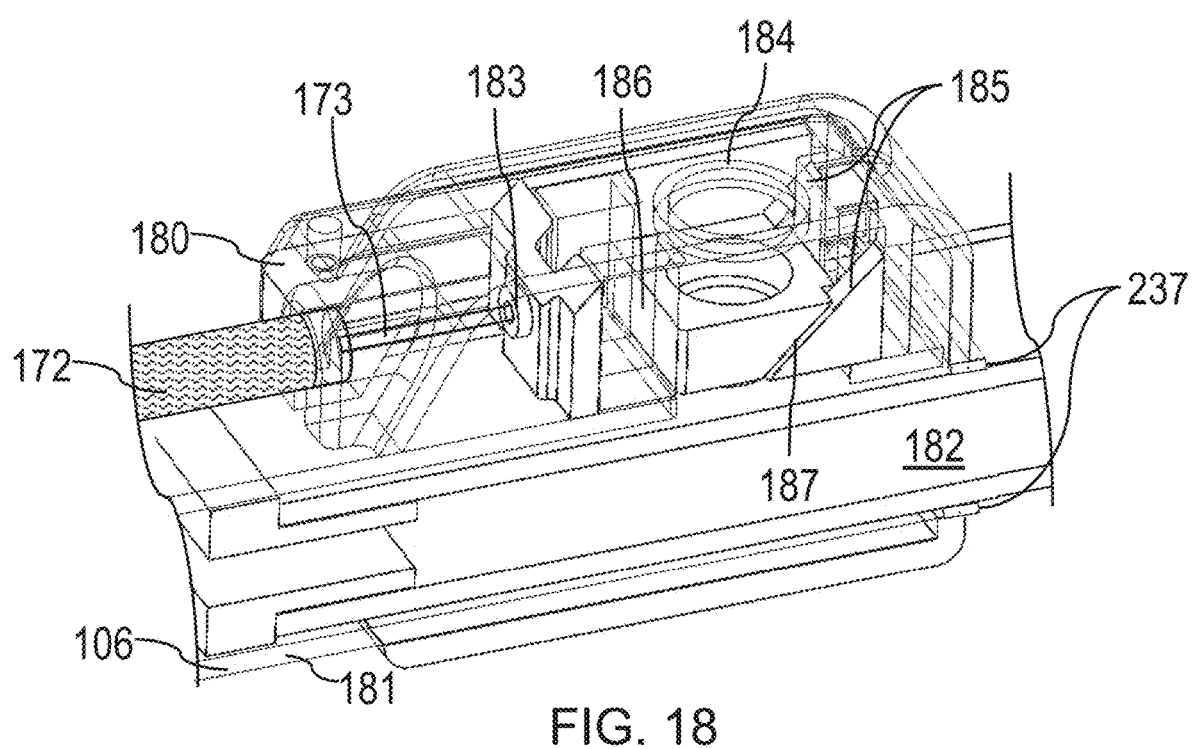
FIG. 18 is a second perspective view of the pin release actuator of FIG. 17.

FIG. 17 is a first perspective view and FIG. 18 is a second perspective view of one embodiment of a pin release actuator 180 for use with a backrest release actuator. The pin release actuator is configured to selectively move a backrest blocking pin from a blocking position to an unblocking position via a backrest pin head 186. When the backrest blocking pin is in the blocking position and has engaged the inner stile 182, the outer stile 181 may be inhibited from sliding relative to the inner stile. That is, the pin release actuator 180 is secured to the outer stile 181 and the backrest blocking pin may engage a hole in the inner stile so that axial force may be transmitted between the stile and inner stile. As shown in FIGS. 17-18, the pin release actuator includes a pin release carrier 184 that is attached to an inner wire 173 of a sheathed cable 172 at a cable attachment portion 183. The pin release carrier 184 is configured to slide in the pin release actuator when the wire 173 is tensioned (e.g., when an actuator is activated elsewhere on the chair). The pin release carrier 184 includes inclined pin engagement surfaces 185. The inclined pin engagement surfaces engage the backrest pin head 186 when the pin release carrier 184 is slid under tension from the cable. As the inclined pin engagement surfaces engage the backrest pin head, the backrest blocking pin is moved away from the inner stile and into the unblocking position where the backrest blocking pin clears the inner stile. According to the embodiment of FIG. 17, the backrest pin head 186 includes a carrier engagement surface 187, which is parallel to the inclined pin engagement surface, although other surface angles may be employed. Accordingly, in the unblocking position the outer stile 181 may be slid relative to the inner stile 182 to lengthen or shorten the overall length of the backrest. The inner stile may include any suitable number of holes or engagement positions for the backrest blocking pin, as the present disclosure is not so limited. Additionally, the backrest blocking pin may be biased toward the blocking position so that the stile is secured in one or more engagement positions automatically.

It should be noted that the actuator and pin release arrangement shown in FIGS. 14-18 may be employed on any desirable portion of the chair, which includes tubular members sliding relative to one another. For example, an actuator and pin release actuator may be employed to control extension of a rear support leg relative to a central beam. Of course, such an arrangement may be employed on any coaxial sliding tubular members, as the present disclosure is not so limited.

Figure 19:
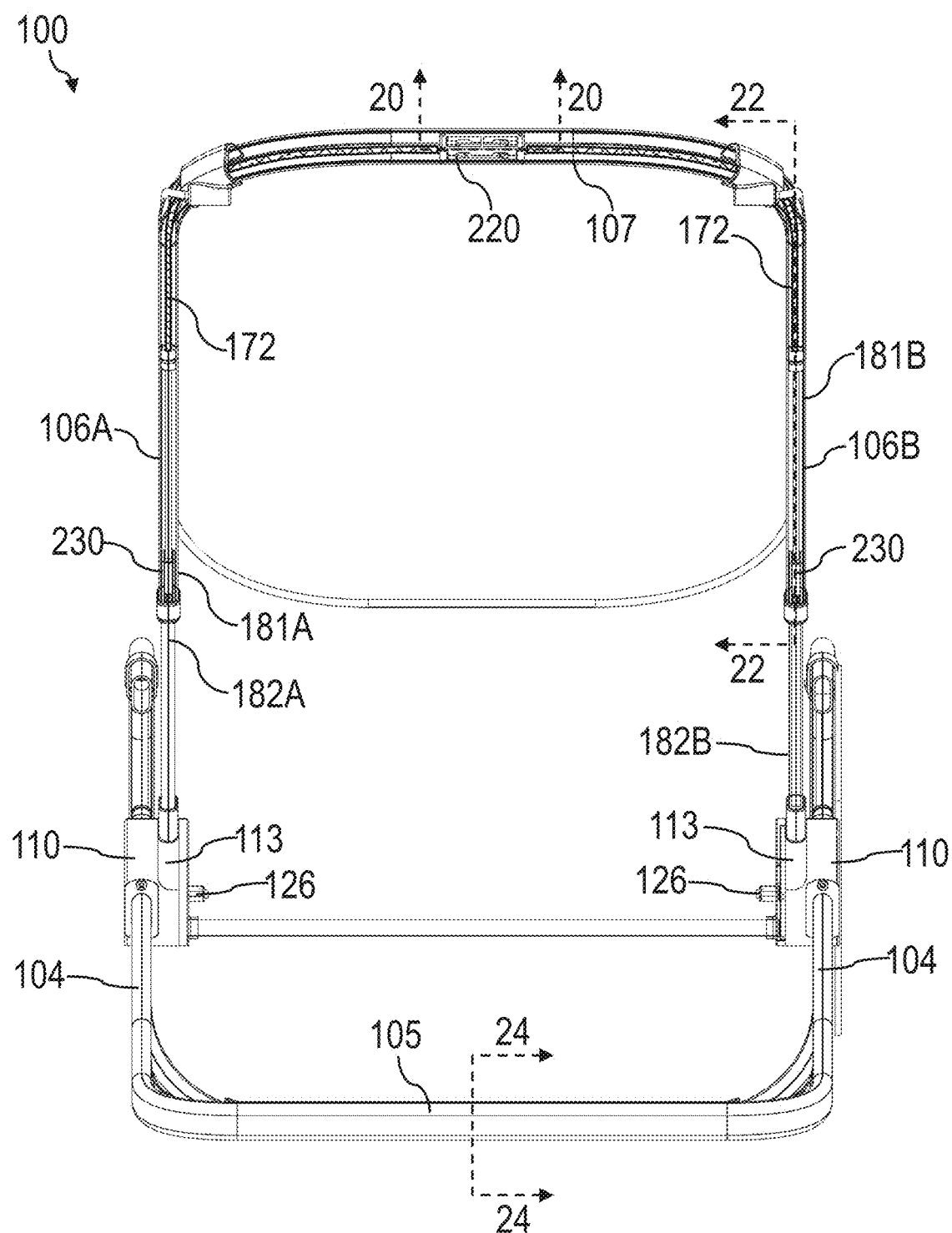
FIG. 19 is a rear view of another embodiment of a chair.

FIG. 19 is a rear view of another embodiment of a chair 100 showing an alternative arrangement for an actuator 220 and a pin release actuator 230 configured to control the relative movement of outer stiles 181A, 181B and inner stiles 182A, 182B of stiles 106A, 106B. Similar to the embodiment of FIG. 14, the actuator 220 and pin release actuator are configured to selectively move a backrest blocking pin to a blocking position where the outer stiles 181A, 181B are inhibited from moving relative to the inner stiles 182A, 182B and an unblocking position where the outer backrest stiles are free to slide relative to the inner backrest stiles. The actuator 220 is coupled to the pin release actuator 230 via a cable 172, which may be configured as a sheathed wire, a non-extendable nylon cord, or any another suitable tether which allows tension to be transmitted from the pin release actuator to the backrest release actuator.

Figure 20:
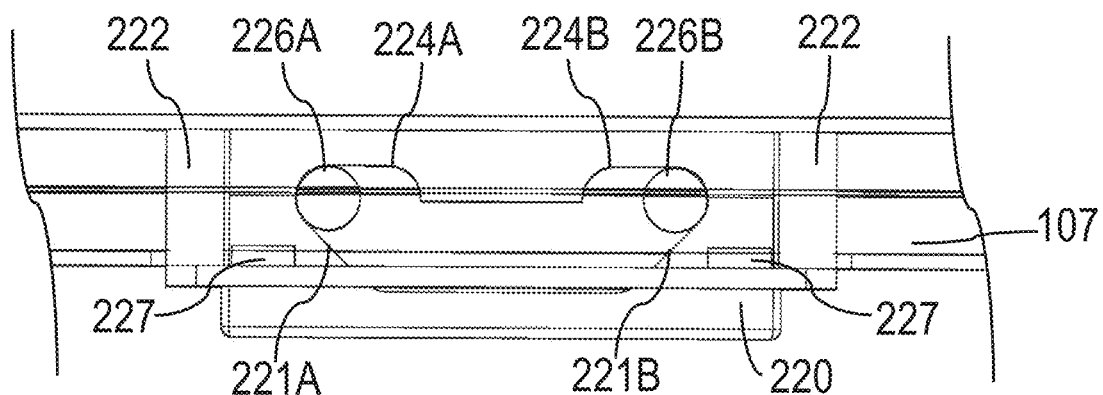
FIG. 20 is a side cross-sectional view of another embodiment of a backrest release actuator of the chair of FIG. 19 taken along line 20-20.
Figure 21:
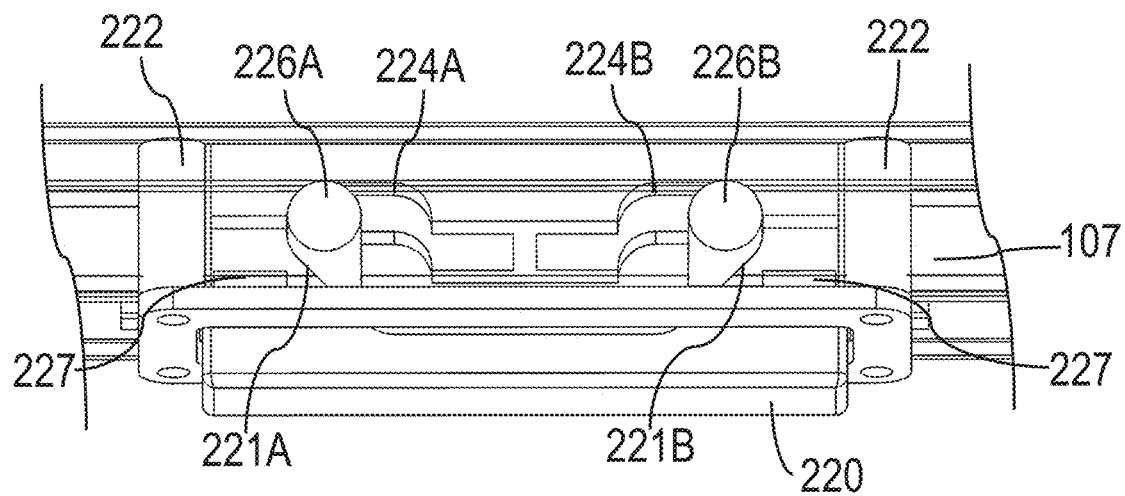
FIG. 21 is a perspective view of the backrest release actuator of FIG. 20.

FIG. 20 is a side cross-sectional view of another embodiment of a backrest release actuator 220 of the chair of FIG. 19 taken along line 20-20, and FIG. 21 is a perspective view of the same. As shown in FIG. 20, the backrest release actuator 220 is configured as a button configured to translate into or out of a rail 107 of the chair (or another suitable tubular member). The backrest release actuator is seated in a backrest release actuator housing 222, which is fastened to the backrest rail of the chair. The housing 222 includes a first slot 224A and a second slot 224B, which form a track for first and second backrest actuator pins 226A, 226B to move. That is, in the depicted embodiment, the backrest actuator pins move along the slots to correspondingly apply tension via cables connected to each of the backrest actuator pins. The backrest actuator 220 includes a first inclined surface 221A and a second inclined surface 221B, which, in the current embodiment, face a center of the backrest actuator housing. Accordingly, as the backrest actuator is moved into the backrest rail (i.e., towards the backrest actuator pins 226A, 226B), the inclined surfaces 221A, 221B contact the backrest actuator pins 226A, 226B and urge them toward the center of the backrest actuator housing along the slots 224A, 224B. Accordingly, cables attached to the backrest actuator pins are pulled toward the backrest actuator, thereby applying tension to the cable and transferring that tension to an associated pin release actuator.

According to the one embodiment as shown in FIGS. 20-21, the backrest release actuator is configured to enable simple assembly. As shown in FIGS. 20-21, the backrest release actuator includes retaining clips 227, which are configured to retain the backrest actuator in the backrest actuator housing. When the backrest actuator is separate from the backrest actuator housing, the retaining clips may be deformed as the backrest actuator is inserted into the backrest actuator housing, such that the slips snap into place once the backrest actuator is fully inserted into the housing. This process may not interfere with the backrest actuator pins 226A, 226B, allowing for easy installation of the backrest actuator.

In one embodiment, the backrest actuator 220 shown in FIGS. 20-21 may include a biasing member (e.g., a compression spring, torsion spring, etc.) which biases the backrest actuator away from the backrest rail 107. Such an arrangement may allow the backrest actuator pins 226A, 226B and backrest actuator to return to a resting position after the backrest actuator is depressed.

It should be note that while the backrest actuator pins 226A, 226B are configured to both move towards the center of the backrest actuator housing in one embodiment, in other embodiments the backrest actuator pins may move in any suitable direction to apply a tension force to an associated cable. Accordingly, the present disclosure is not so limited in this regard.

Figure 22:
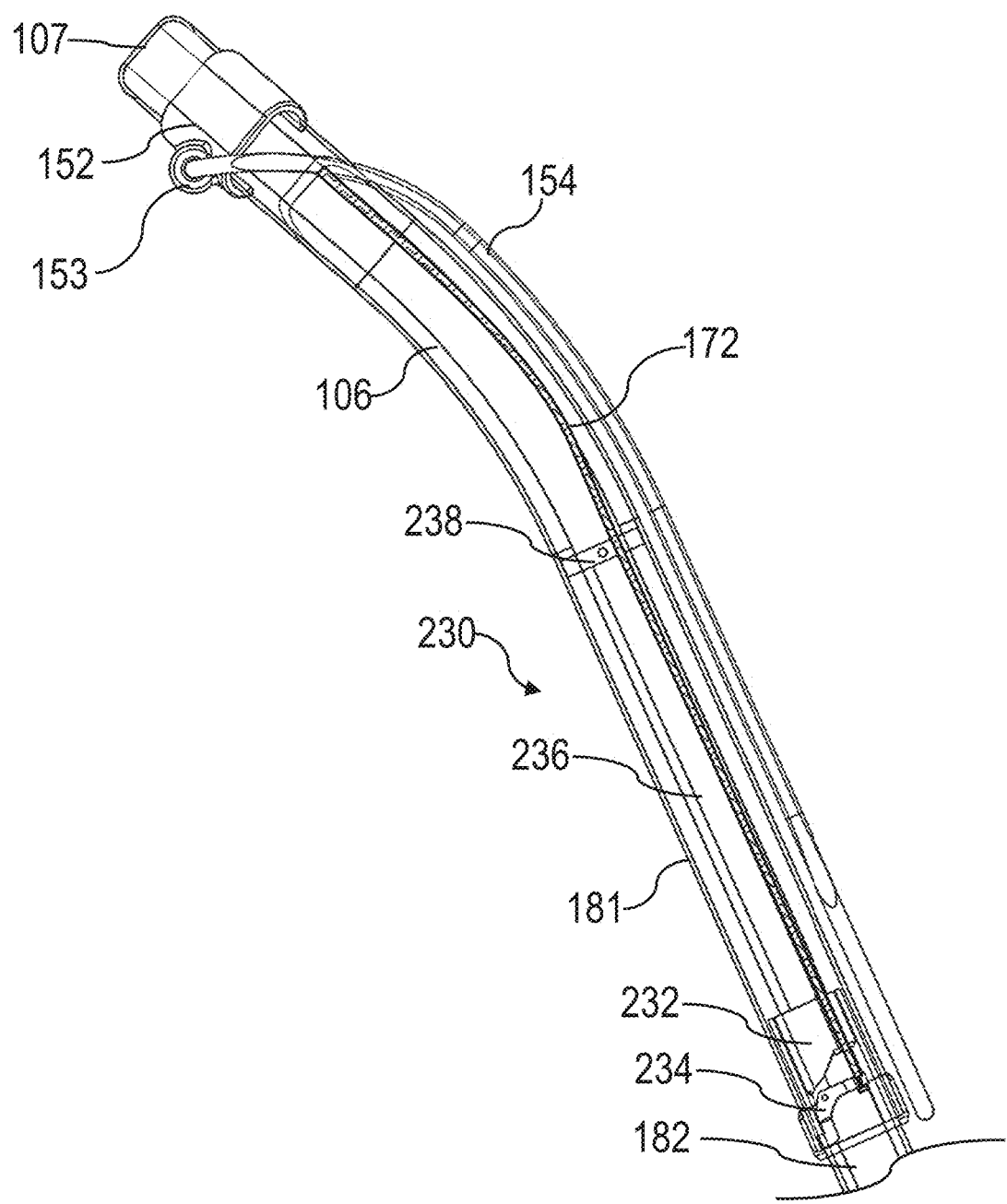
FIG. 22 is a side cross-sectional view of another embodiment of a pin release actuator of the chair of FIG. 19 taken along line 22-22.

FIG. 22 is a side cross-sectional view showing one embodiment of a pin release actuator 230 of the chair of FIG. 19 taken along line 22-22. In the depicted embodiment, the pin release actuator includes a backrest pin carrier 232, which is rotatably coupled to a backrest blocking pin 234. The backrest blocking pin 234 is configured to rotate relative to the backrest pin carrier between a blocking position and an unblocking position, as will be discussed further with reference to FIG. 23. The backrest pin carrier is coupled to backrest pin carrier extension 236 and a backrest pin actuator coupling 238. In the depicted embodiment, the backrest pin actuator coupling 238 is fastened to the side of the stile 106 at a position, which provides clearance for the inner backrest stile 182 to be fully retracted into the outer stile 181. The backrest pin carrier extension has a smaller diameter than the backrest pin actuator coupling, which is sized and shaped to be received inside of the inner backrest stile 182 as the inner backrest stile is retracted into the outer backrest stile 181. Likewise, the backrest pin carrier is also sized and shaped to be received inside of the inner backrest stile to provide clearance for the inner backrest stile to slide into the backrest stile. The cable 172 is slidably secured by the backrest pin actuator coupling 238 and the backrest pin carrier 232 so that the cable is actuable to move the backrest blocking pin without interference from the inner backrest stile 182.

In one embodiment as shown in FIG. 22, a chair may include a sun shade that is retained on a backrest stile 106 and/or backrest rail 107. According to the embodiment shown in FIG. 22, the sun shade includes at least one retaining clip 152 that rotatably supports a sun shade frame 154. In the embodiment shown in FIG. 22, the retaining clip is configured to snap-fit onto the backrest rail 107 and/or backrest stile 106 so that the retaining clip is secured to the backrest rail and/or stile. In one embodiment, the retaining clip also includes a bushing 153 that receives the sun shade frame and allows the angle of the sun shade frame relative to the backrest stile 106 to be adjusted. The bushing 153 may provide a friction fit for the sun shade frame such that whatever angle the sun shade frame is retained in any position set by a user. In one embodiment, the sun shade may include a hinged extension that may be unfolded to extend the length of the sun shade.

Figure 23:
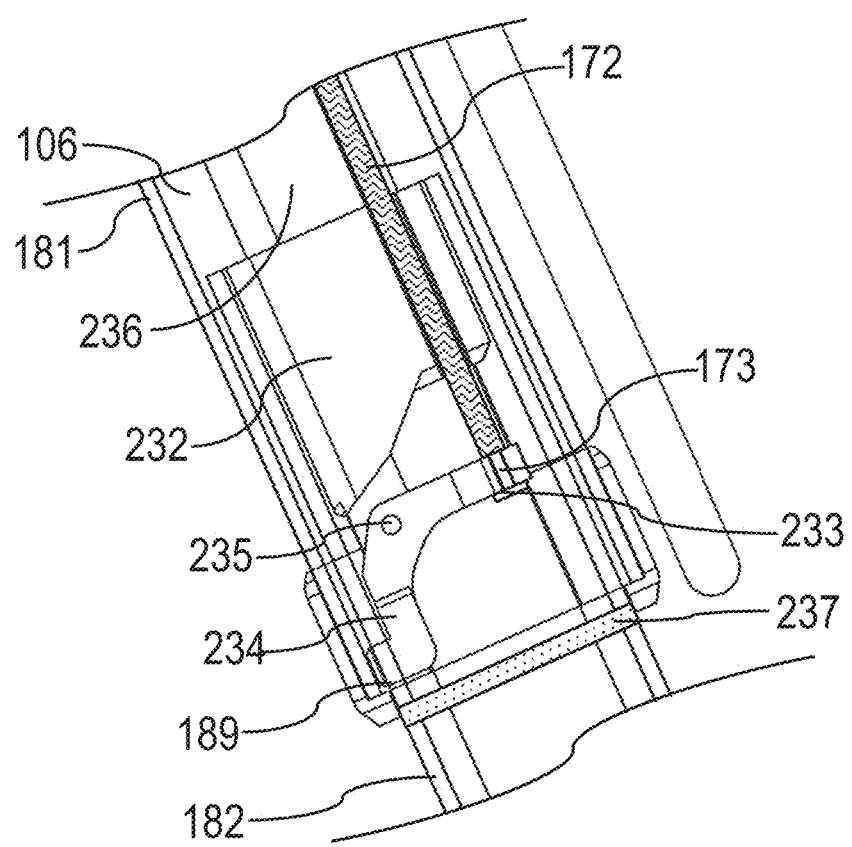
FIG. 23 is an enlarged cross-sectional view of the pin release actuator of FIG. 22.

FIG. 23 is an enlarged cross-sectional view of the pin release actuator 230 of FIG. 22. As discussed above, the pin release actuator includes a backrest pin carrier 232 and a backrest blocking pin 234. The backrest blocking pin 234 is rotatably coupled to the backrest pin carrier at a backrest pin hinge 235, which allows the backrest blocking pin to rotate between blocking and unblocking positions. The backrest blocking pin is coupled to the cable 172 at an end of the backrest blocking pin opposite the backrest pin hinge, where the cable 172 is retained in the backrest blocking pin with a flange 233. Accordingly, an inner wire 173 or cord may be used to apply a tension force to the backrest blocking pin to move the backrest blocking pin from a blocking position to an unblocking position. In the position shown in FIG. 23, the backrest blocking pin 234 is in the blocking position and is disposed in a backrest pin hole 189 formed in the inner backrest stile, and, in some embodiments, the backrest stile 106. Accordingly, the backrest blocking pin blocks movement of the inner backrest stile relative to the backrest stile. When tension is applied to the backrest blocking pin via the cable 172, the blocking pin is rotated in a counterclockwise direction relative to the page about backrest pin hinge 235. Correspondingly, the backrest blocking pin is withdrawn from the backrest pin hole 189 and the inner backrest stile is free to slide into or out of the backrest stile. In one embodiment, the backrest pin hinge may include a torsion spring or other biasing element to bias the backrest blocking pin toward the blocking position. In such an embodiment, when an associated actuator is released the blocking pin may rotate about the hinge in a clockwise direction relative to the page to re-engage the backrest pin hole. Of course, any suitable arrangement may be employed to control the relative sliding of the backrest stile 106 and inner backrest stile 107 (or in other embodiments any two concentric tubes), as the present disclosure is not so limited.

In one embodiment, a wiper 237 is configured to reduce any gap between the inner backrest stile 182 and the outer backrest stile 181 to inhibit any foreign fluids or particles from entering the outer stile 181 as the inner backrest stile 182 translates into the outer backrest stile. That is, the wiper 237 may brush off any liquids or particles that may have accumulated on the inner backrest stile 182 as the inner backrest stile is translated into the outer backrest stile 181 (i.e., retracted). In some embodiments, the wiper 237 may be composed of silicone or another suitable material for forming a close fit with inner backrest stile while still allowing the inner backrest stile to slide into or out of the outer backrest stile without significant added resistance.

Figure 24:
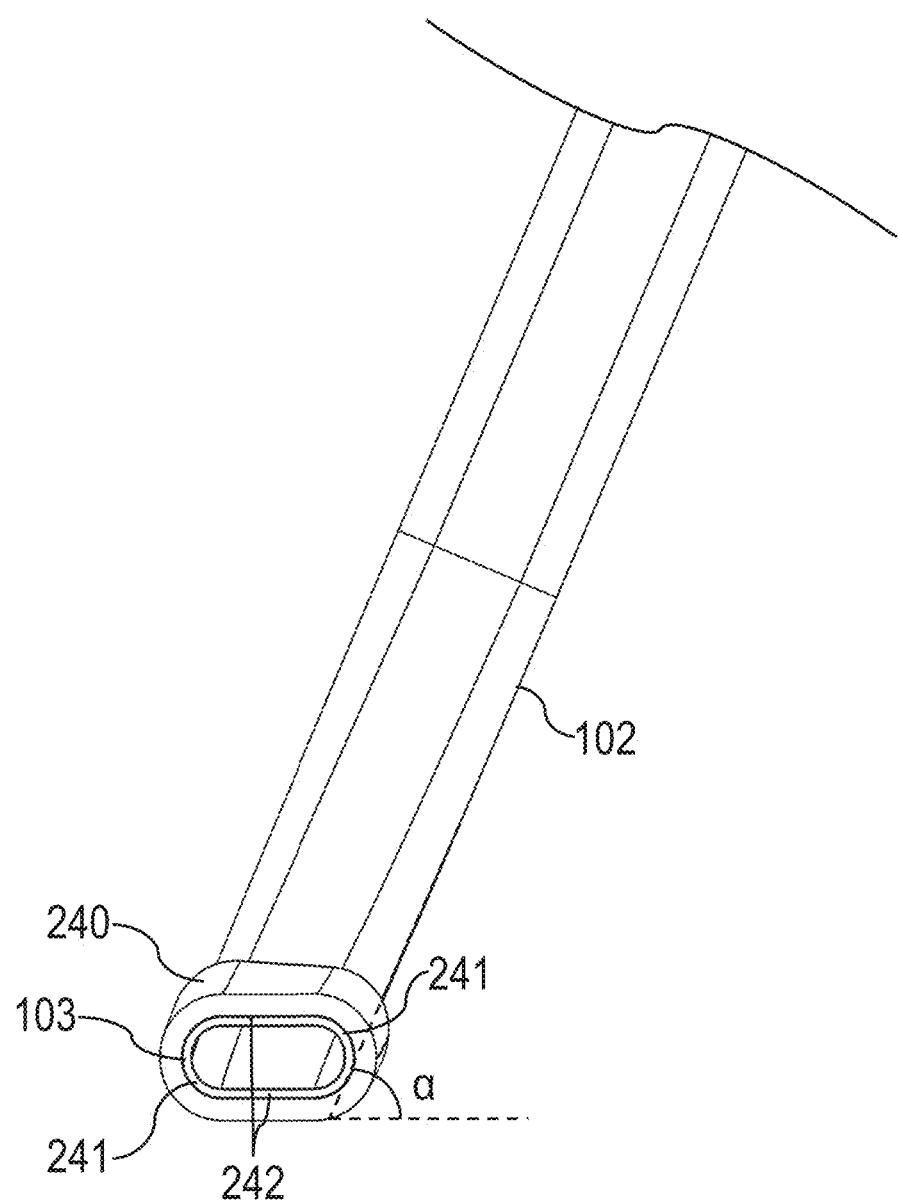
FIG. 24 is a cross-sectional view of one embodiment of a front support of the chair of FIG. 19 taken along line 24-24.

FIG. 24 is a cross-sectional view of one embodiment of a front support of the chair of FIG. 19 taken along line 24-24 showing and embodiment of a shape of the front base 103 and a shroud 240. As discussed above with reference to FIG. 8A, a front leg 102 may be angled relative to the ground (i.e., a horizontal plane) by an angle α whereas the front base 103 is substantially parallel with the ground. According to one embodiment as shown in FIG. 24, the front base 103 and front leg 102 may be formed as hollow tubes with the cross-sectional shape of a stadium. That is, the tubes include two straight sides 242 capped with rounded ends 241. Of course, in other embodiments, the tubes may have a cross sectional shape of a rounded rectangle, circle, oval, ellipse, or any other suitable shape. In the depicted embodiment, the straight sides 242 provide a flat surface parallel to the ground on which a user may place their feet. Of course, in other embodiments, the front base 103 may not be parallel to the ground such that an upper flat side 242 is provided for a user to place their feet. In some embodiments, the front support may have a continuous cross-sectional shape even where the tube is bent, meaning no dimples or other irregularities are formed in the front support.

In one embodiment as shown in FIG. 24, a shroud 240 may be disposed over the front base 103 to provide traction, cushion, and/or a flat surface for a user's feet. According to the embodiment shown in FIG. 24, the shroud has an inner shape equivalent to that of the front base such that the shroud is secured to the front base. The shroud may be formed of a high-friction material such as a rubber or silicone material. Such a material may also be at least partially compressible to provide a softer surface for a user's feet. In some cases, if the front base is not parallel with the ground, the shroud may be configured to provide a flat surface (e.g., a surface parallel to the ground) on which a user may place their feet. In such an arrangement, the upper surfaces of the shroud 240 and the front base 103 may not be parallel with one another.

Figure 25:
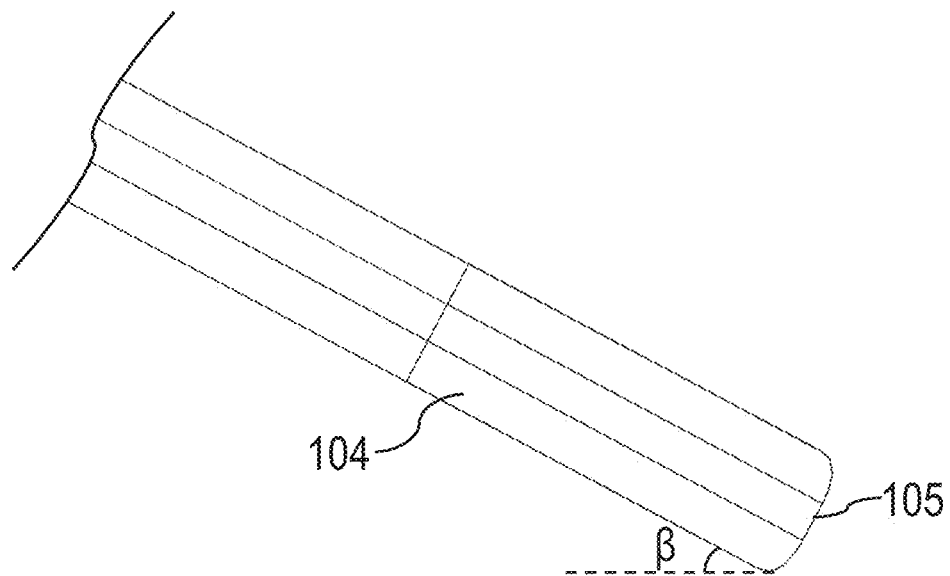
FIG. 25 is a side view of one embodiment of a rear support of the chair of FIG. 19.

FIG. 25 is a side view of one embodiment of a rear support of the chair of FIG. 19. As discussed above, the rear support of a chair may include a rear leg and a rear base 105. In the embodiment shown in FIG. 25, the rear support may be substantially planar, where the rear leg is straight with no bends (see also FIG. 46). Accordingly, the rear support leg is angled at an angle β relative to the ground (i.e., a horizontal plane) and the rear base is similarly angled relative to the ground. In the embodiment shown in FIG. 25, β is between 25° and 45°. Of course, any suitable angle may be employed for the angle between the ground and the rear support leg, as the present disclosure is not so limited.

Figure 26:
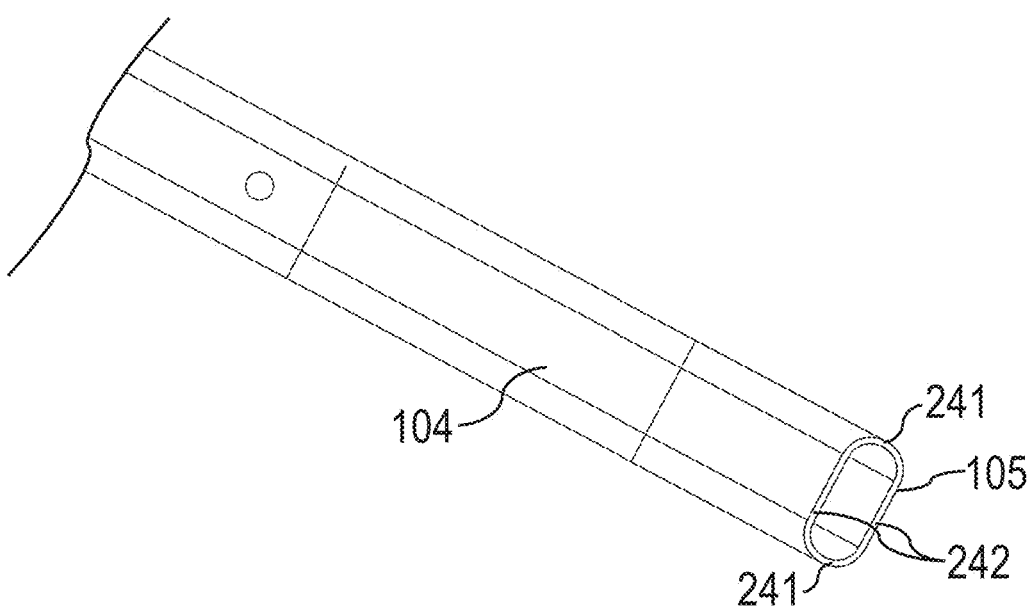
FIG. 26 is a cross-sectional view of the rear support of FIG. 19 taken along 24-24.

FIG. 26 is a cross-sectional view of the rear support of FIG. 19 taken along 24-24. As discussed above with reference to the front support of FIG. 24, the rear support of FIG. 26 is formed of a tubular material having a stadium shape.

That is, the cross-section of the rear support includes two straight sides 242 and rounded ends 241. Of course, in other embodiments, the rear support may have a cross sectional shape of a rounded rectangle, circle, oval, ellipse, or any other suitable shape.

Figure 27:
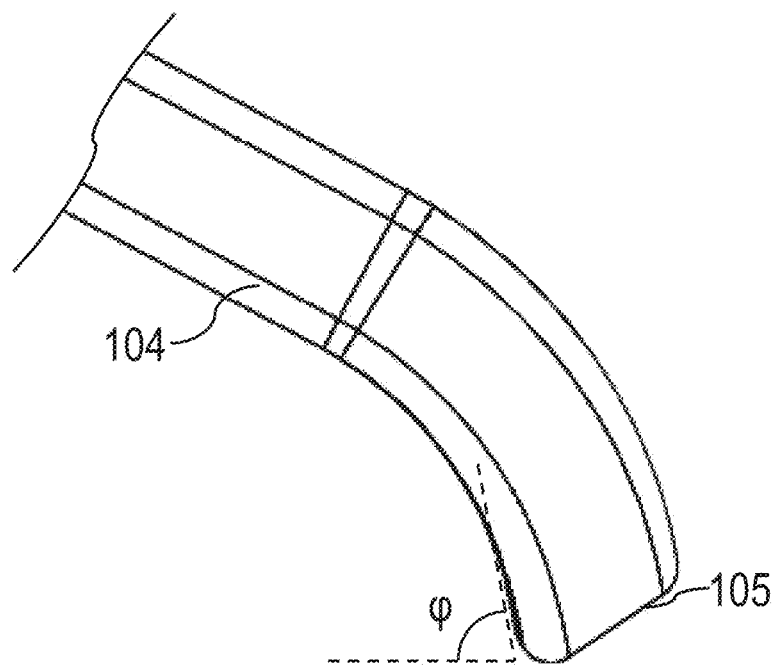
FIG. 27 is a side view of one embodiment of a rear support of the chair of FIG. 9B.

FIG. 27 is a side view of one embodiment of a rear support of the chair of FIG. 9B. The rear support shown in FIG. 27 differs from that shown in FIG. 25 as the rear support curves towards the ground at a transition between the rear leg 104 and the rear base 105. Such an arrangement shortens the overall length of the rear support, as the curved portion of the rear support approached and contacts the ground in a shorter distance compared to a straight rear support. Accordingly, the rear support of FIG. 27 makes a contact angle of φ relative to the ground (i.e., a horizontal plane), which in the depicted embodiment is between 70° and 90°. Of course, any suitable angle may be employed for a curved rear support, as the present disclosure is not so limited.

Figure 28:
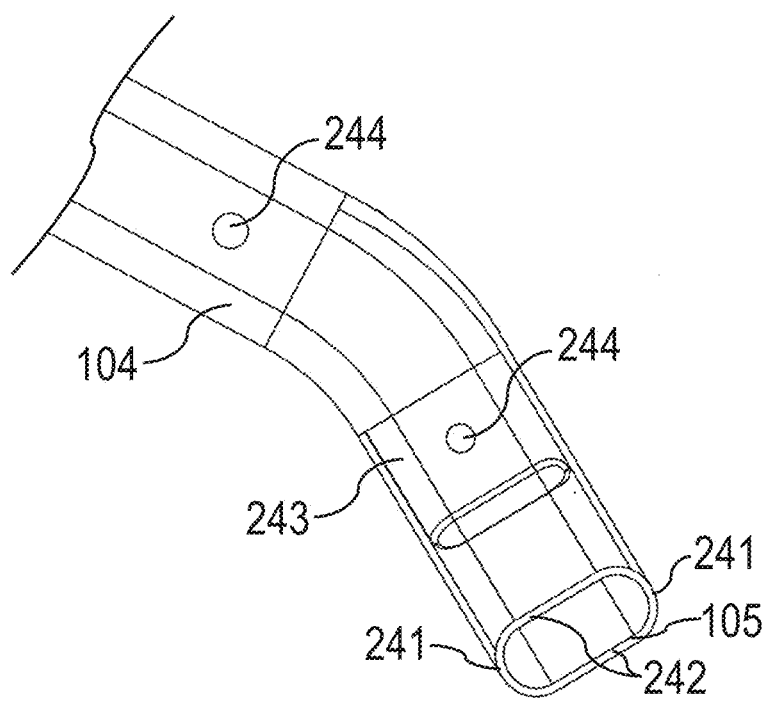
FIG. 28 is a cross-sectional view of the rear support of FIG. 9B taken along line 28-28.

FIG. 28 is a cross-sectional view of the rear support of FIG. 9B taken along line 28-28. Similarly, to the embodiment shown in FIG. 26, the rear support of FIG. 28 is formed of a tube having a stadium shaped cross section with straight sides 242 and curved ends 241. Of course, in other embodiments, the rear support may have a cross sectional shape of a rounded rectangle, circle, oval, ellipse, or any other suitable shape. In the depicted embodiment, the rear support includes an insert 243, which is disposed inside of the curved section of the rear support and secured with rivets 244, or another suitable fastener. The inserts may provide added strength for the curved portion of the rear support.

Figure 29A:
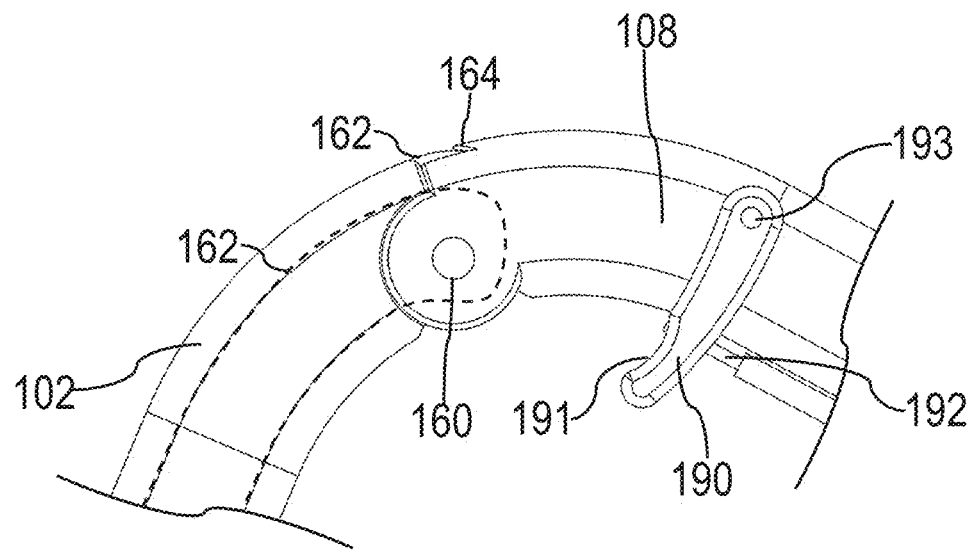
FIG. 29A is side view of one embodiment of rounded ends for a front support in a first configuration.
Figure 29B:
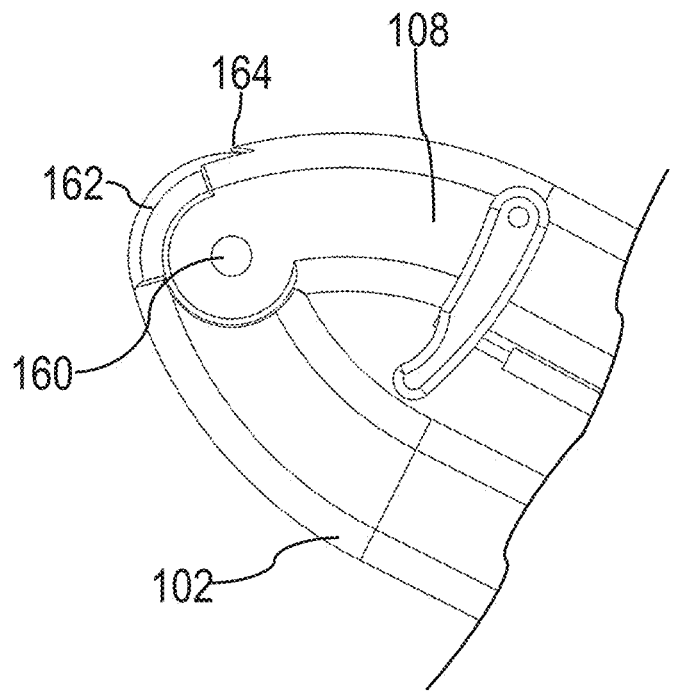
FIG. 29B is a side view of the rounded ends of FIG. 29A in a second configuration.

FIG. 29A is side view of one embodiment of rounded ends 162 for a front support in a first configuration, and FIG. 29B shows the rounded ends of FIG. 29A in a second configuration. As discussed above, a front leg 102 is rotatably coupled to a central beam 108 at a hinge 160, which allows the front leg to rotate between folded and unfolded positions. In one embodiment as shown in FIGS. 29A-29B, the front leg includes rounded ends 162 that occupy the space between the front leg and the central beam as the front leg is rotated to a folded configuration. In the embodiment shown, the rounded ends are formed in the center of the front leg and fit into a corresponding slot 164, formed in the central beam 108. The rounded ends are circularly shaped such that when the front leg is rotated to a folded configuration shown in FIG. 29B the rounded end occupies a gap that would otherwise form between the front leg and the central beam. Put another way, the rounded ends create a substantially continuous surface between the central beam and the front leg regardless of the angle of the front leg relative to the central beam. Such an arrangement inhibits the introduction of foreign objects into a gap between the front leg and central beam, which may otherwise interfere with rotation of the front leg.

According to one embodiment as shown in FIG. 29A, a chair may include a trigger 190 disposed on a central beam 108 which is actuable to control a hub of a chair (for example, see FIGS. 12A-12D). In one embodiment, the trigger is rotatably coupled to the central beam at trigger pivot 193 so that the trigger is rotatable between actuated and non-actuated positions. The trigger may be coupled to a trigger pin 192, which transfers the rotational motion of the trigger between the actuated and non-actuated positions into substantially linear motion. In one embodiment as shown in FIG. 29A, the trigger may include a concave depression 191 which is sized and shaped to receive a finger of a user.

In some embodiments, a chair may include a sun shade that is adjustable relative to the chair and may be easily stowed. The sun shade may be attached to a backrest rail of a backrest or backrest stiles so that the sun shade may be positioned and held over a seated user's head. In one embodiment, a sun shade may be secured to a chair with one or more retaining clips to which the sun shade may be rotatably coupled. In one embodiment, the sun shade may be coupled to each of the retaining clips via a friction hinge so that a user may easily set the position of the sun shade. Such an arrangement may also allow a user to fold the sun shade against the backrest for storage and the sun shade will be kept in the stowed position until a user sets the sun shade in another position.

Figures 30A, 30B, 30C:
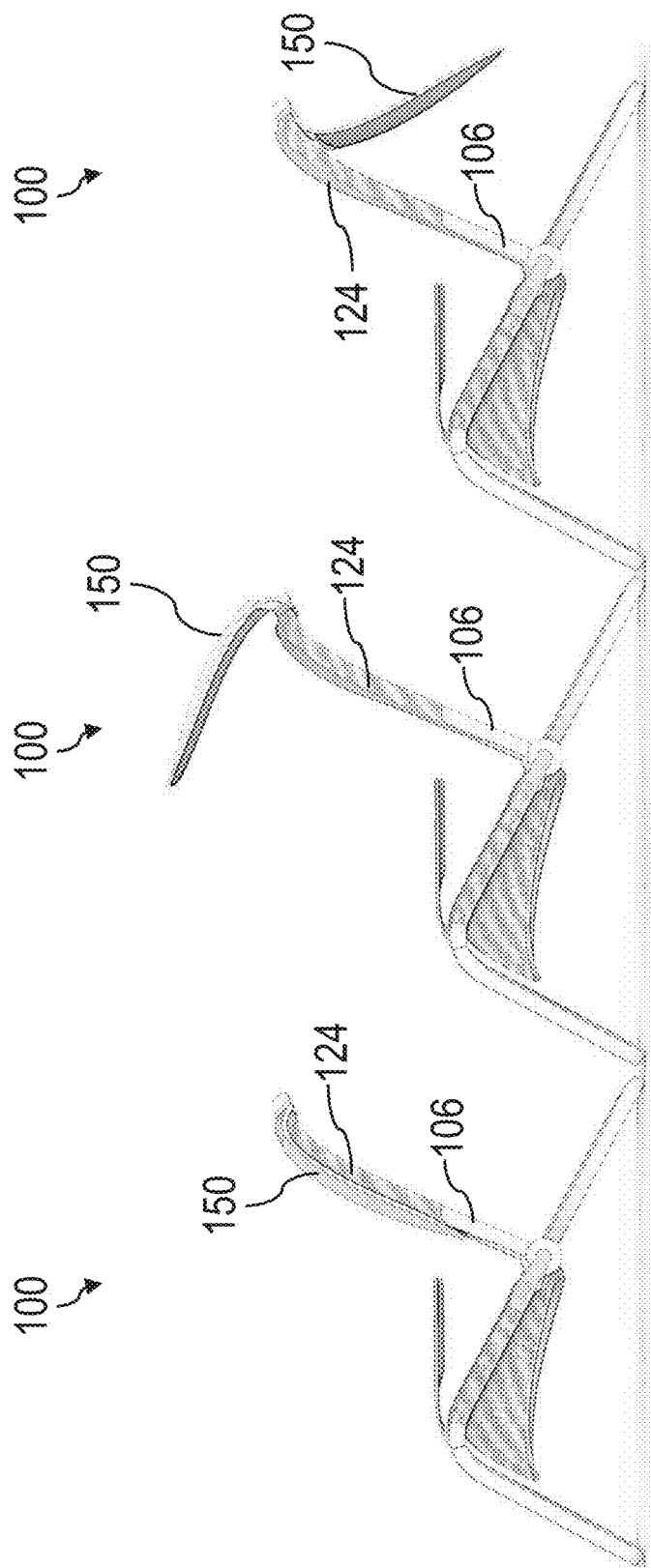
FIG. 30A is a side view of the chair of FIG. 1 including a sun shade in a first position.
FIG. 30B is a side view of the chair and sun shade of FIG. 30A in a second position.
FIG. 30C is a side view of the chair and sun shade of FIG. 30A in a third position.

FIG. 30A is a side view of the chair 100 of FIG. 1 showing movement of one embodiment of a sun shade 150. The sun shade 150 may be moved to a plurality of positions for storage or for sun blocking. In FIG. 30A, the sun shade is shown stored against backrest surface mater so that the sun shade effectively keeps the backrest flat and does not occupy significantly more volume than the backrest alone. In FIG. 30B, the sun shade is shown in a deployed position which may be used to block the sun when a user is seated. In FIG. 30C, the sun shade is shown temporarily positioned behind the backrest surface material 124. The sun shade may be positioned behind the backrest surface material by a seated user when the user does not want to store the sun shade, but also does not want to block the sun temporarily. The sun shade 150 may move between the positions shown in FIGS. 30A-30C through application of force by a user. The sun shade may be attached to the backrest 106 via a friction hinge so that the sun shade maintains its position when released in a chosen position by a user. In some embodiments, the sun shade may also stow flat against the back of the backrest surface material instead of the front. In some embodiments, the sun shade may be easily detachable for separate storage or use.

Figure 31:
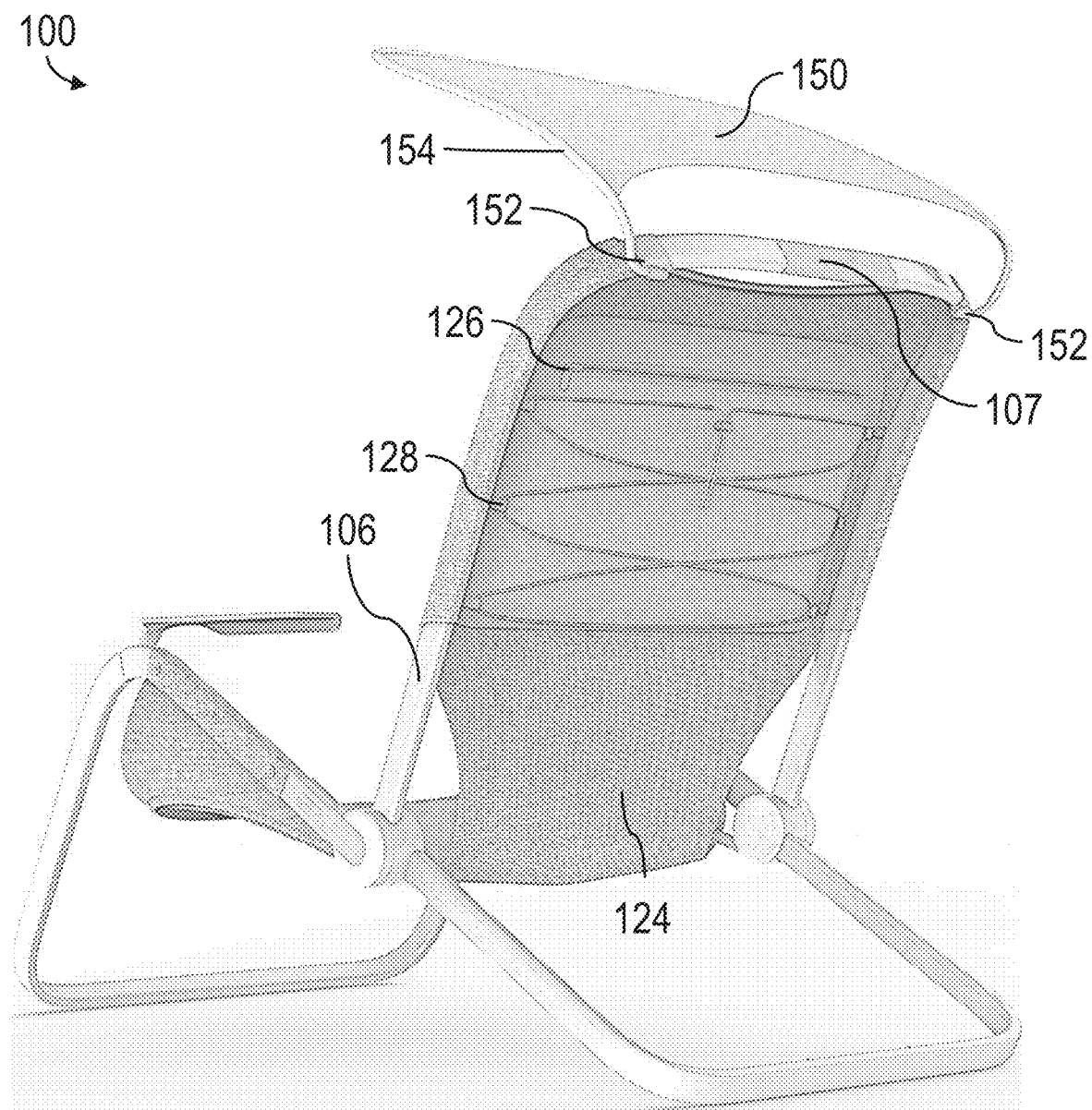
FIG. 31 is a rear view of the chair of FIG. 1 showing one embodiment of backrest storage.

In one embodiment as shown in FIG. 31, a sun shade 150 includes two rail clips 152 that attached the sun shade to a chair 100. The rail clips may be flexible such that the rail clips may be deformed around backrest rail 107 and snapped into place on the backrest rail to releasably retain the sun shade on the backrest rail. In other embodiments, the rail clips 152 may be fastened to the backrest rail 107 with a suitable fastener such a screw, bolt, or adhesive, or, in one embodiment, may be integrally formed with the backrest rail. The rail clips retain a sun shade frame 154 that defines a perimeter of the sun shade 150. The sun shade frame is retained by the rail clips such that the frame may be rotated relative to the rail clips to adjust the position of the sun shade. According to one embodiment as shown in FIG. 31, the sun shade may be curved in a downward concave arc originating from the retaining clips 152.

In some embodiments, a chair may include one or more storage arrangements that allow a user to stow various items in or on the chair. For example, a chair may include one or more zippered pockets, cargo nets, elastic straps, tie-downs, hooks, open pockets, or any other suitable storage arrangement. The storage arrangements may be disposed at various locations of the chair, including, but not limited to, near the central beams, on a backrest, or beneath a seat.

FIG. 31 is a rear side view of the chair 100 of FIG. 1 showing one embodiment of optional backrest storage. In particular, the backrest surface material includes an integrated zippered pocket 130 as well and a cargo net 128 to allow a user to store a variety of large and small objects. As shown in FIG. 31, the pocket 130 and cargo net 128 do not substantially increase the thickness of the backrest surface material when no items are stored in them, so that the chair may maintain a low profile when folded. In some embodiments, the zipper on the pocket may be waterproof or water resistant to protect items in the pocket from moisture.

Figure 32:
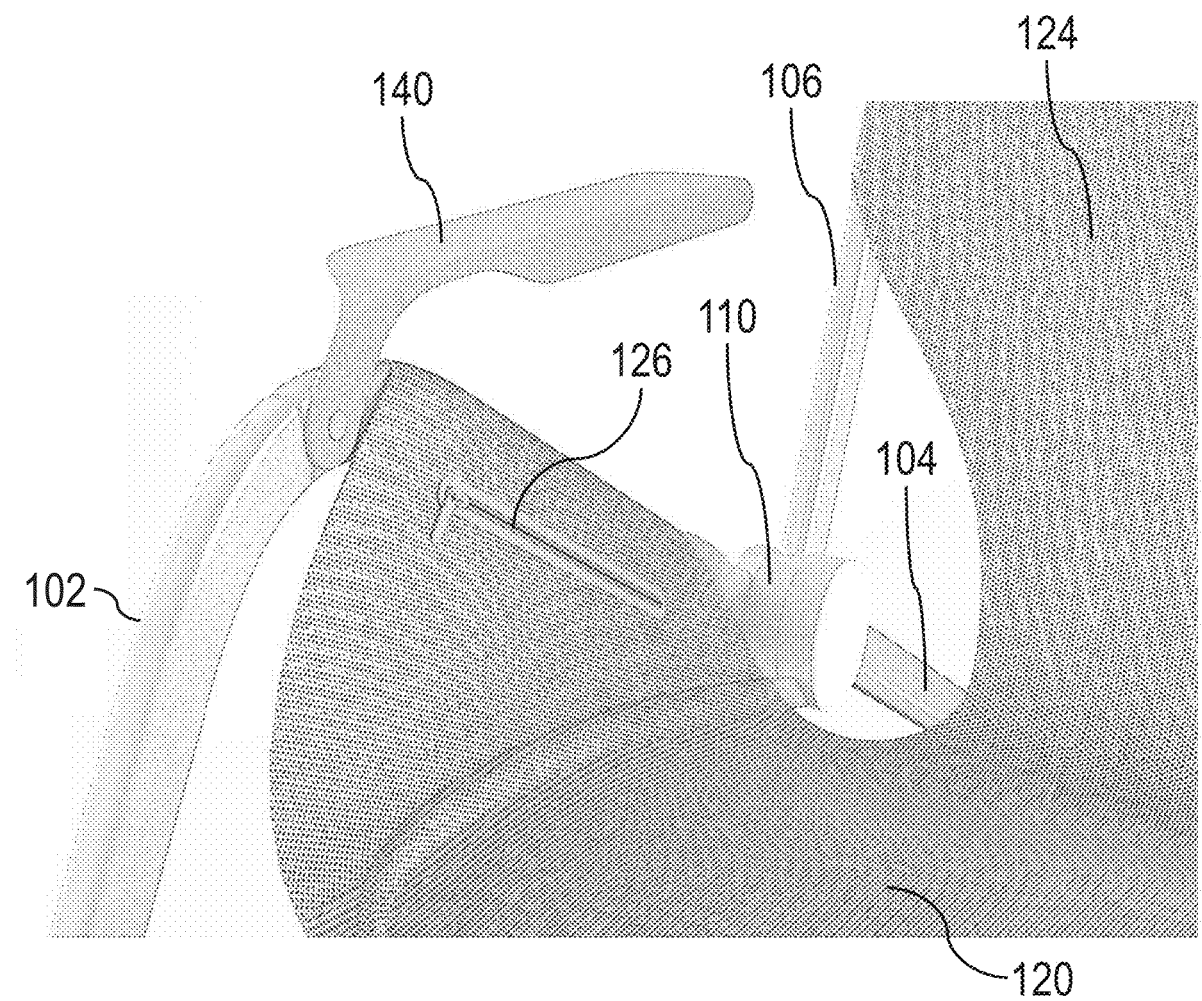
FIG. 32 is an enlarged perspective view of a portion of the chair of FIG. 1.

FIG. 32 is an enlarged perspective view of the chair 100 of FIG. 1 showing an additional zippered pocket 130. Like the pocket integrated into the backrest surface material, the pocket 130 of FIG. 32 is formed in a seating surface 120 is does not significantly expand the thickness of the seating profile when no items are stored in the pocket. The pocket may be waterproof or water resistant and may correspondingly include a waterproof or water resistant zipper. The chair 100 may include any suitable number of pockets in any desirable locations, as the present disclosure is not so limited.

Figure 33:
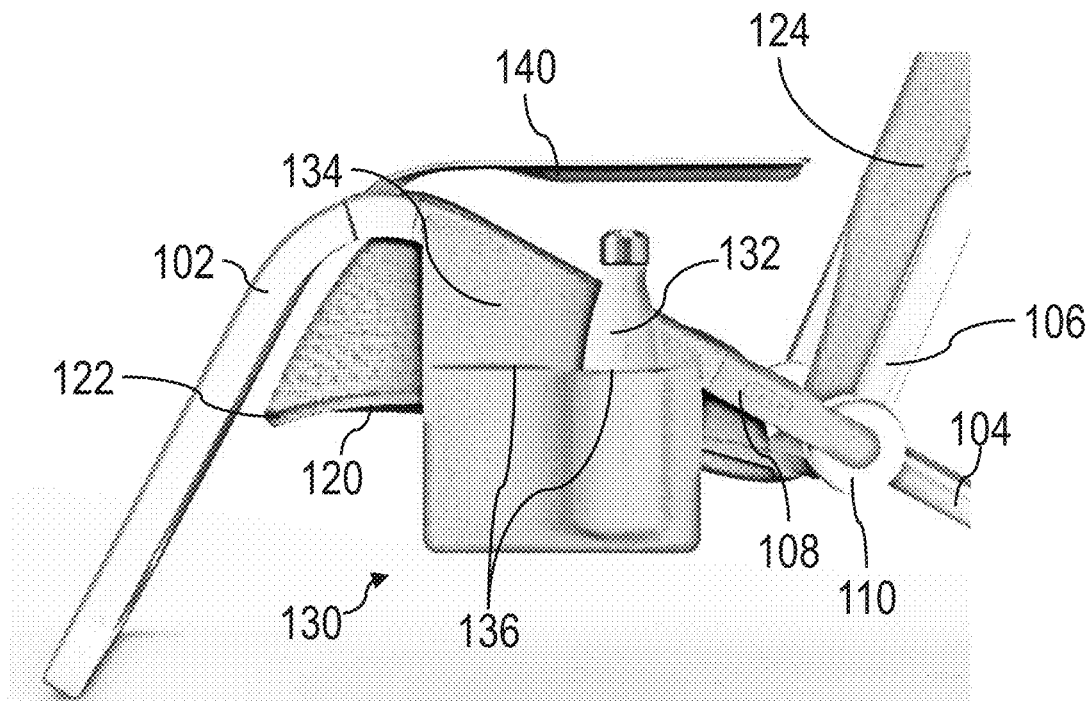
FIG. 33 is a side view of one embodiment of a storage pouch for a chair.
Figure 34:
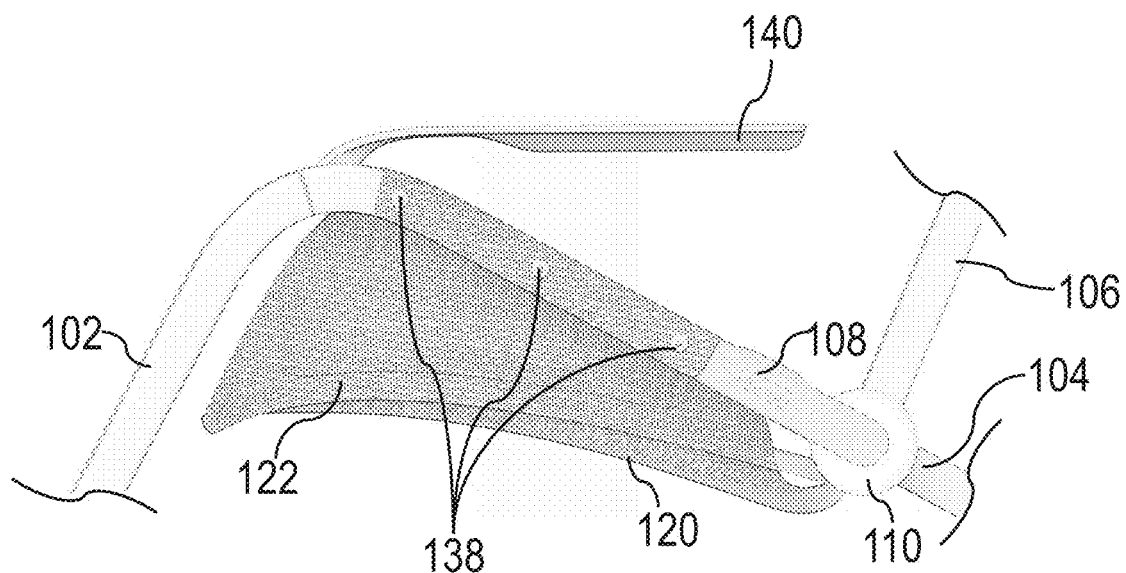
FIG. 34 is a side view of one embodiment of storage pouch attachment points.

FIGS. 33 and 34 are side views of one embodiment of a storage pouch 130 for a chair and attachment arrangement for the storage pouch, respectively. As shown in FIG. 33, the storage pouch 130 includes a back plate 134 and a plurality of pockets 136 suitable to hold longer objects such as a water bottle 132, cup, can, and glass bottle. The back plate 134 is attached to central beam 108 that supports the weight of back plate and any items disposed in the pockets 136. The back plate is rigid so that the storage pouch is kept in a plane parallel to the central beam 108. Such an arrangement ensures it is easy to place and extract object from the pockets 136, as the storage pouch does not significantly move when objects are place into or removed from the pockets. As shown in FIG. 34, the central beam 108 includes a plurality of attachment points 138 that engage the back plate 134. In the embodiment shown in FIG. 34, the attachment points are arranged as snap fasteners, which releasably engage and secure the storage pouch back plate. Of course, any suitable attachment arrangement may be employed, including, but not limited to, magnetic fasteners and buttons.

In some embodiments, a chair may include a carrying strap that may be used to carry the chair when the chair is in a folded configuration. The carrying strap may be attached to various locations on the chair to facilitate carrying. In one embodiment, the carrying strap may be attached at two locations on the chair to form a single loop strap suitable for carrying on a single shoulder. In another embodiment, a carrying strap may be attached at three or more locations to form a double loop strap suitable for carrying on both shoulders. In some embodiments, the carrying strap may be selectively attached to any number of attachment points on the chair to allow a user to choose how many loops the carrying strap is configured with. Of course, any suitable number of straps may be employed to allow a user to carry the chair in the folded configuration, as the present disclosure is not so limited.

Figures 35A, 35B, 35C:
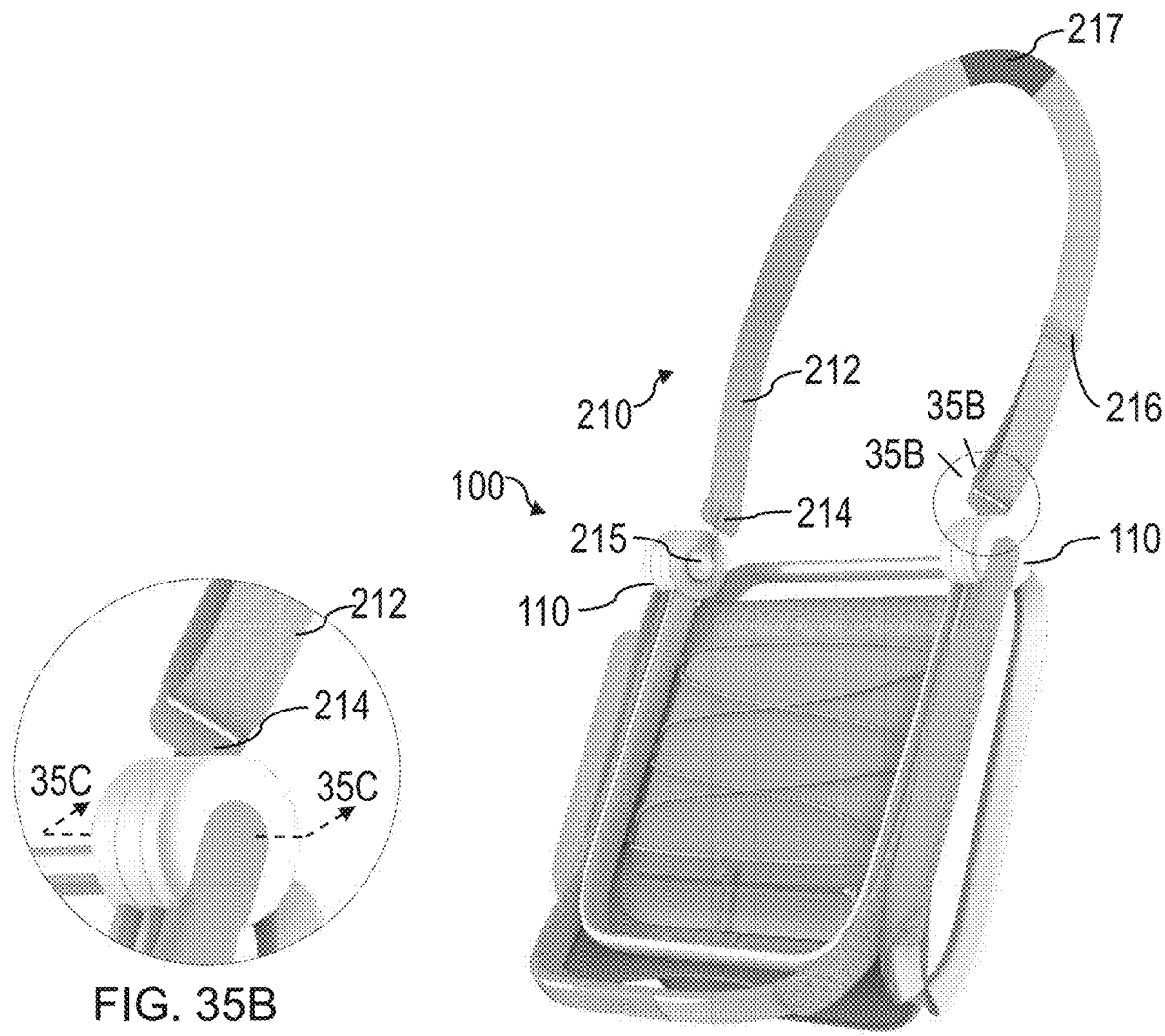
FIG. 35A is a perspective view of one embodiment of a carrying strap for a chair in a first configuration.
FIG. 35B is an enlarged view of the area encircled by line 35B-35B of FIG. 35A.
FIG. 35C is a cross-sectional view of the chair of FIG. 35A taken along line 35C-35C of FIG. 35B.

FIG. 35A is a perspective view of one embodiment of a carrying strap 210 for a chair 100 in a first configuration and FIG. 35B is an enlarged view of the area encircled by line 35B-35B. As shown in FIGS. 35A-35B, the carrying strap includes a fabric strap 212 with end caps 214 on either end. The end caps include a loop that fits around a flanged projection 215 on hub 110. Accordingly, the end caps may freely rotate about the flanged projections 215 but allow a user to lift the chair with the fabric strap. The carrying strap also includes a strap adjuster 216, which allows the effective length of the carry strap between the end caps to be adjusted. In the configuration of FIG. 35A, the carrying strap forms a single shoulder carrying portion suitable for carrying the chair on one shoulder. The carrying strap is also removable from the flanged projections so that the carrying strap may be stored separately. A separate removable pad may be attached to the carrying strap.

FIG. 35C is a cross-sectional view of the chair of FIG. 35A taken along line 35C-35C of FIG. 35B showing the functionality of one embodiment of a flanged projection 215. As shown in FIG. 35C, the flanged projection receives and retains an end cap line 213 which is looped around the flanged projection 215. The flanged projection inhibits the end cap line from easily falling out when the end cap line is under tension.

FIG. 36A is a perspective view of the carrying strap 210 of FIG. 35A in a second configuration and FIG. 36B is an enlarged view of the area encircled by line 36B-36B. As shown in FIG. 36A, the end caps 214 of the carrying strap remain attached to the flanged projections 215 on the hubs 110. In the embodiment of FIGS. 36A-36B, the rear support is configured to rotate about the hub 110, and so the rear support legs 104 are disposed adjacent to stiles 106. However, a central portion 217 of the fabric strap 212 is held in clips 218 which are disposed on rear support so that the carrying strap forms two distinct backpack strap portions which are suitable for carrying the chair 100 on two shoulders simultaneously. The fabric strap is selectively securable in the clips 218 so that a user may choose the desired configuration of one strap portion or two strap portions. In other embodiments, the clips may be disposed on any suitable portion of the chair, such as a backrest backrest rail 107, as the present disclosure is not so limited. In embodiments including a spate removable pad for the strap, when the strap is converted from the shoulder strap configuration to the backpack configuration, the pad may be removed from the strap and optionally attached to a portion of the frame for storage.

FIG. 36C is a cross-sectional view of the chair of FIG. 36A taken along line 36C-36 of FIG. 36B showing one embodiment of a clip 218 releasably retaining the fabric strap 212. As shown in FIG. 36C, the clip is attached to a rear base 105, although in other embodiments the clip may be disposed on a backrest backrest rail or another suitable member of the chair. In one embodiment as shown in FIG. 36C, the clip includes a lip 219 which narrows a gap between the clip and the rear base in which the fabric strap is disposed. The clip may be formed of a flexible or elastic material such that the lip may be moved away from the rear base to widen the gap between the clip and the rear base. Accordingly, the fabric strap 212 may be slid into the clip, whereupon the clip may be released so that the lip 219 may narrow the gap to a width less than that of a thickness of the strap. In this manner, the clip may retain the strap inside of the clip. To release the strap from the clip, a user may lift the clip (i.e., move the lip away from the rear base) to widen the gap so that the strap may be removed. Of course, any suitable clip may be employed to selectively retain the fabric strap, as the present disclosure is not so limited.

Figure 37:
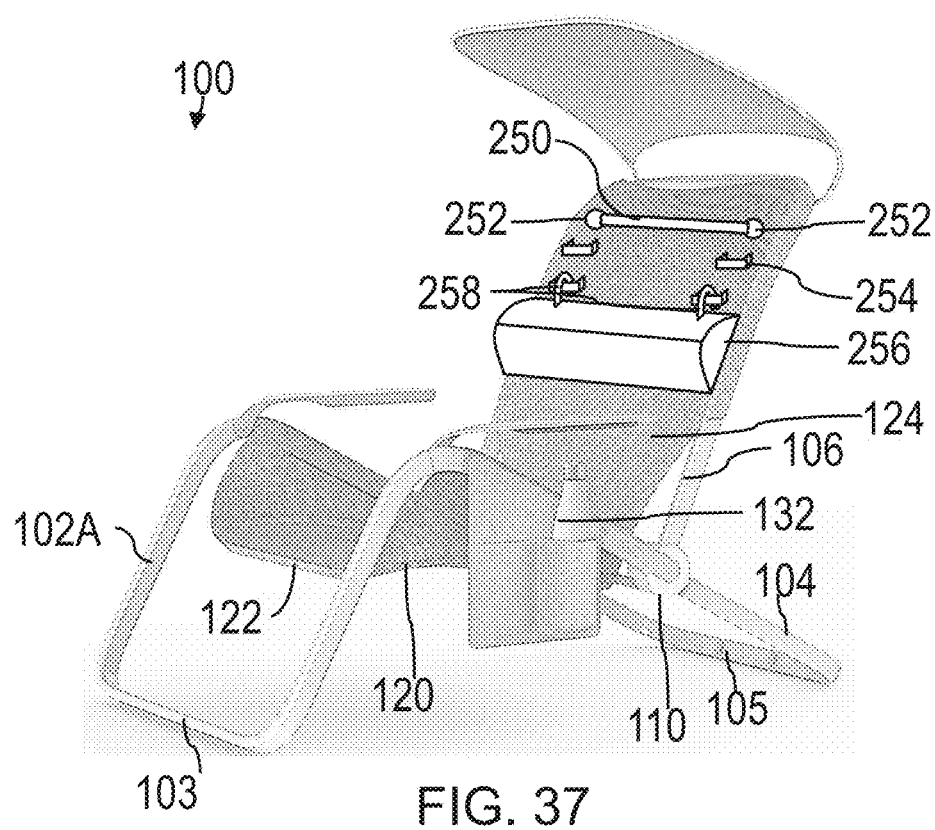
FIG. 37 is a front perspective view of another embodiment of a chair.
Figure 38:
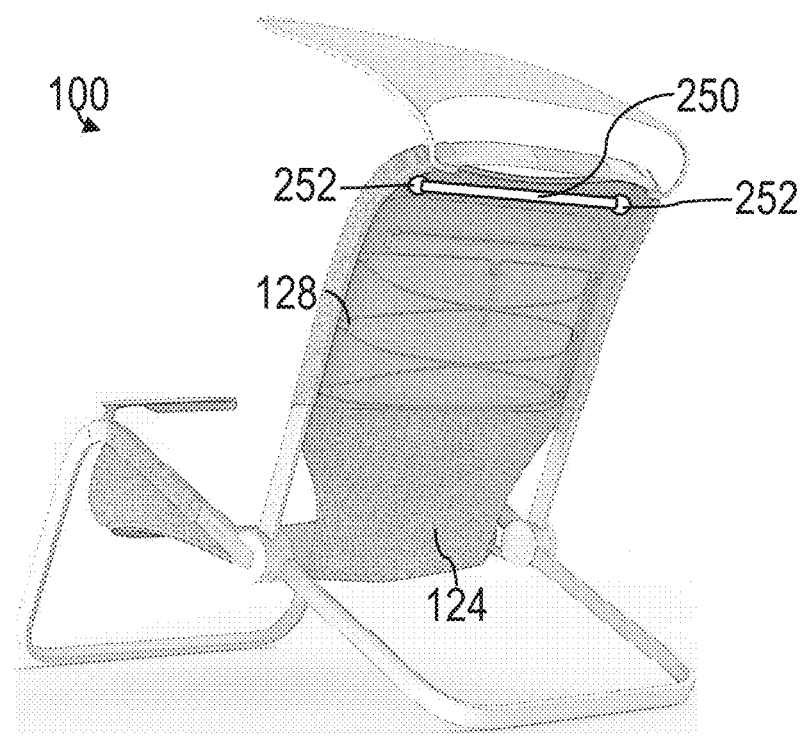
FIG. 38 is a rear perspective view of the chair of FIG. 37.

FIG. 37 is a front perspective view and FIG. 38 is a rear perspective view of another embodiment of a chair 100 including a modular accessory retainers. As shown in FIG. 37, the backrest surface 124 of the chair includes an elastic strap 250 that is secured around the backrest through elastic strap holes 252. The elastic strap is expandable to receive one or more accessories that may be retained to the backrest of the chair while in use. For example, in one embodiment the elastic strap may expand and retain a pillow against the backrest for head support. According to this embodiment, the elastic strap may be disposed in the position shown near the top of the backrest. Of course, in other embodiments, one or more elastic straps may be disposed in various vertical locations on the backrest to selectively secure one or more accessories to the backrest.

In one embodiment as shown in FIGS. 37-38, the chair 100 may include flexible loops 254 disposed on the backrest surface 124. The flexible loops may be configured to cooperate with one or more accessory hooks 258 that may be disposed on one or more accessories. In one embodiment, a pillow 256 may include multiple accessory hooks 258 that are releasably retained in the flexible loops 254. The flexible loops may allow the accessory (e.g., pillow 256) to be repositioned at a variety of locations along the backrest, so that a pillow could be used for lumbar support, back support, neck support, or head support. The flexible loops may be formed of a fabric material, elastic material, or another other suitable material.

Figure 39:
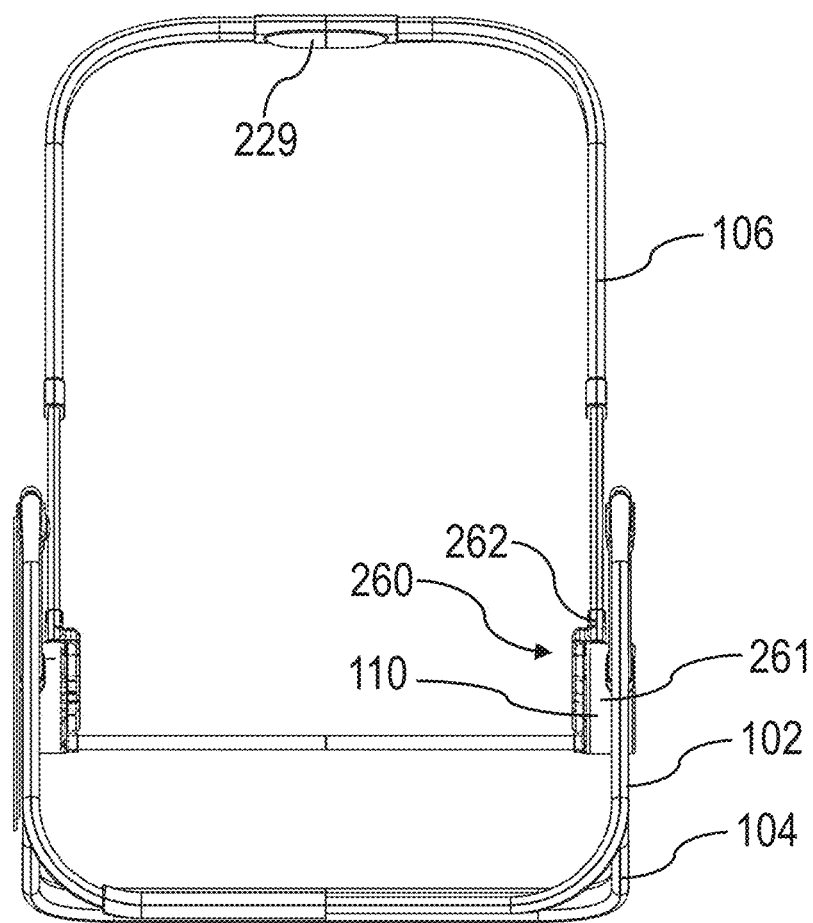
FIG. 39 is a front view of another embodiment of a chair.

FIG. 39 is a front view of another embodiment of a chair having an alternative hub 110 to those described above. As shown in FIG. 39, the chair includes front legs 102, rear legs 104 and backrest stiles 106 that function in a manner similar to the chair of FIGS. 3-11B. That is, the front legs and backrest stiles rotate relative to central support beams of the chair while the rear legs translate relative to the central support beams. Accordingly, the chair of FIG. 39 may be moved between unfolded and folded configurations. According to the embodiment of FIG. 39 and in contrast to previously described embodiments, the hub 110 includes a backrest coupler 260 that is configured to reduce sand, water, and/or other particle ingress into the hub. In contrast to prior embodiments, the backrest coupler 260 connects the backrest stiles 106 to the hub through a side of the hub rather than through a slot formed on a cylindrical surface 261 of the hub (for example, see FIGS. 13A-13B). Instead of extending through a slot formed on the cylindrical surface 261 of the hub, the backrest coupler 260 includes a backrest stile connector 262, which receives the backrest stile 106 and allows the backrest stile to rotate about the cylindrical surface 261 without extending through it. The backrest coupler is connected to a rotational coupler disposed in the hub (for example, see FIGS. 12A-12D) with a shaft which extends through a side of the hub. In the depicted embodiment, the side of the hub is configured as a vertical plane, and the shaft extending through the side of the hub may have a reduced surface area on which water and/or particles can collect and enter into the hub. In some embodiments, a sealed bearing, or other appropriate component may be used to further improve the resistance of the hub to particle and water ingress. Of course, any suitable rotational coupler between the hub and the backrest stiles 106 may be employed, as the present disclosure is not so limited.

In one embodiment as shown in FIG. 39, a backrest actuator (for example, see FIGS. 19-21) may include a flexible cover 229. The flexible cover may allow a user to depress (i.e., actuate) the backrest actuator while inhibiting ingress of water, sand, or other particles into the backrest. In some embodiments, the flexible cover may have a serrated surface to improve grip for a user operating the backrest actuator. The flexible cover may be formed of any suitable compliant material such as rubber, silicone, etc.

Figure 40:
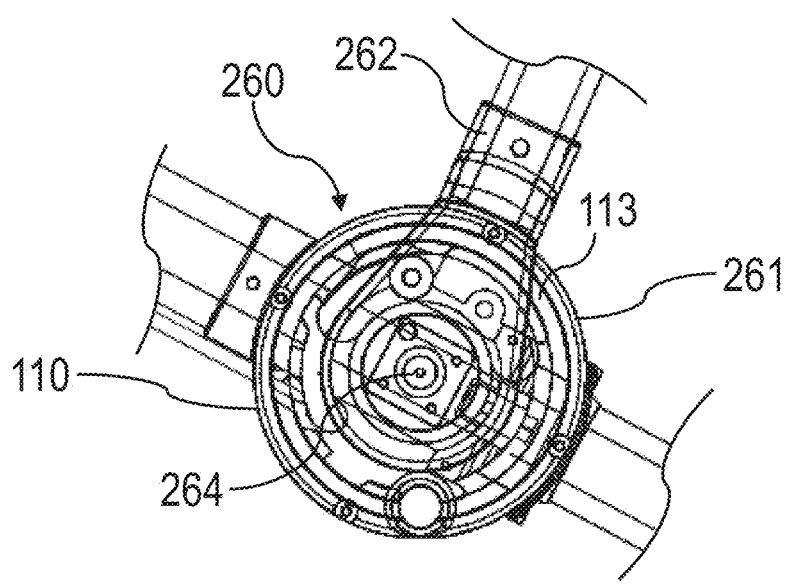
FIG. 40 is a side view of another embodiment of a hub of the chair of FIG. 39.

FIG. 40 is a side view of another embodiment of the hub 110 of the chair of FIG. 39. As shown in FIG. 40, the backrest coupler 260 (shown transparently for clarity) includes a backrest stile connector 262 that receives a backrest stile and is connected to the hub 110 via a shaft 264. The shaft in turn is coupled to a rotational coupler 113, which functions similarly to the rotational coupler of FIGS. 12A-12D. Accordingly, the hub of FIG. 40 has the same functionality as the hub of FIGS. 12A-12D, but the surface area for water or particle collection and ingress is reduced. That is, rather than a slot formed in a cylindrical surface 261 of the hub, a single hole accommodating the shaft 264 is employed. Such a hole may be further sealed (e.g., with a sealed bearing) to further inhibit water and particle ingress. According to the embodiment of FIG. 40, the backrest stile connector 262 allows the backrest stile to rotate about the hub across a cylindrical surface 261 of the hub. That is, the backrest stile connector is formed so that the backrest stile is held inward relative to the hub of an attachment location between the shaft 264 and the backrest stile connector 262. Put another way, the backrest stile connector wraps around the hub inward relative to the side of the hub (e.g., into the page). Of course, the backrest stile connector may have any suitable configuration and the backrest stile may be disposed inward or outward relative to the hub, as the present disclosure is not so limited.

Figure 41:
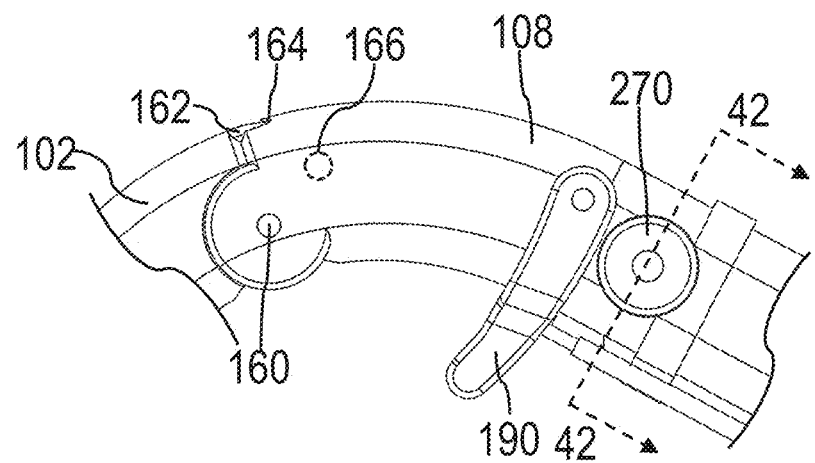
FIG. 41 is a side view of another embodiment of a front support and central beam.

FIG. 41 is a side view of another embodiment of a front leg 102 and central beam 108. As shown in FIG. 41 and similarly to the embodiment described with reference to FIG. 29A, the front leg and central beam are rotatably coupled to one another via a hinge 160. Additionally, the central beam 108 includes a rotatably mounted trigger 190 that may be coupled to a corresponding hub. However, in contrast to the embodiment of FIG. 29A, the central beam 108 of the embodiment shown in FIG. 41 includes at least one ball detent 166 which engages the front leg 102 when the front leg is in a folded configuration and an unfolded configuration. That is, in the embodiment shown in FIG. 41, the ball detent 166 is spring loaded and engages a recess or depression formed in the front leg 102 to provide resistance to the rotation of the front leg when the front leg is folded or unfolded. Accordingly, the front leg 102 may rotate freely about the hinge when the front leg is between the folded and unfolded configurations, and is releasably retained when fully folded or unfolded. Of course, while a ball detent is employed in the embodiment of FIG. 41, any suitable arrangement for selectively retaining the front leg in a folded or unfolded configuration may be employed, as the present disclosure is not so limited. Additionally, in some embodiments, the ball detent may engage the front leg in one of the folded configuration or the unfolded configuration such that the front leg is releasably retained in one position and is free to rotate in any other rotational position. Further, in one embodiment, a spring, such as a torsion spring, may be positioned to bias the front leg into the unfolded position such that when the front leg is free from being retained by the ball detent, the front legs automatically fully deploy to the use/unfolded positon.

According to one embodiment as shown in FIG. 41, the central beam 108 also includes at least one button 270 that is configured as a flanged cylinder (e.g., a mushroom shape). The at least one button 270 may be used to mount various elements and/or accessories to the central beam. For example, the at least one button may be employed to secure a fabric seating surface to the central beam 108. As another example, the at least one button may be employed to secure one or more accessories such as a pouch (for example, see FIGS. 33-34), foldable table (for example, see FIG. 43), a carrying strap (for example, see FIGS. 35A-35C), or any other desirable accessory. In some embodiments, the at least one button may be used to secure multiple accessories and a seating surface of a chair. Of course, the at least one button may be employed to secure any desirable number of accessories or elements of a chair, as the present disclosure is not so limited.

Figure 42:
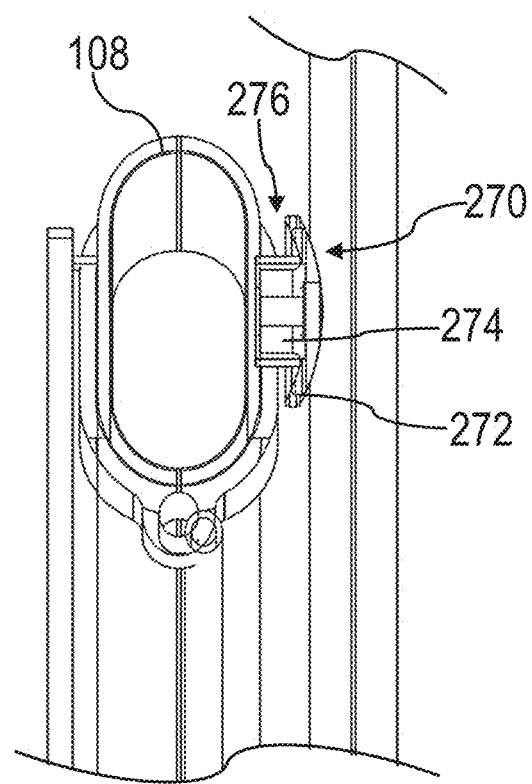
FIG. 42 is a cross-sectional view of the central beam of FIG. 41 taken along line 42-42.

FIG. 42 is a cross-sectional view of the central beam 108 of FIG. 41 taken along line 42-42 showing the shape of the at least one button 270. As shown in FIG. 42, the at least one button includes a flanged top 272 and a body 274. The body 274 has a smaller diameter than the flanged top 272 so that a gap 276 is formed between the flanged head and the central beam 108. The gap may receive a string, cable, fabric, or other suitable element. The string, cable, fabric, or other element held in tension may be retained in the gap 276 as the flanged top 272 inhibits any element from sliding off the body 274. A chair may include any desirable number of buttons 270 on any member of a chair frame so that any number or type of accessories may be received and retained to the frame.

Figure 43:
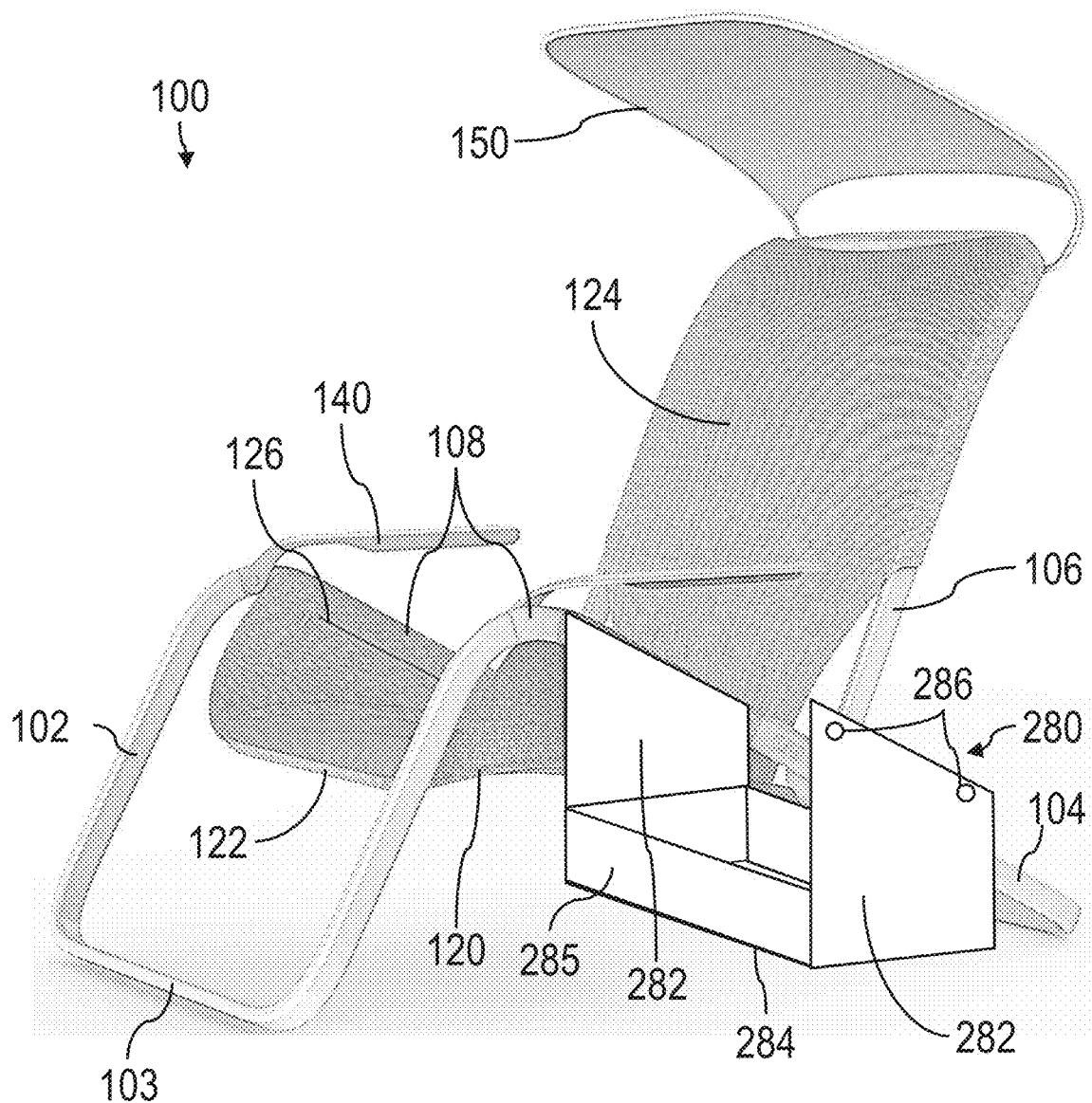
FIG. 43 is a front perspective view of one embodiment of a chair having a folding table.

FIG. 43 is a front perspective view of one embodiment of a chair 100 having a folding table 280. According to one embodiment as shown in FIG. 43, the folding table 280 is configured to be suspended between two side-by-side chairs. The folding table includes two vertical hangers 282, which are configured to be suspended from a central beam of the chair 100. In particular, attachment regions 286 are configured to be received by a corresponding structure on a central beam. For example, in one embodiment, the attachment regions 286 may be received by at least one button (for example, see FIGS. 41-42). Of course, any suitable fastener may be employed, such as hook and loop fasteners, snap buttons, magnetic fasteners, etc. The folding table 280 also includes a base 284 and sidewalls 285 that connect the vertical hangers 282. The base and sidewalls form a compartment that may be used to store various items. The vertical hangers 282, sidewalls 285, and/or base 284 may be composed of a flexible or foldable material (e.g., fabric) so that the foldable table may be removed from the chair and folded for storage. Of course, any suitable material may be employed, as the present disclosure is not so limited. In some embodiments, the base 284 and/or sidewalls 285 may include cup holders and/or storage pockets. In some embodiments, one or more shelves may be employed to provide additional storage volume or organization, as the present disclosure is not so limited. In some embodiments, a shelf may be sized and shaped to fit and be retained in an opening defined by the sidewalls 285.

Figure 44:
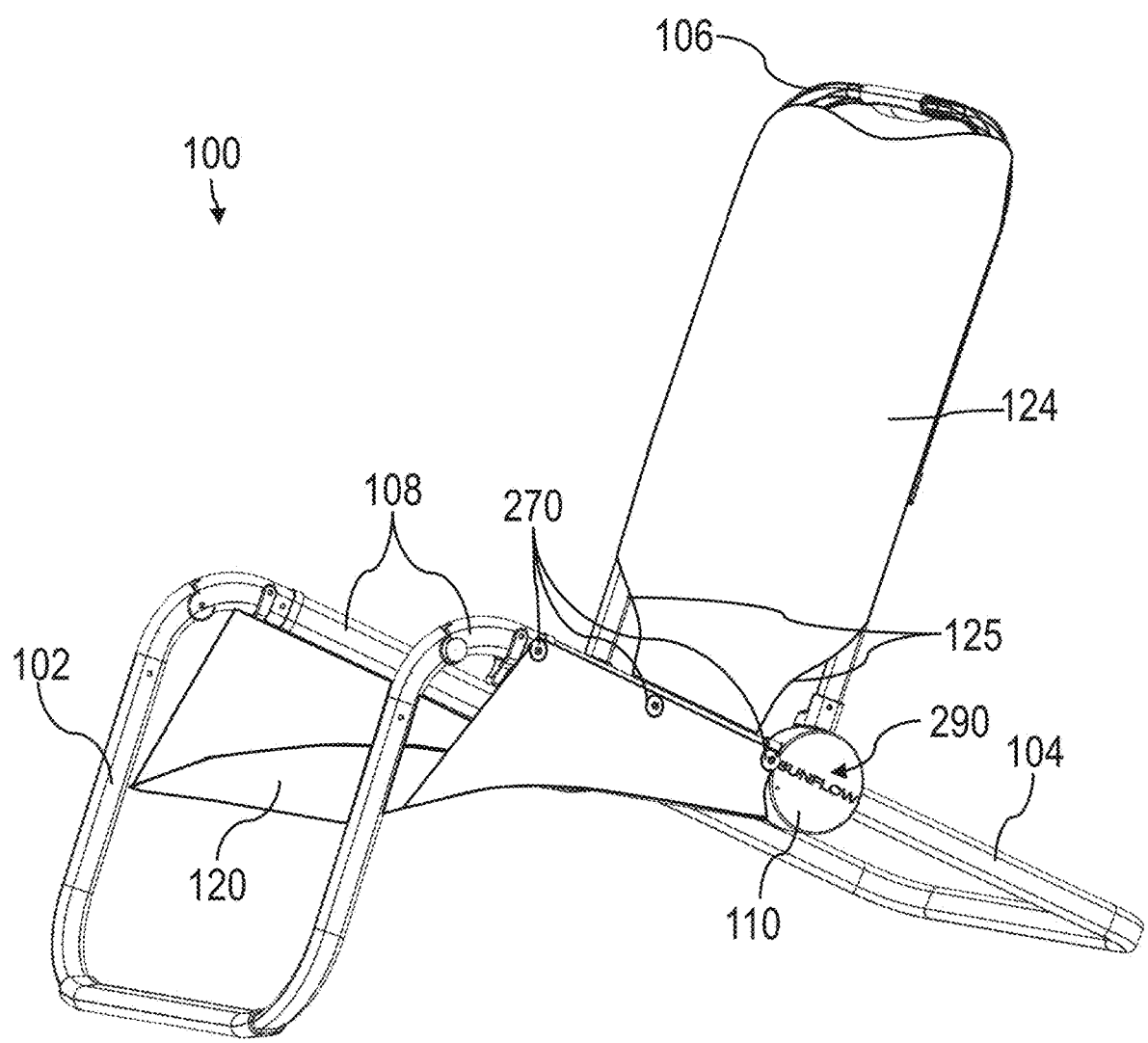
FIG. 44 is a front perspective view of yet another embodiment of a chair.

FIG. 44 is a front perspective view of yet another embodiment of a chair.

Figure 45:
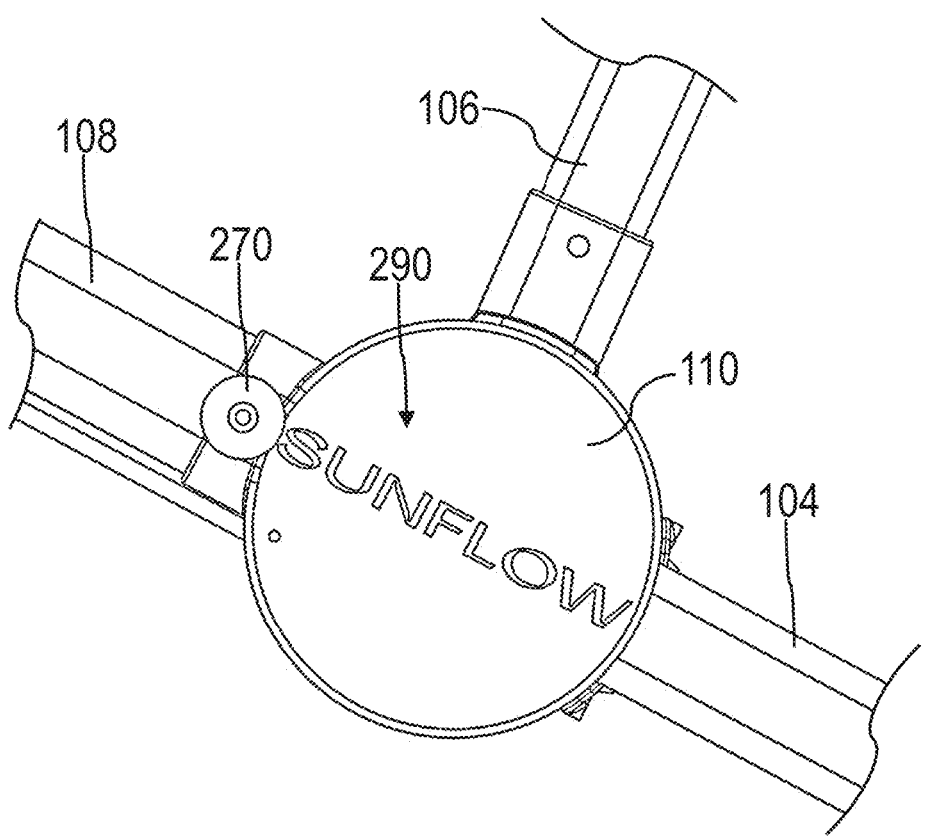
FIG. 45 is a side view of a hub of the chair of FIG. 44.

Similarly to previously discussed embodiments, the chair includes a front support having front legs 102, a rear support having rear legs 104, central beams 108, and backrest stiles 106. According to the embodiment in FIG. 44, the central beams include a plurality of buttons 270 which secure a seating surface 120 to the central beams 108. A backrest surface material 124 spans the backrest stiles and forms a backrest for a seated user. According to one embodiment, a plurality of buttons 270 may also be disposed on an interior of the backrest stiles 106 that secure the backrest surface material to the backrest stiles. In this arrangement, the buttons on the backrest stiles 106 may also be used to secure a pillow, towel, or other accessories to the chair. Of course, any suitable fastener or mounting arrangement for the backrest surface material and/or seating surface may be employed, as the present disclosure is not so limited. In one embodiment as shown in FIG. 45, the backrest surface material includes two cutouts 125 adjacent a lower end of the backrest stiles. Put another way, the backrest surface materials tapers inwardly from the backrest stiles near a lower end of the backrest stiles. In some cases, such an arrangement may allow the backrest surface material to cradle the back of a seated user. In one embodiment as shown in FIG. 44, a hub 110 may include a logo 290 that is parallel with the central beams 108 and/or rear legs 104.

FIG. 45 depicts a side view of the hub 110 of FIG. 44 clearly showing the logo 290. In one embodiment as depicted in FIG. 45, the logo 290 is aligned and parallel with the central beam 108 and the rear leg 104. Of course, any suitable logo may be employed having any desired orientation, as the present disclosure is not so limited.

Figure 47A:
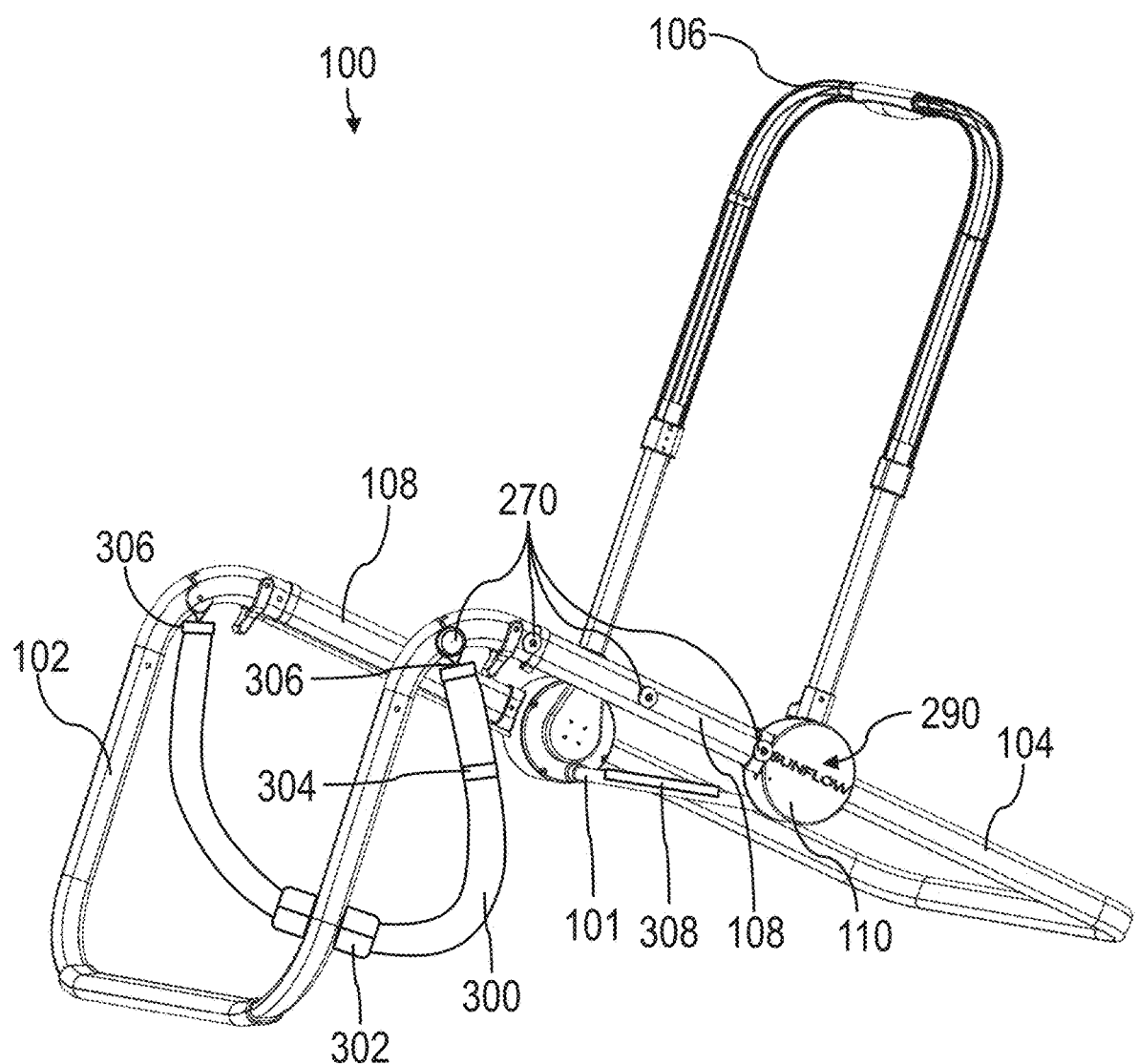
FIG. 47A is a perspective view of yet another embodiment of a chair including a carrying strap in a first configuration.

FIG. 47A is a perspective view of yet another embodiment of a chair 100 including a carrying strap 300 in a first configuration. In the embodiment depicted in FIG. 47A, the carrying strap 300 is configured to convert between a shoulder strap (e.g., forming a single loop), and backpack straps (e.g., forming two loops). As shown in FIG. 47A, the carrying strap includes a shoulder pad 302 which is disposed around the carrying strap. In one embodiment, the shoulder pad may include a hook-and-loop fastener flap such that the shoulder pad can wrap around and attach to other components of the chair, as will be explained below. Of course, any suitable fastener may also be employed to secure the shoulder pad to another component of the chair, including buttons, snap, zippers, etc. The carrying strap 300 may be adjustable by employing a slide adjuster 304 which allows the strap to be lengthened or shortened. The carry strap includes two attachment loops 306 which are secured around buttons 270. In the depicted embodiment, the attachment loops 306 are secured around buttons disposed on an interface between the front legs 102 and central beams 108. In this way, the carrying strap may be disposed beneath the seating surface when the chair is in the use position. Of course, the carrying strap 300 may be secured around any suitable button or attachment location on the chair, as the present disclosure is not so limited. In the configuration shown in FIG. 47A, the carrying strap 300 is in a single loop between two buttons 270.

In the embodiment shown in FIG. 47A, the crossbeam 101 extends between hubs 110. An attachment component 308 may be connected to or otherwise disposed on the crossbeam. In one embodiment, the attachment component is an elastic band 308. As will be discussed further with reference to FIG. 47B, the elastic band may expand to accommodate the shoulder pad 302 being wrapped around the crossbeam 101. The elastic band may retain the shoulder pad 302 in a central portion of the crossbeam 101. In some embodiments, the elastic band may be formed of a high-friction material such as rubber.

Figure 47B:
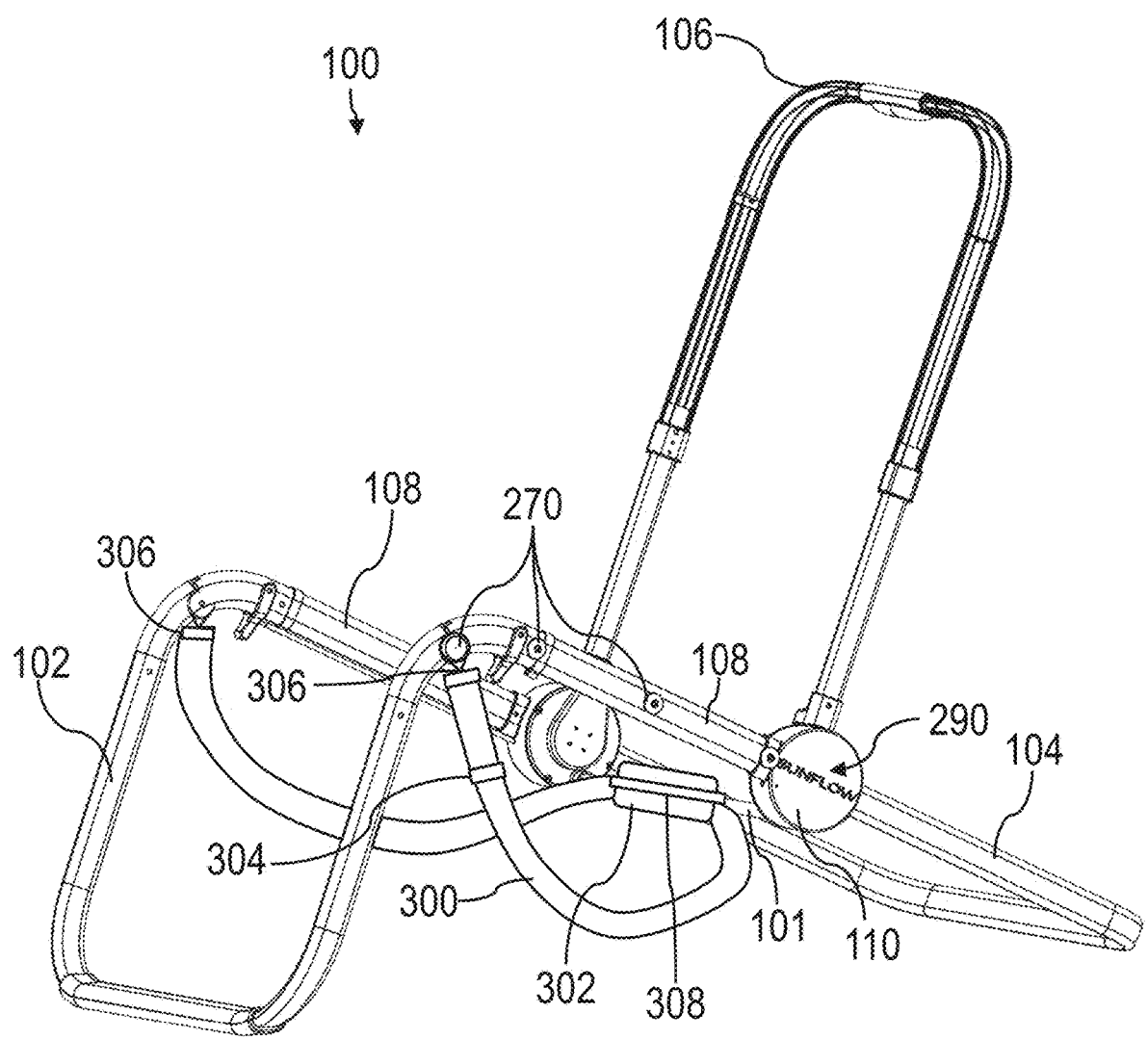
FIG. 47B is a perspective view of the chair of FIG. 47A in a second configuration.

FIG. 47B is a perspective view of the chair of FIG. 47A in a second configuration showing the carrying strap 300 arranged in two loops as backpack straps. As shown in FIG. 47B, the shoulder pad 302 has been wrapped around the crossbeam 101. In one embodiment, a hook-and-loop fastener flap of the shoulder pad may be fastened around the crossbeam 101, such that the shoulder pad 302 and carrying strap are secured to the crossbeam. As shown in FIG. 47B, the shoulder pad 302 is positioned between the rail 101 and the elastic band 308. The elastic strap maintains the central position of the shoulder strap relative to the hub. Put another way, the elastic strap inhibits the shoulder pad 302 from sliding along the crossbeam. In some embodiments, the carrying strap 300 is able to slide through the shoulder pad 302 while the shoulder pad is secured to the crossbeam 101, such that a user may adjust the relative length of each of the two loops. The slide adjuster 304 may be used to extend the length of the carrying strap to correspondingly extend the length of the two loops. As shown in FIG. 47B, the carrying strap 300 may hang underneath the central beams 108. Accordingly, the carrying strap 300 may not interference with the use of the chair when in the unfolded configuration. That is, the carrying strap 300 may be positioned to the sides and underneath a seating surface of the chair, such that the carrying strap does not interfere with sitting in the chair. Likewise, when the carrying strap is in the single loop configuration shown in FIG. 47A, the strap may remain out of the way and may not interfere with use of the chair. According to the embodiment shown in FIG. 47B, the carrying strap may not interfere with the movement of the chair between folded and unfolded configurations. That is, the chair shown in FIG. 47B may be folded according to exemplary embodiments described herein without interference of the carry strap 300.

Figure 47C:
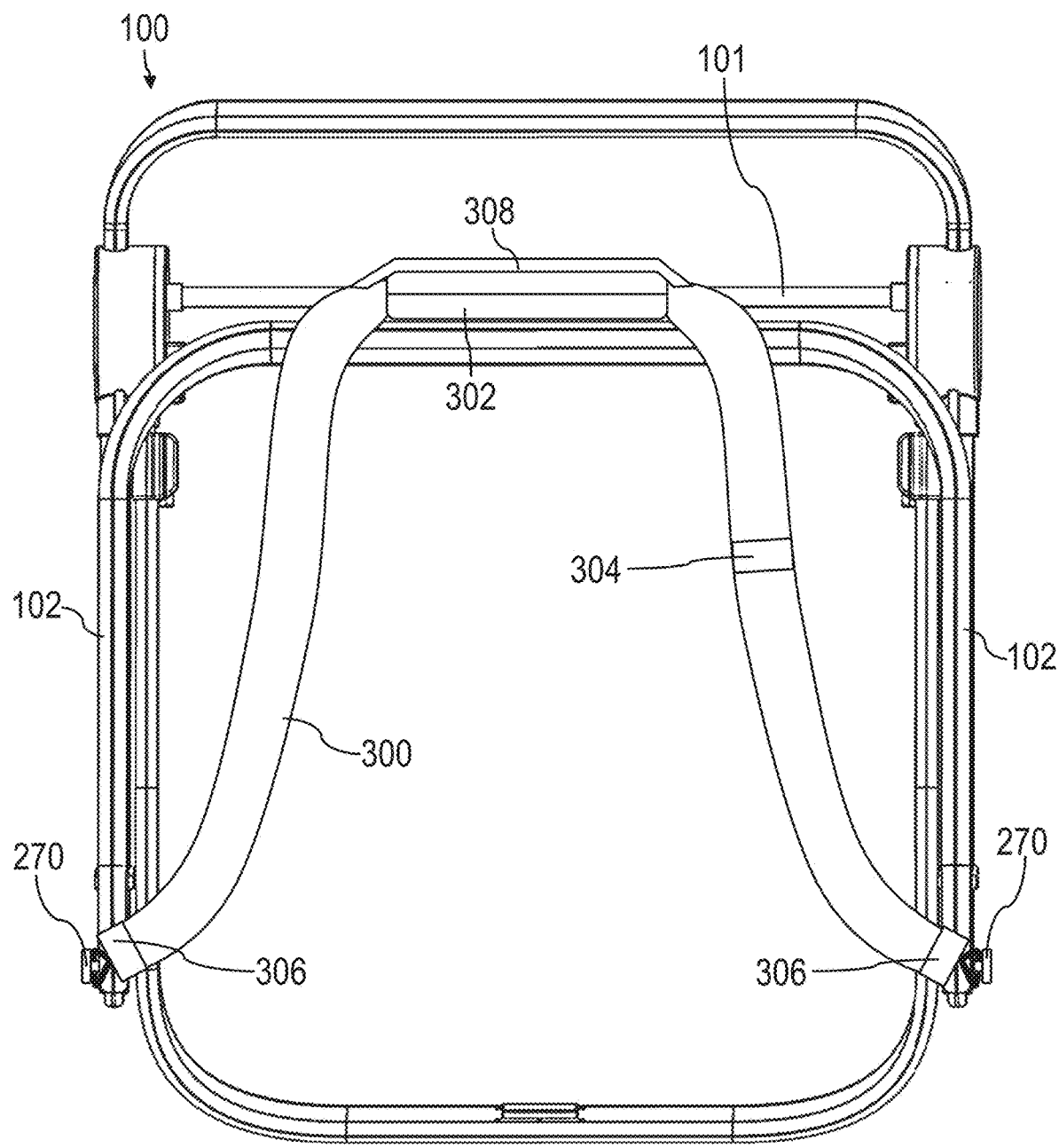
FIG. 47C is a bottom view of the chair of FIG. 47A in a third configuration.

FIG. 47C is a bottom view of the chair 100 of FIG. 47A in a third configuration where the chair is folded and the carrying strap 300 remains in a two strap arrangement. As shown in FIG. 47C, the shoulder pad 302 is secured to the crossbeam 101. The shoulder pad 302 is received in the elastic band 308, which keeps the shoulder pad in a central location on the crossbeam 101. The carrying strap is secured to buttons 270 via loops 306. Accordingly, the carrying strap forms two loops which may be worn on both shoulders like a backpack. Such an arrangement may facilitate carrying when the chair is in a folded configuration as shown in FIG. 47A.

Figure 47D:
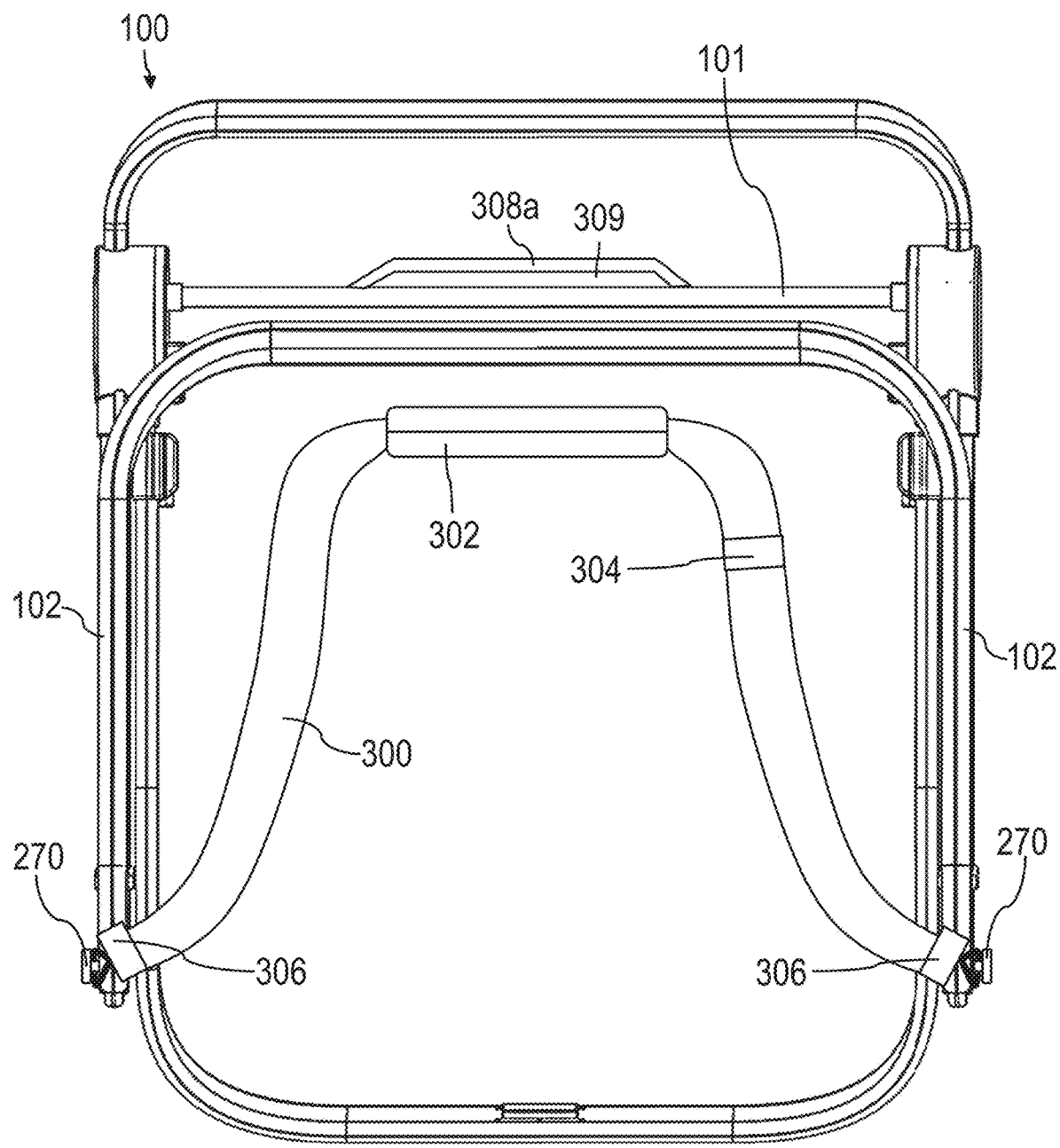
FIG. 47D is a schematic perspective view of a portion of the chair of FIG. 47A.

Alternatively, in another embodiment shown in FIG. 47D with the carrying strap shown detached from the attachment component, the attachment component is a rigid bar 308a fixed at its ends to the crossbeam. The central portion of the rigid bar is spaced away from the outer surface of the crossbeam to create a space 309 through which a strap of the shoulder pad can extend. Thus, a portion of the shoulder pad may be inserted in the space between the crossbeam and the rigid bar (similar to the embodiment described above with respect to FIGS. 47A-47C where the shoulder pad slips between the elastic strap and the crossbeam). In this embodiment, however, the shoulder pad may be secured to the rigid bar or to the crossbeam where a hook-and-loop fastener flap of the shoulder pad may be fastened around the crossbeam 101 or the rigid bar. With the rigid bar being generally centrally disposed along the crossbeam, the shoulder pad is thus retained in generally at a central portion of the crossbeam 101 such that the carrying strap forms two relatively equal length backpack strap portions. It should be appreciated that no attachment component is necessary and instead the shoulder pad can be attached directly to the crossbeam. Also, the shoulder pad may be formed of or include a higher friction material such that when the pad is fastened to a seat component, the pad remains relatively stationary.

Figure 48:
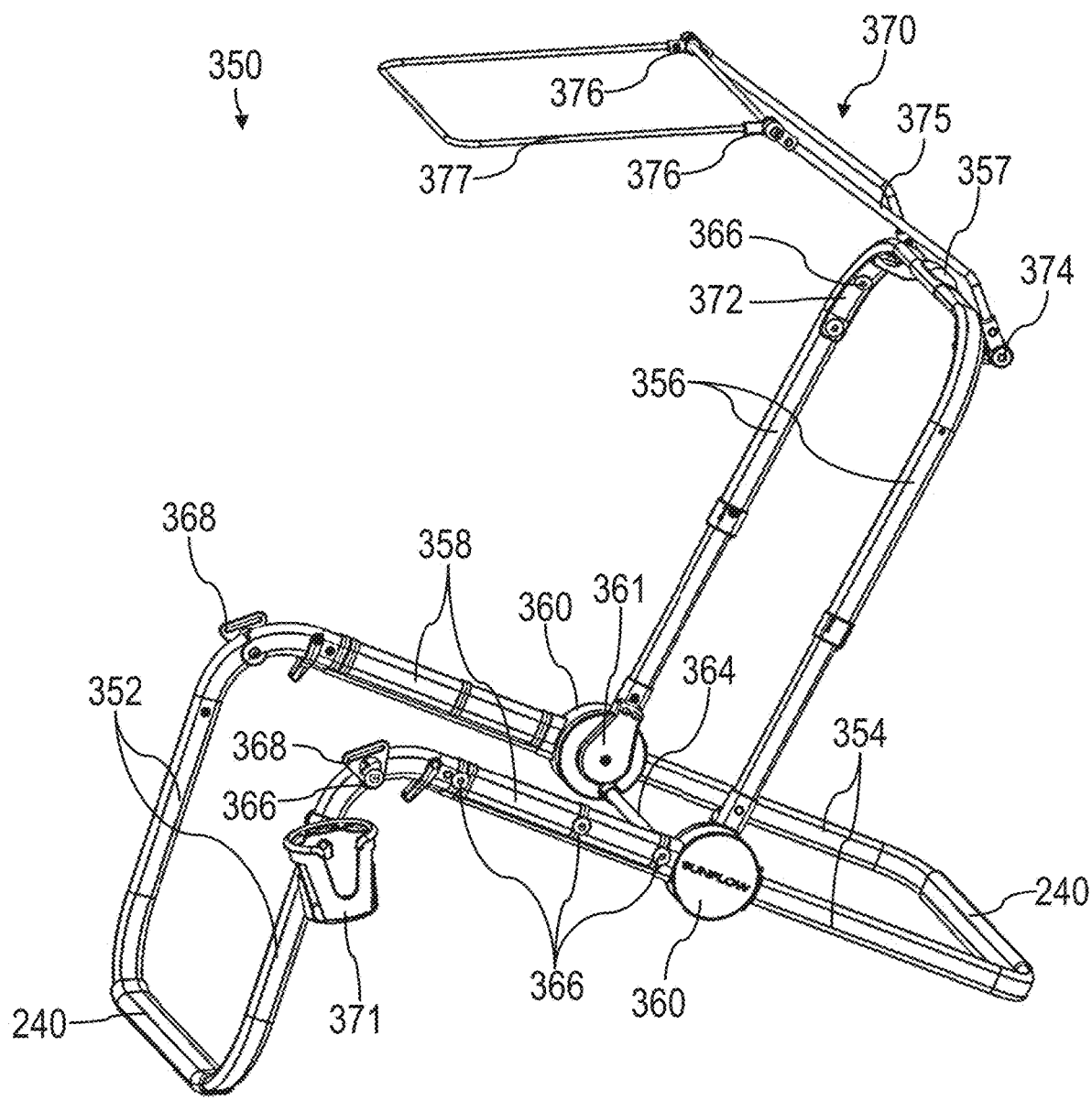
FIG. 48 is a perspective view of yet another embodiment of a chair.

FIG. 48 is a perspective view of yet another embodiment of a chair 350. The chair of FIG. 48 is similar to previously described embodiments, and includes front legs 352 and rear legs 354 coupled together via central beams 358 and hubs 360. The rear legs have a planar configuration and are arranged to telescope into and out of the central beams. The front legs are configured to fold relative to the central beams, allowing the chair to take a substantially planar configuration. As shown in FIG. 48, the chair also includes backrest stiles 356 that are configured to support a backrest material. A seating surface may be suspended from the central support beams and/or coupled to a crossbeam 364. For example, a seat wire may be coupled to the crossbeam via a bracket that is clamped around the crossbeam and riveted or screwed. As another example, a seat wire may be coupled to the hubs 360. Of course, any suitable arrangement for coupling a seat wire or otherwise supporting a searing surface may be employed, as the present disclosure is not so limited. In some embodiments, a seating surface may be suspended from buttons 366. Similar to previously discussed embodiments, the front legs 352 and rear legs 354 each include a shroud 240. The shroud may be formed of a compliant material (e.g., rubber) to provide improved grip on the ground and/or for a user's hands and feet during use of the chair. Additionally, the shroud 240 may provide cushion for a user's feet when the user is seated in the chair 350.

According to one embodiment as shown in FIG. 48, the hubs 360 support the backrest stiles 356 and allow the backrest stiles to fold (e.g., rotate) relative to the central beams 358. In particular, the stiles 356 are coupled to the hub via backrest stile connectors 361. The backrest stile connectors 361 define a rotation axis and include an axle extending into the hub 360. In the embodiment of FIG. 48, the backrest stiles 356 and backrest stile connectors 361 are configured such that the backrest may be rotated to be disposed between and parallel to the central beams 358. Accordingly, the chair 350 may take a folded configuration where its size is reduced (e.g., for transport or storage). As will be discussed further with reference to FIG. 53, the chair also include a backrest actuator disposed underneath compliant covering 357 that allows the backrest stiles to telescopically extend or retract.

According to the embodiment of FIG. 48, the chair 350 includes a plurality of buttons 366 disposed along different portions of the chair which are configured to receive and secure one or more chair accessories and/or structures. The buttons 366 are formed in a mushroom shape, such that clips, fabric loops, or other suitable elements may be removably coupled to the buttons 366. According to the embodiment of FIG. 48, the buttons are disposed along the central beams 358 and along an upper portion of backrest stiles 356. In some embodiments, the buttons 366 may include a bolt such that the buttons may be screwed into different portions of the chair to selectively add or remove the buttons. Of course, in other embodiments the buttons may be fastened to the chair in any appropriate manner, including, but not limited to, riveting, adhesive, overmolding, and snap-fit. In some embodiments as shown in FIG. 48. The buttons 366 are well suited to receive clips 368 such that one or more accessories may be secured to the chair. For example, a carrying strap may be secured via the clips 368. As another example, a side pocket having one or more pockets may be secured to the buttons 366 disposed along the central beams 358. Additionally, the buttons 366 may be configured to secure a sun shade 370 to the chair 350. In some embodiments, the buttons may be configured to support a seating and/or backrest surface of the chair. That is, a fabric seating surface and backrest surface may be coupled to the chair at least partially via the buttons 366. In some embodiments, such an arrangement may allow the seating and backrest surface to be removable for cleaning, storage, transport, or another appropriate use. Of course, one or more accessories may be coupled to the chair 350 in any suitable manner without the use of buttons 366, as the present disclosure is not so limited. As shown in FIG. 48, the chair 350 includes a cup holder 371 attached to one of the front legs 352 using a snap-fit bracket.

In some embodiments as shown in FIG. 48, the chair 350 may include a sun shade 370. As noted above with regards to other embodiments, a sun shade may provide protection from the sun for a seated user, while still allowing the chair 350 to fold to a compact configuration. As shown in FIG. 48, the sun shade includes a first portion 375 and a second portion 377. The first portion 375 is coupled to a shade bracket 372 via first hinges 374. The second portion 377 is coupled to the first portion via second hinges 376. Accordingly, in some embodiments, the first portion and second portion are independently rotatable relative to one another. According to some embodiments as shown in FIG. 48, the sun shade brackets 372 are coupled to the backrest stiles 356 via buttons 366. In particular, the buttons 366 are bolted to the backrest stiles over the sun shade brackets 372 such that the sun shade brackets are rigidly secured to the backrest stiles. Of course, any suitable removable or non-removable arrangement may be employed to couple the sun shade to the backrest stiles, as the present disclosure is not so limited. As will be discussed further with reference to FIGS. 54-55, the first and second hinges 374, 376 allow the sun shade to be moved by a user to a desired position which is then maintained by the hinges.

Figure 49:
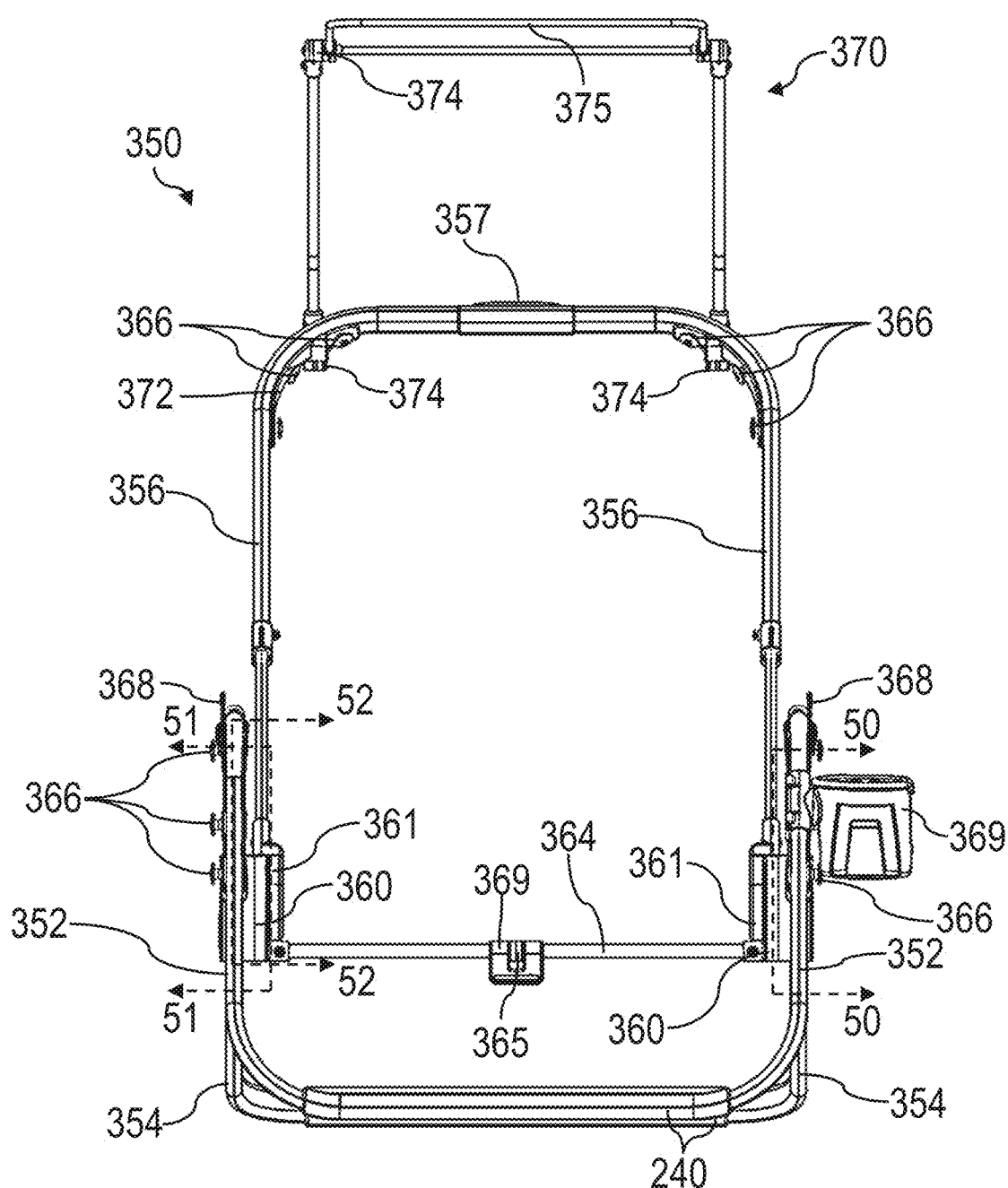
FIG. 49 is a front view of the chair of FIG. 48.

FIG. 49 is a front view of the chair 350 of FIG. 48. As discussed previously with reference to FIG. 48 and as shown in FIG. 49, the buttons 366 have a mushroom shape with a larger diameter flange disposed outside of a central column. Accordingly, accessories (e.g., clip 368) may be releasably fastened to the buttons but taking advantage of this geometry. For example, in some embodiments, a carrying strap associated with the chair 350 may be removably coupled to the chair to facilitate carrying of the chair. In one embodiment, the carrying strap may include a central snap clip 369 configured to secure the carrying strap the crossbeam 364. In the embodiment depicted in FIG. 49, the crossbeam 364 includes a spacer 365 aligned with the middle of the crossbeam. The spacer 365 may engage the snap clip 369 to maintain the position of the clip in a central portion of the cross-beam. Accordingly, the spacer 365 and snap clip 369 combination shown in FIG. 49 may be suitable for forming backpack straps that extend between the snap clip and clips 368 disposed on buttons 366. Of course, accessories may be coupled to the chair 350 in any suitable manner, as the present disclosure is not so limited.

Figure 50:
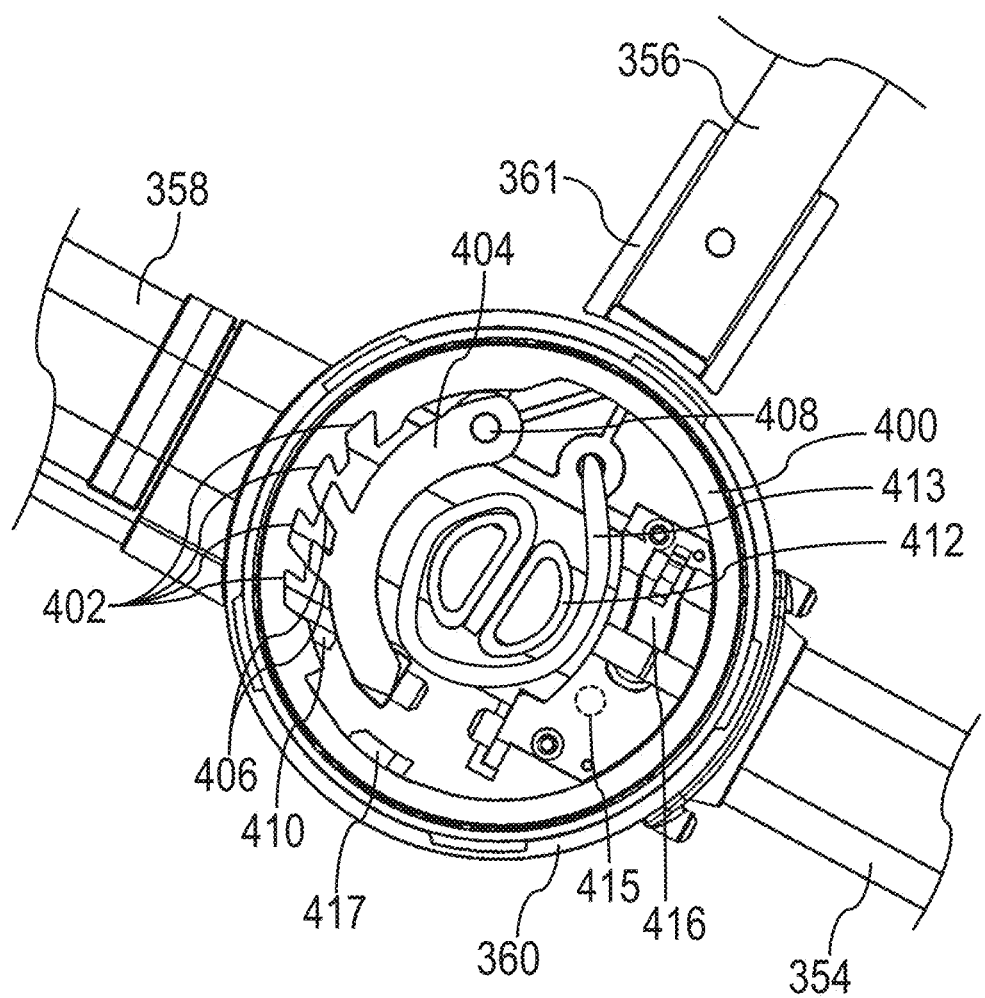
FIG. 50 is a cross-sectional view of a hub of the chair of FIG. 49 taken along line 50-50.

FIG. 50 is a cross-sectional view of the hub 360 of the chair of FIG. 49 taken along line 50-50. According to the embodiment of FIG. 50, the hub 360 is similar in operation to that of FIGS. 12A-12D. The hub includes a rotational coupler 400 having a plurality of locking regions 402. The rotational coupler is connected to backrest stiles 356 via backrest connectors 361. The hub also includes a locking lever (i.e., rotation lock) 404 which is configured to rotate about pin 408. The locking lever includes two projections 406 which have a corresponding shape to the locking regions 402. The locking lever 404 is arranged such that the projections and locking regions form an over-center lock, whereby the backrest stiles 356 are prevented from moving in one direction while threshold force in the other direction disengages the projections from the locking regions. In particular, the backrest stiles 356 are prevented from moving in a recline direction when the two projections 406 are engaged with corresponding locking regions 402. In the opposite direction, a threshold force applied to the backrest stiles 356 may cam the projections 406 out of engagement with the locking regions such that the backrest may be rotated towards the central beams 358. According to the embodiment shown in FIG. 50, the rotational coupler has three rotational positions in which the rotational coupler is locked by the locking lever 404. As shown in FIG. 50 and discussed previously, a trigger may be employed to control a trigger rod 410 that pushes the locking lever 404 out of engagement with the rotational coupler 400. The rotational coupler may include a spring mount 412 operatively supporting a torsion spring 413 which biases the rotational coupler 400 in a fold direction (i.e., opposite a recline direction). Of course, while a torsion spring is shown in FIG. 50, any suitable spring or biasing member may be employed, such as compression or tension springs, as the present disclosure is not so limited.

According to one embodiment as shown in FIG. 50, the hub 360 includes a rear leg pin 416. Similar to the embodiment discussed with reference to FIGS. 13A-13B, the rear leg pin 416 is configured to selectively lock the translation of the rear leg 354 into the central beam 358. That is, the rear leg pin selectively moves into and out of an aperture formed in the rear leg 354 to inhibit axial movement of the rear leg relative to the hub 360 and central beam 358. According to the embodiment of FIG. 50, the backrest leg pin 416 is configured to secure the rear leg 354 when the rear leg is fully extended and the backrest stile 356 is rotated out of a folded configuration (i.e., in a recline direction). The rear leg pin may be biased (e.g., with a spring) to engage the rear leg 354. According to the embodiment of FIG. 50, the rear leg pin is configured to rotate about an axis substantially parallel to an axis of translation of the rear leg 354. That is, the rear leg pin may rotate into or out of the page to selectively engage the rear leg. Of course, other axes of rotation are contemplated, including axes of rotation disposed in a plane substantially parallel to the axis of translation of the rear leg, and the present disclosure is not so limited in this regard. As shown in FIG. 50, the rotational coupler 400 includes a rear leg pin engagement tab 417 which is configured to engage the rear leg when the backrest stile 356 is rotated to a position in which the backrest stile is substantially parallel with the central beam 358 (e.g., a folded configuration). The rear leg pin engagement tab 417 may lift the rear leg pin (e.g., with an inclined surface) out of engagement with the rear leg 354, such that the rear leg is free to translate into and out of the central beam 358. In some embodiments, the hub 360 and/or rear leg 453 may include a ball detent 415 configured to retain the rear leg 354 in an extended position prior to the rear leg pin 416 engaging the rear leg. That is, the ball detent may retain the rear leg in an extended position until the backrest stile 356 is unfolded to allow the rear leg pin 416 to engage the rear leg 354. In one embodiment, the ball detent is disposed in the rear leg 345 and configured to engage a recess or slot formed in a portion of the hub 360. The ball detent may be biased with a suitable biasing member (e.g., compression spring). Of course, any suitable arrangement to hold the back leg in an extended position prior to being locked into place by the rear leg pin 416 may be employed, as the present disclosure is not so limited.

Figure 51:
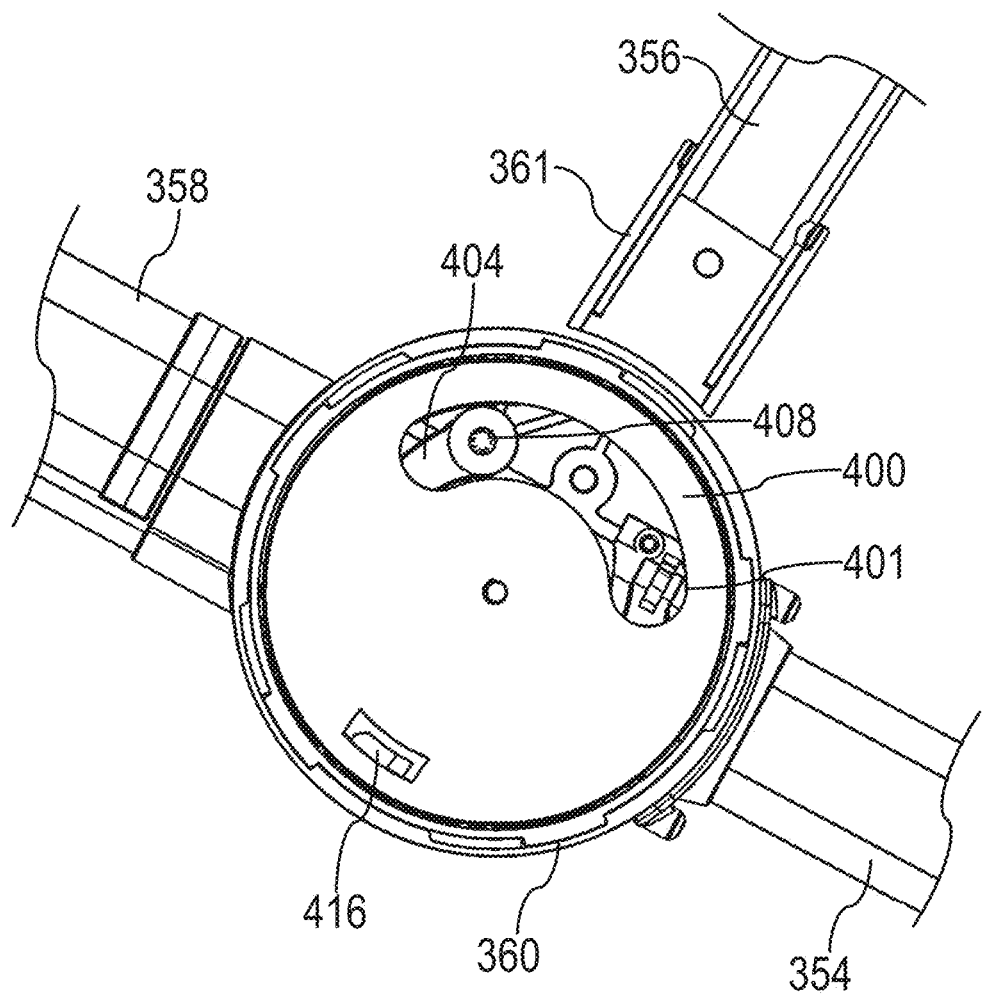
FIG. 51 is a cross-sectional view of a hub of the chair of FIG. 49 taken along line 51-51.

FIG. 51 is a cross-sectional view of the hub 360 of the chair of FIG. 49 taken along line 51-51. The cross section shown in FIG. 51 shows the exterior arrangement of the rotational coupler 400 which is coupled to a backrest connector 361. In the depicted embodiment, the rotational coupler 400 includes a slot 401 configured to accommodate the pin 408 supporting the locking lever 404. The ends of the slot 401 may function as stops to prevent rotation of the backrest stiles 356 out of a rotational range. For example, one end of the slot 401 may define a location where the backrest stile 356 is parallel with the central beam 358. Correspondingly, the other end of the slot 401 may define a maximum recline range. Of course, the slot 401 may have any suitable length and may define any suitable rotational limits for the backrest stile 356, as the present disclosure is not so limited.

Figure 52:
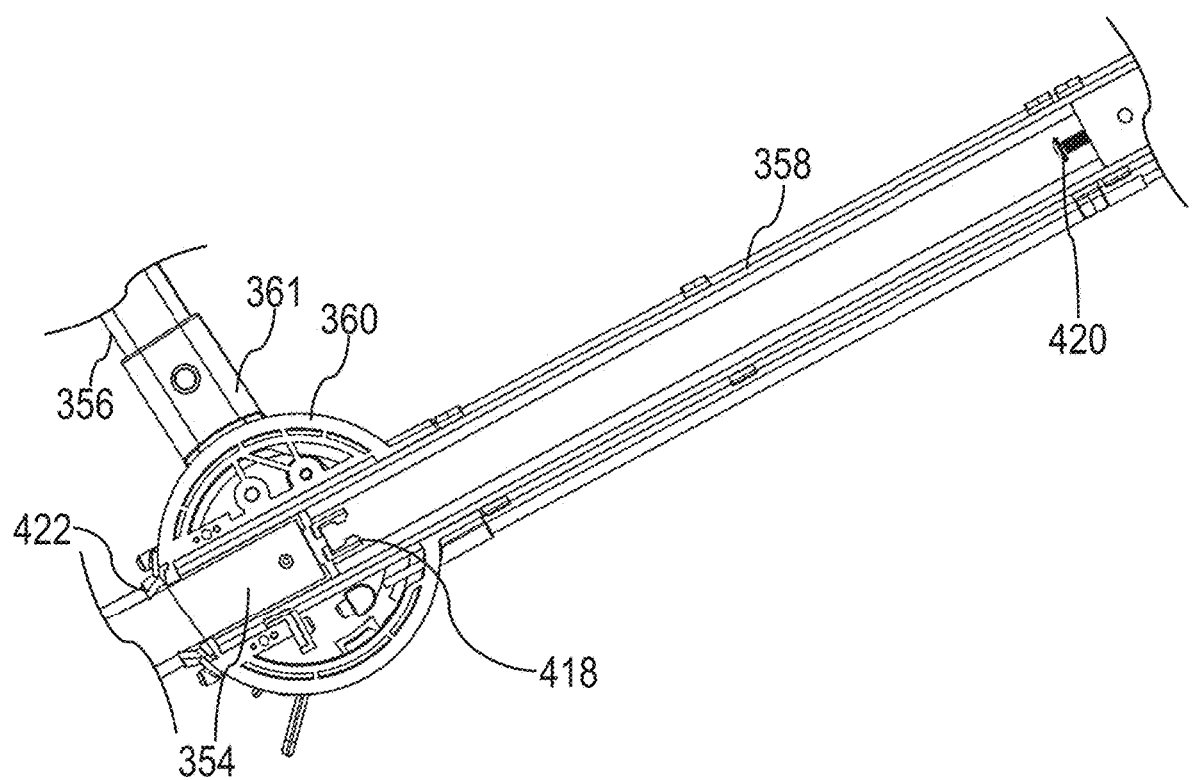
FIG. 52 is a cross-sectional view of a central beam of the chair of FIG. 49 taken along line 52-52.

FIG. 52 is a cross-sectional view of a central beam of the chair of FIG. 49 taken along line 52-52. According to one embodiment as shown in FIG. 52, the rear leg 354 may include a retaining clip 418 configured to releasably retain the rear leg in a retracted position where the rear leg is primarily disposed inside of the central beam 358. That is, the retaining clip 418 functions effectively as a detent to secure the rear leg 354 in a retracted position inside of the central beam 358. According to the embodiment of FIG. 52, the clip is configured to elastically deform around a screw 420 disposed on an end of the central beam opposite an end from when the rear leg 354 extend. The clip 418 may snap around the screw 420 until a threshold force is applied to the rear leg to elastically deform the clip and release the rear leg. Of course, while a clip and screw are shown in the embodiment depicted in FIG. 52, any suitable releasable clip or detents may be employed such as ball detents, as the present disclosure is not so limited.

According to one embodiment as shown in FIG. 52, the hub 360 includes a rear leg wiper 422. The rear leg wiper is disposed around a perimeter of the rear leg 354 and is configured to inhibit ingress of sand, water, and other particles from entering the hub or central beam 358. In some embodiments, the rear leg wiper 422 may be formed a complaint material, such that the rear leg wiper may form a loose seal with the rear leg 354. For example, the wiper may be formed of rubber, silicone, or another suitable material.

Figure 53:
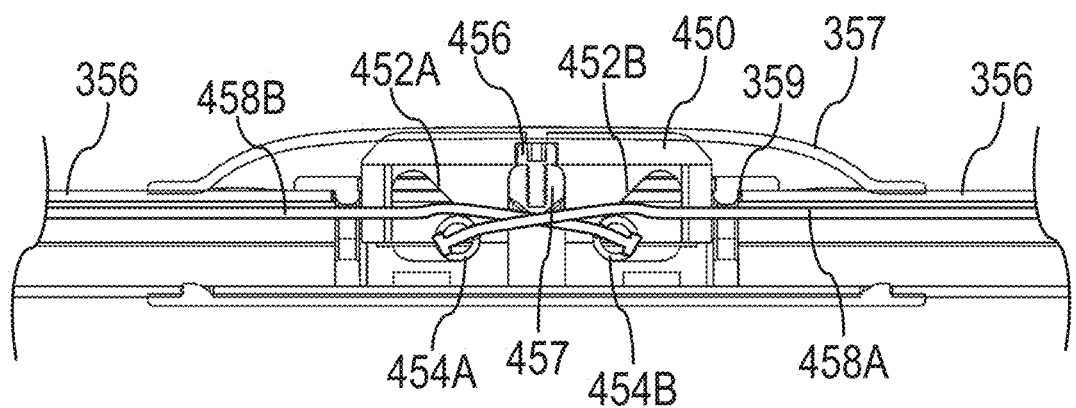
FIG. 53 is a cross-sectional view of a backrest release actuator of the chair of FIG. 48 taken along line 53-53.

FIG. 53 is a cross-sectional view of a backrest release actuator 450 of the chair of FIG. 48 taken along line 53-53. According to the embodiment of FIG. 53, the backrest release actuator is disposed on a top or upper surface of the backrest stiles 356. In particular, the backrest release actuator protrudes out of an aperture 359 such that it is accessible by a user. In some embodiments as shown in FIG. 53, the backrest release actuator 450 may be covered by a compliant covering 357 which allows the backrest release actuator to be pressed by a user while inhibiting sand, water, and/or other particulates from entering the backrest stiles 356 via the aperture 359. In some embodiments, the compliant covering 357 may be removable to allow access to the backrest release actuator 450 for tuning, cleaning, and/or servicing.

As shown in FIG. 53, the backrest release actuator 450 includes opposing inclined surfaces 452A, 452B that are configured to engage and move slider pins 454A, 454B. In particular, when the backrest release actuator is depressed (i.e., moved further into the backrest stiles 356), the inclined surfaces 452A, 452B force the slider pins 454A, 454B outward relative to one another. Put another way, a first slider pin 454A is moved leftward relative to the page and a second slider pin 454B is moved rightward relative to the page, opposite directions from one another. Similar to embodiments previously discussed with reference to FIGS. 15-16 and 20-21, the slider pins 454A, 454B are each coupled to tethers 458A, 458B which are in turn coupled to backrest blocking pins (e.g., via a backrest pin actuator) disposed in the backrest stiles 356. The tethers 458A, 458B may be a cable, wire, nylon cord, string, or another other appropriate material for transferring tension between the slider pins 454A, 454B and a backrest pin actuator or backrest blocking pin. According to the embodiment of FIG. 53, tension is increased in the tethers 458A, 458B when the backrest release actuator 450 is depressed and the slider pins 454A, 454B are moved outward. Additionally, the tethers 458A, 458B cross over one another to engage the slider pins 454A, 454B. Such an arrangement may be beneficial to adjust the tension of both the tethers 458A, 458B with a single tension adjuster 457.

According to one embodiment as shown in FIG. 53, the backrest release actuator 450 may include a tension adjuster 457 configured to adjust the tension in the tethers 458A, 458B. The tension adjuster is coupled to the backrest release actuator 450 via a screw 456 which may be turned to adjust the position of the tension adjuster relative to the backrest release actuator 450. The tension adjuster is in contact with the tethers 458A, 458B and adjustment of the tension adjuster may take up slack in the tethers (i.e., apply tension), thereby allowing the tension in the tethers to be set by a user when the backrest release actuator is in an unactuated (i.e., undepressed) position. The arrangement of the tension adjusted to maintain tension in the tethers 458A 458B also allows the tensioned tethers to function as biasing members that bias the backrest release actuator to the unactuated position shown in FIG. 53. That is, the tension in the tethers may apply a normal force against the inclined surfaces 452A, 452B, such that the backrest release actuator is urged outward relative to the backrest stiles 356 (i.e., upward relative to the page). Such an arrangement may simplify the construction of the backrest release actuator. Of course, in other embodiments a separate biasing member such as a compression spring may be employed with the backrest release actuator 450, as the present disclosure is not so limited.

Figure 54:
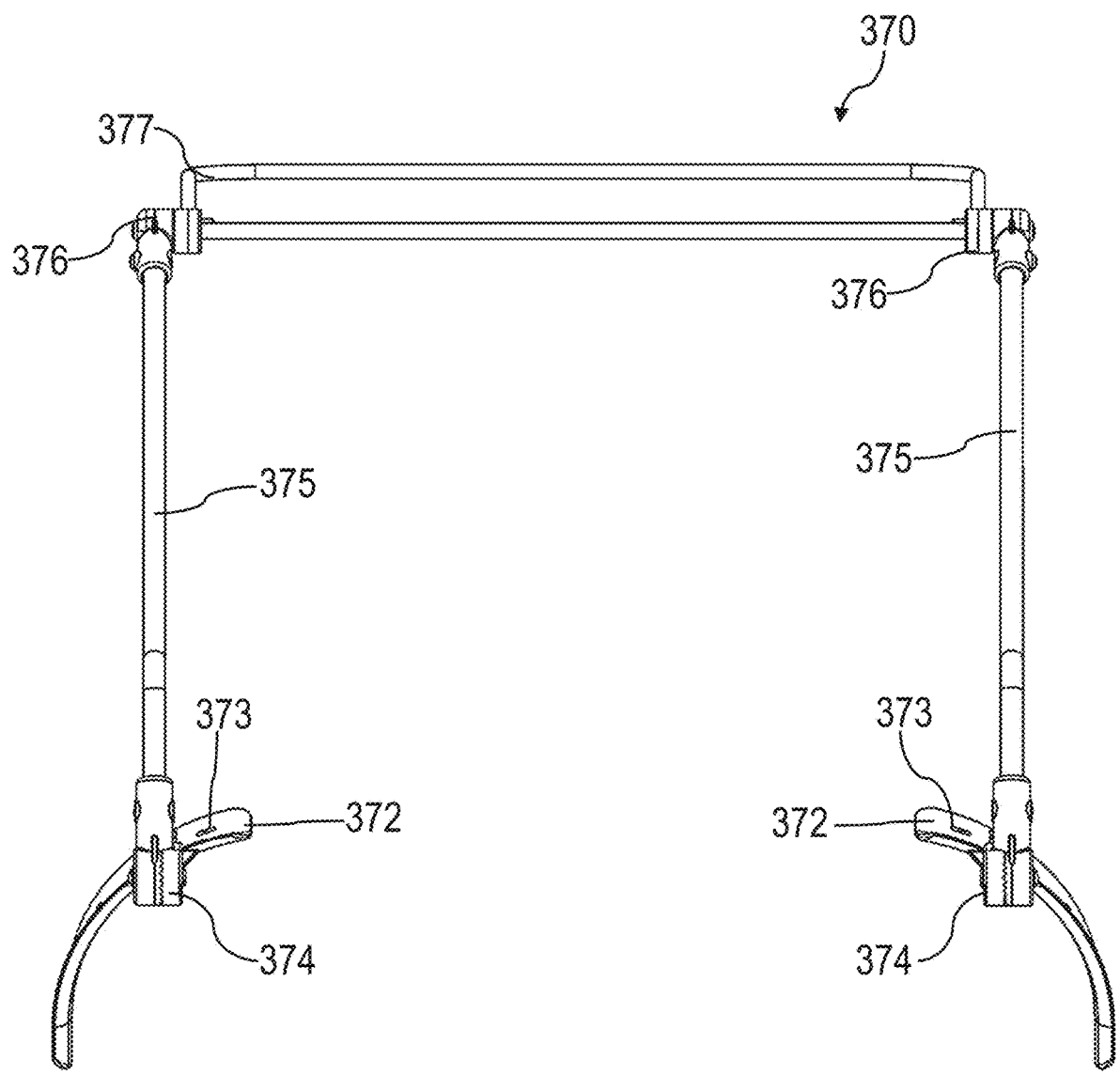
FIG. 54 is an elevation view of another embodiment of a sun shade.

FIG. 54 is an elevation view of an embodiment of a sun shade 370. The sun shade 370 is configured in a two portion arrangement, having a first adjustable portion 375 and a second adjustable portion 377. The first adjustable portion and second adjustable portion are independently rotatable relative to one another. The first portion is coupled to a sun shade bracket 372 via first hinges 374, while the second portion is coupled to the first portion via second hinges 376. Each of the first hinges and second hinges are configured to releasably maintain a relative rotational position of the first portion and second portion, as will be discussed further with reference to FIG. 55. In some embodiments, the sun shade 370 is configured to fold backward to be substantially parallel with backrest stiles. Of course, the sun shade 370 may be folded and moved to any suitable rotational position, as the present disclosure is not so limited. In some embodiments, a fabric covering for the sun shade 370 may be arranged such that there is a gap or opening between fabric covering the first portion 375 and fabric covering the second portion 377. Such an arrangement may be beneficial to mitigate the effects of wind on the sun shade.

As shown in FIG. 54, the sun shade brackets 372 have shape configured to corresponding to a shape of a backrest of a chair. In the embodiment of FIG. 54, the brackets have an arcuate shape. The brackets 372 each include a plurality of holes 373 which may receive one or more fasteners for securing the brackets to a corresponding chair. For example, in one embodiment, the holes 373 are configured to receive buttons. Of course, any suitable fastener such as screws, bolts, etc. may be employed, as the present disclosure is not so limited.

Figure 55:
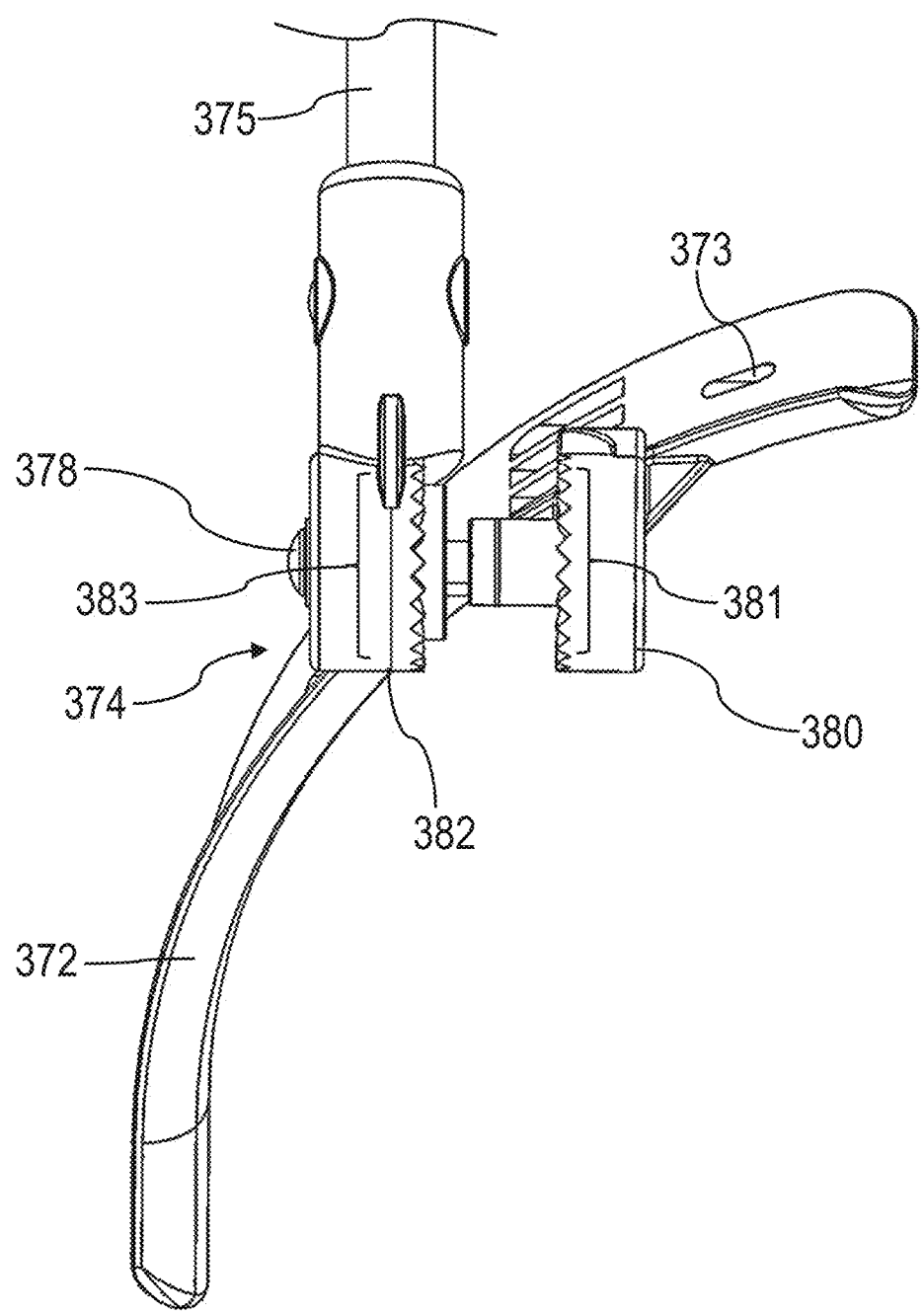
FIG. 55 is an exploded view of one embodiment of a sun shade hinge.

FIG. 55 is an exploded view of one embodiment of a sun shade hinge 374 configured to allow a rotational position of a portion 375 of the sun shade to be adjusted and maintained by a user. According to the embodiment of FIG. 55, the sun shade hinge 374 is configured as a biased Hirth coupling. A first section 380 of the hinge is coupled secured to a second section 382 of the hinge with a biased bolt 378. That is, a tension spring or other biasing member biases the first section 380 toward the second section 382, while still accommodating relative displacement of the second section from the first section. The first section 380 includes a first plurality of circumferentially arranged teeth 381, and the second section 382 includes a second plurality of circumferentially arranged teeth 383 configured to engage the first plurality of teeth 381. The teeth 381, 383 are arranged such that up to a threshold force the teeth prevent relative rotational movement of the first section and second section. Once a threshold force (e.g., torque) is applied, the normal forces between the teeth 381, 383 overcomes the biasing force from the biased bolt 378 and the first section and second section disengage from one another such that the second section 382 may be rotated relative to the first section 380 while the threshold force is applied. Accordingly, the second section 382 may be moved to a desired position and released, whereupon the biased bolt 378 may urge the second section back into engagement with the first section, thereby maintaining the set rotational position.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A chair, comprising:
    a frame;
    a seating surface coupled to the frame;
    a backrest surface coupled to the frame,
    the frame having a backrest frame including a first portion and a second portion, wherein the first and second portions are connected together in a telescoping manner whereby the backrest frame includes a retracted position and an extended position;
    at least one blocking pin constructed and arranged to hold the backrest frame in the extended position; and,
    an actuator operatively coupled to the at least one blocking pin, the actuator configured to actuate the at least one blocking pin to allow the backrest frame to move from the extended position to the retracted position.

2. The chair of claim 1, wherein the first portion comprises inner stiles and the second portion comprises outer stiles, wherein the inner stiles and outer stiles are constructed and arranged to slide relative to each other where the inner stiles slide into and out of the outer stiles to move the backrest frame between the retracted position and extended position, respectively.

3. The chair of claim 2, further comprising a wiper disposed at an interface between the inner and outer stiles, wherein the wiper is configured to reduce fluids or particles from entering the outer stiles as the inner stiles translate into the outer stiles.

4. The chair of claim 2, wherein the backrest surface is formed of fabric.

5. The chair of claim 1, wherein the first portion comprises inner stiles and the second portion comprises outer stiles, wherein the backrest frame further includes a rail connecting the outer stiles to form a U-shaped second portion of the backrest frame.

6. The chair of claim 1, wherein the at least one blocking pin is remote from the actuator.

7. The chair of claim 6, wherein the first portion comprises inner stiles and the second portion comprises outer stiles, wherein the backrest frame further includes a rail connecting the outer stiles to form a U-shaped second portion of the backrest frame and wherein the actuator is disposed on the rail.

8. The chair of claim 7, wherein the at least one blocking pin engages a corresponding hole in the inner stiles.

9. The chair of claim 8, further comprising a tether operatively coupling the actuator with the at least one blocking pin.

10. A chair, comprising:
    a frame having a backrest portion including a first portion and a second portion, wherein the first and second portions are connected together in a telescoping manner whereby the backrest portion has a retracted position and an extended position;
    at least one blocking component coupled to at least one of the first and second portions, the at least one blocking component constructed and arranged to allow the backrest portion to move from the extended position to the retracted position upon actuation of the at least one blocking component, wherein the at least one blocking component is constructed and arranged to hold the backrest portion in the extended position; and,
    an actuator operatively coupled to the at least one blocking component, the actuator configured to actuate the at least one blocking component to allow the backrest frame to move from the extended position to the retracted position.

11. The chair of claim 10, further comprising a fabric backrest surface attached to the backrest portion of the frame.

12. The chair of claim 10, wherein the second portion includes a rail, wherein the actuator is disposed on the rail.

13. The chair of claim 12, further comprising a tether operatively coupling the actuator with the at least one blocking component.

14. A chair, comprising:
    a frame having a backrest portion including a first portion and a second portion, wherein the first and second portions are connected together in a telescoping manner whereby the backrest portion includes a retracted position and an extended position, wherein the first portion comprises inner stiles and the second portion comprises outer stiles, wherein the inner stiles and outer stiles are constructed and arranged to slide relative to each other where the inner stiles slide into and out of the outer stiles to move the backrest portion between the retracted position and extended position, respectively; wherein the backrest portion further includes a rail connecting the outer stiles to form a U-shaped second portion of the backrest portion;
    at least one blocking pin constructed and arranged to hold the backrest portion in the extended position; and,
    an actuator disposed on the rail and operatively coupled to the at least one blocking pin via a tether, the actuator configured to actuate the at least one blocking pin to allow the backrest portion to move from the extended position to the retracted position.

15. The chair of claim 14, further comprising a fabric backrest surface attached to the backrest portion of the frame.

16. A foldable chair, comprising:
    a backrest frame having a first stile and a second stile disposed at least partially inside the first stile and configured to slide in the first stile between an extended and a retracted position;
    a blocking pin movable between a blocking position and an unblocking position, wherein in the blocking position, the blocking pin cooperates with the first and second stiles to inhibit sliding motion of the second stile relative to the first stile, and in the unblocking position the second stile is free to slide relative to the first stile;

a tether operatively coupled to the blocking pin at a first end; and an actuator operatively coupled to a second end of the tether, wherein the actuator is operable by a user to move the blocking pin between the blocking position and unblocking position.

17. The foldable chair of claim 16, wherein the first end of the tether is coupled to a carrier disposed adjacent to the first stile and configured to slide relative to the first stile when the actuator is operated by a user, wherein the carrier includes a carrier engagement surface inclined relative to the first stile, and wherein the carrier engagement surface engages the blocking pin when the actuator is operated by a user to move the blocking pin from the blocking position to the unblocking position.

18. The foldable chair of claim 17, wherein the blocking pin includes a pin head, wherein the pin head includes a carrier engagement surface configured to engage the pin engagement surface of the carrier, and wherein the carrier engagement surface is parallel to the pin engagement surface.

19. The foldable chair of claim 16, wherein the actuator comprises:

an actuator housing having a first actuator pin slot;

a button having a second actuator pin slot, wherein the button is configured to move toward the actuator housing in a first direction, and wherein the second actuator pin slot is inclined relative to the first actuator pin slot; and an actuator pin disposed in both the first actuator pin slot and the second actuator pin slot, wherein the second end of the tether is coupled to the actuator pin, and wherein movement of the button in the first direction moves the actuator pin along the first actuator pin slot.

20. The foldable chair of claim 19, wherein the first end of the tether is coupled to a carrier disposed adjacent to the first stile and configured to slide relative to the first stile when the actuator is operated by a user, wherein the carrier includes a carrier engagement surface inclined relative to the first stile, and wherein the carrier engagement surface engages the pin when the actuator is operated by a user to move the blocking pin from the blocking position to the unblocking position.

21. The foldable chair of claim 20, wherein the blocking pin includes a pin head, wherein the pin head includes a carrier engagement surface configured to engage the carrier engagement surface of the carrier, and wherein the carrier engagement surface is parallel to the pin engagement surface.

22. The foldable chair of claim 16, wherein the backrest frame includes two first stiles and two second stiles, wherein each second stile is disposed at least partially inside a corresponding first stile and is configured to slide in the corresponding first stile between an extended and a retracted position;

wherein each first and second stile cooperates with a corresponding blocking pin to inhibit sliding motion of the second stile relative to the first stile when the corresponding blocking pin is in the blocking position and to allow sliding motion of the second stile relative to the first stile when the corresponding blocking pin is in the unblocking position; and wherein each blocking pin is operatively coupled to a respective tether and each tether is operatively coupled to the actuator such that the actuator is operable by a user to simultaneously move the blocking pins between the blocking position and unblocking position.

23. The foldable chair of claim 22, wherein the backrest frame further includes a rail connecting the two first stiles and wherein the actuator is disposed on the rail.

* * * * *